(12) United States Patent
Hudec

(10) Patent No.: US 9,039,026 B2
(45) Date of Patent: May 26, 2015

(54) BICYCLE SUSPENSION SYSTEM

(76) Inventor: Christopher Hudec, Nanaimo (CA)

( * ) Notice: Subject to any disclaimer, the term of this patent is extended or adjusted under 35 U.S.C. 154(b) by 0 days.

(21) Appl. No.: 14/005,177

(22) PCT Filed: Mar. 14, 2012

(86) PCT No.: PCT/CA2012/000236
§ 371 (c)(1),
(2), (4) Date: Sep. 13, 2013

(87) PCT Pub. No.: WO2012/122634
PCT Pub. Date: Sep. 20, 2012

(65) Prior Publication Data
US 2014/0001729 A1   Jan. 2, 2014

Related U.S. Application Data

(60) Provisional application No. 61/452,423, filed on Mar. 14, 2011.

(51) Int. Cl.
B62K 25/28 (2006.01)
B62K 25/04 (2006.01)

(52) U.S. Cl.
CPC ............... B62K 25/04 (2013.01); B62K 25/28 (2013.01)

(58) Field of Classification Search
USPC ......................................... 280/283, 284, 285
See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,205,572 A | 4/1993 | Buell et al. | |
| 5,244,224 A | 9/1993 | Busby | |
| 5,441,292 A | 8/1995 | Busby | |
| 5,509,679 A | 4/1996 | Leitner | |
| 5,553,881 A | 9/1996 | Klassen et al. | |
| 5,628,524 A | 5/1997 | Klassen et al. | |
| 5,899,480 A | 5/1999 | Leitner | |
| 5,957,473 A | 9/1999 | Lawwill | |
| 6,099,010 A | 8/2000 | Busby | |
| 6,206,397 B1 | 3/2001 | Klassen et al. | |
| 6,843,494 B2 | 1/2005 | Lam | |

(Continued)

FOREIGN PATENT DOCUMENTS

| | | |
|---|---|---|
| GB | 2454021 | 4/2009 |
| WO | WO99/10224 | 3/1999 |
| WO | WO2008/025950 | 3/2008 |

OTHER PUBLICATIONS

Supplementary European Search Report for EP12757530 (mailed Aug. 14, 2014).

*Primary Examiner* — Joseph Rocca
*Assistant Examiner* — Gabriela C Craciun
(74) *Attorney, Agent, or Firm* — Klarquist Sparkman, LLP

(57) ABSTRACT

An embodiment of the invention includes a three-component rear-wheel suspension system for interconnecting to a bicycle frame and a shock absorbing device. The three components are an upper stay pivotally attached to the frame, a lower stay having a rear wheel mount and pivotally connected to the upper stay at a location generally above the rear wheel mount, and a link pivotally connected to the frame at a location below where the upper stay is attached to the frame and pivotally coupled to the lower stay. The general arrangement of the linkages between the three components permit compression of the suspension system (i.e. relative upward movement of the rear wheel) with limited chainstay lengthening.

8 Claims, 52 Drawing Sheets

(56) References Cited

U.S. PATENT DOCUMENTS

| | | | |
|---|---|---|---|
| 6,969,081 B2 | 11/2005 | Whyte | |
| 7,048,292 B2 | 5/2006 | Weagle | |
| 7,066,481 B1 | 6/2006 | Soucek | |
| 7,100,930 B2 | 9/2006 | Saiki | |
| 7,128,329 B2 | 10/2006 | Weagle | |
| 7,240,912 B2 | 7/2007 | Whyte | |
| 7,296,815 B2 | 11/2007 | Ellsworth et al. | |
| 7,392,999 B2 | 7/2008 | O'Connor | |
| 7,494,146 B2 | 2/2009 | Tseng | |
| 7,556,276 B1* | 7/2009 | Dunlap | 280/284 |
| 7,581,743 B2 | 9/2009 | Graney | |
| 7,635,141 B2 | 12/2009 | O'Connor | |
| 7,658,394 B1 | 2/2010 | Huang | |
| 7,712,757 B2 | 5/2010 | Berthold | |
| 7,717,212 B2 | 5/2010 | Weagle | |
| 7,828,314 B2 | 11/2010 | Weagle | |
| 7,934,739 B2 | 5/2011 | Domahidy | |
| 2001/0015540 A1* | 8/2001 | Lawwill et al. | 280/284 |
| 2004/0046355 A1* | 3/2004 | Carroll | 280/284 |
| 2005/0057018 A1 | 3/2005 | Saiki | |
| 2005/0067806 A1* | 3/2005 | Weagle | 280/124.1 |
| 2005/0184483 A1 | 8/2005 | Buckley | |
| 2005/0285367 A1* | 12/2005 | Chang et al. | 280/284 |
| 2007/0024022 A1* | 2/2007 | Weagle | 280/286 |
| 2007/0108725 A1* | 5/2007 | Graney | 280/284 |
| 2008/0054595 A1 | 3/2008 | Lu | |
| 2008/0067772 A1 | 3/2008 | Weagle | |
| 2008/0073868 A1* | 3/2008 | Weagle | 280/124.1 |
| 2008/0217882 A1 | 9/2008 | Beaulieu et al. | |
| 2008/0238030 A1* | 10/2008 | Tseng | 280/284 |
| 2008/0252040 A1 | 10/2008 | Colegrove et al. | |
| 2008/0258425 A1 | 10/2008 | Tribotte | |
| 2008/0277900 A1* | 11/2008 | I | 280/283 |
| 2009/0026728 A1 | 1/2009 | Domahidy | |
| 2009/0072512 A1 | 3/2009 | Earle | |
| 2009/0261556 A1 | 10/2009 | Beale | |
| 2009/0261557 A1* | 10/2009 | Beale et al. | 280/284 |
| 2009/0283986 A1 | 11/2009 | Falke | |
| 2009/0315296 A1 | 12/2009 | Berthold | |
| 2010/0007113 A1 | 1/2010 | Earle et al. | |
| 2010/0059965 A1 | 3/2010 | Earle | |
| 2010/0102531 A1 | 4/2010 | Graney et al. | |
| 2010/0109282 A1* | 5/2010 | Weagle | 280/284 |
| 2010/0127473 A1 | 5/2010 | Cocalis et al. | |
| 2010/0156066 A1 | 6/2010 | O'Connor | |
| 2010/0207342 A1* | 8/2010 | Weagle | 280/124.1 |
| 2010/0327556 A1 | 12/2010 | Chamberlain | |
| 2011/0018228 A1* | 1/2011 | Beale et al. | 280/284 |
| 2011/0115181 A1* | 5/2011 | Weagle | 280/124.104 |
| 2011/0187078 A1* | 8/2011 | Higgon | 280/284 |
| 2011/0193316 A1* | 8/2011 | Earle | 280/284 |
| 2011/0233892 A1* | 9/2011 | Domahidy | 280/284 |
| 2011/0233893 A1* | 9/2011 | Buckley | 280/284 |
| 2012/0074666 A1* | 3/2012 | Chamberlain | 280/284 |
| 2012/0228850 A1* | 9/2012 | Tseng | 280/283 |
| 2013/0093160 A1* | 4/2013 | Alsop | 280/284 |
| 2013/0214507 A1* | 8/2013 | O'Connor | 280/284 |
| 2013/0285346 A1* | 10/2013 | Wimmer | 280/284 |
| 2013/0341886 A1* | 12/2013 | Chamberlain | 280/284 |
| 2014/0103617 A1* | 4/2014 | Chamberlain | 280/284 |
| 2014/0197617 A1* | 7/2014 | Hoogendoorn et al. | 280/283 |
| 2014/0217697 A1* | 8/2014 | Buckley | 280/284 |

* cited by examiner

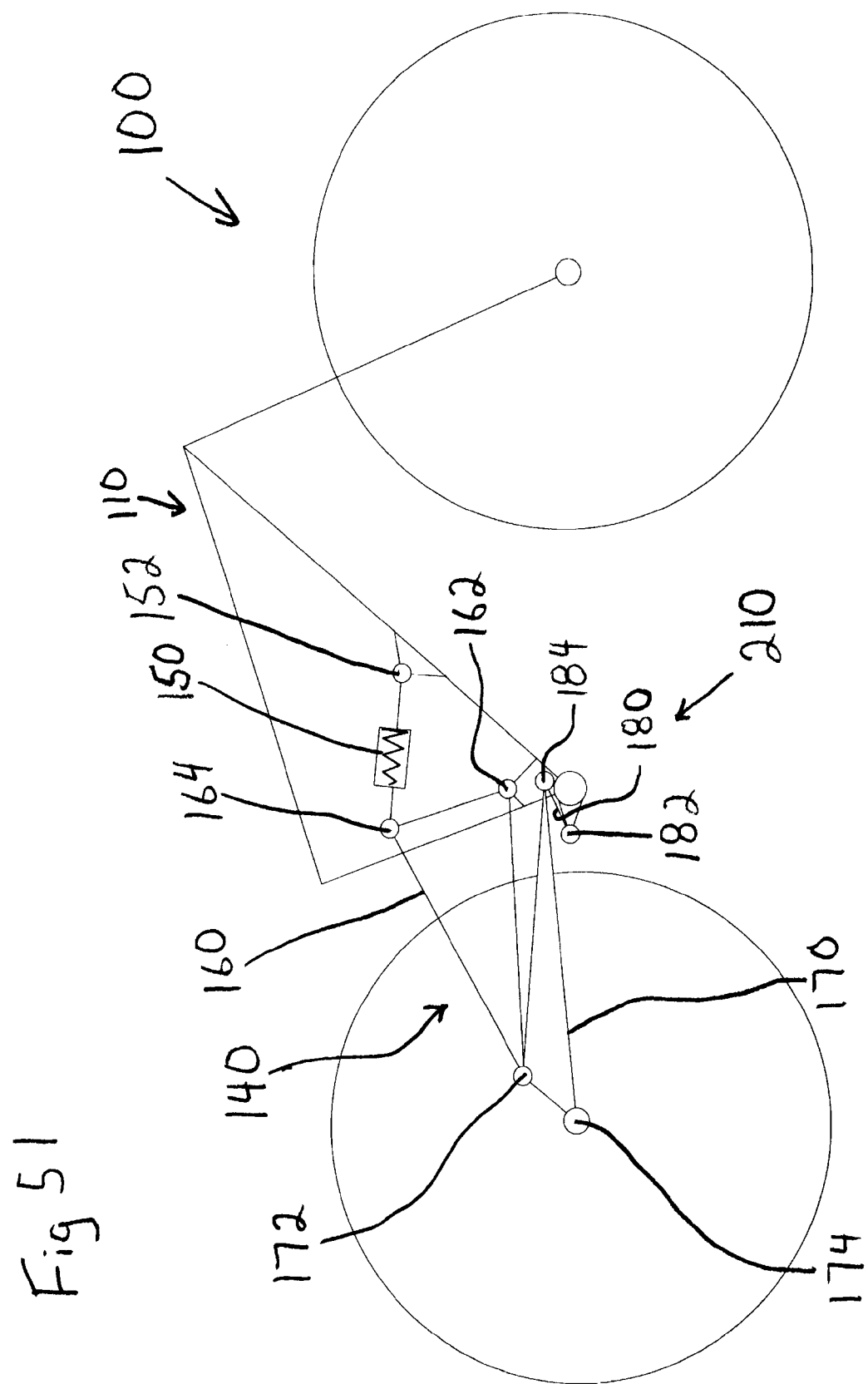

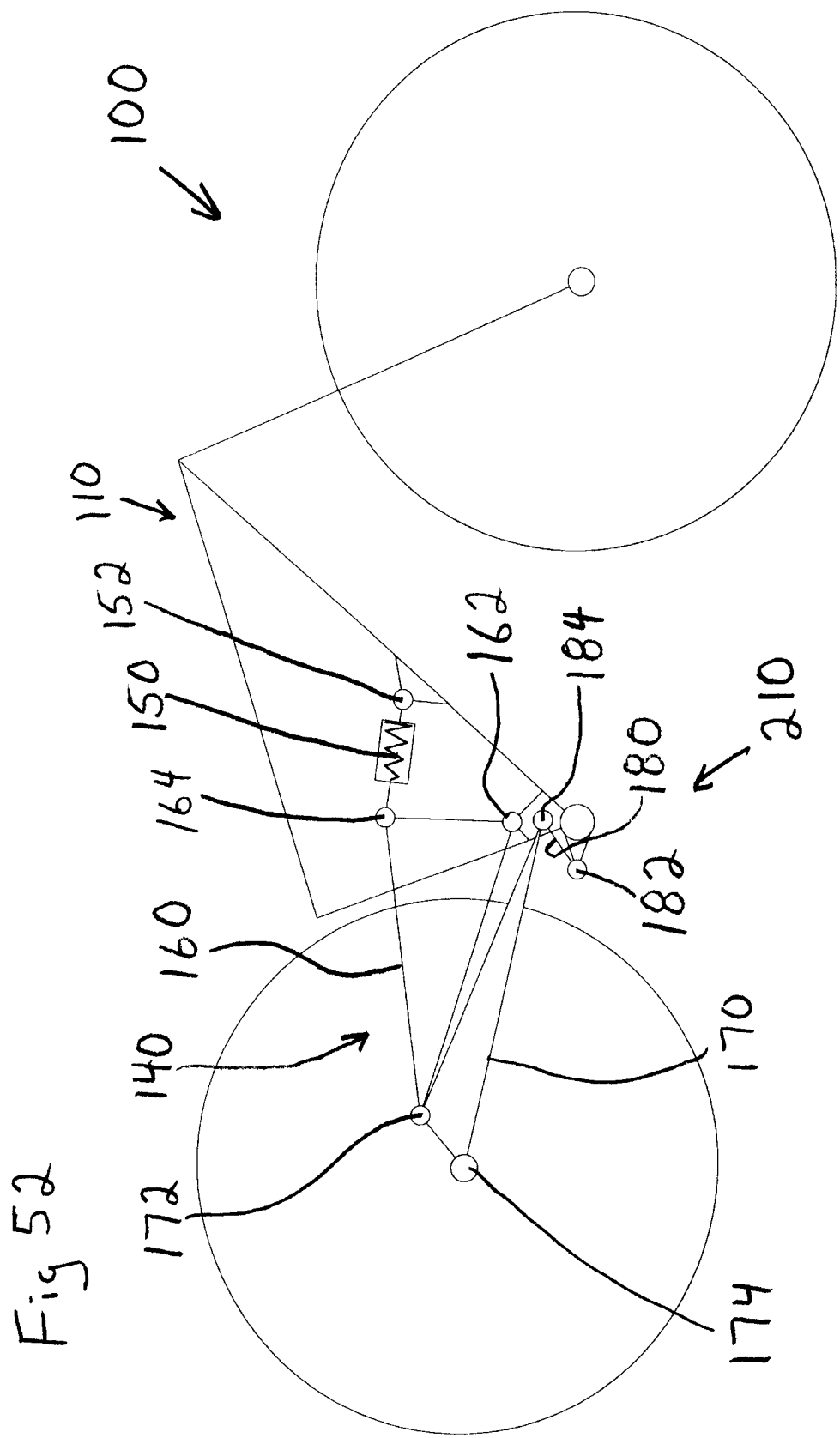

BICYCLE SUSPENSION SYSTEM

CROSS REFERENCE TO RELATED APPLICATIONS

This is the U.S. National Stage of International Application No. PCT/CA2012/000236, filed Mar. 14, 2012, which was published in English under PCT Article 21(2), which in turn claims the benefit of U.S. Provisional Application No. 61/452,423, filed Mar. 14, 2011. Both applications are incorporated herein in their entirety.

FIELD OF THE INVENTION

The present invention relates to bicycle suspension systems, namely rear suspension systems.

BACKGROUND OF THE INVENTION

A bicycle frame is the main component of a bicycle, on to which wheels and other components are fitted. The great majority of today's rigid-frame bicycles have a frame with upright seating. Such upright bicycles generally feature the diamond frame, a truss consisting of two triangles: the front triangle and the rear triangle. In a conventional diamond frame, the front "triangle" is not actually a triangle because it consists of four tubes: the head tube, top tube, down tube and seat tube. The head tube contains the headset, the set of bearings that allows the front fork (which supports the front wheel) to turn smoothly for steering and balance. The top tube connects the head tube to the seat tube at the top, and the down tube connects the head tube to the bottom bracket. The rear triangle consists of the seat tube and paired chain stays and paired seat stays. The chain stays run essentially parallel to the chain, connecting the bottom bracket to the rear fork ends (which support the rear wheel). The seat stays connect the top of the seat tube (at or near the same point as the top tube) to the rear fork ends.

Many modern bicycles do not utilize a diamond frame, for example because: the frame is constructed in such a way that it does not consist of tubes attached one to another (for example, frames made of composite materials); or the frame involves a rear suspension system permitting rearward components of the bicycle (e.g., the rear wheel) to move relative to other components of the bicycle (e.g., the seat); or both. However, the terms used to describe the members of a conventional diamond frame (being, head tube, top tube, down tube, seat tube, chain stays and seat stays) are often used to describe analogous features on non-diamond frames and are at times so used herein.

Most bicycles use a chain to transmit power to the rear wheel. The drivetrain begins with pedals which rotate the cranks, which are attached to a spindle that rotates within the bottom bracket. With a chaindrive, a chainring attached to a crank drives the chain, which in turn rotates the rear wheel via a rear sprocket. Most chaindrive systems have some form of gearing, typically comprising multiple rear sprockets of different sizes, multiple chainrings of different sizes and user controllable devices (referred to as derailleurs) for moving the chain between rear sprockets and between the chainrings, so as to selectively vary the gear ratio.

A bicycle suspension is the system or systems used to suspend the rider and all or part of the bicycle in order to protect them from the roughness of the terrain over which they travel. Bicycle suspensions are used primarily on mountain bikes, but are also common on hybrid bicycles, and can even be found on some road bicycles. Bicycle suspension can be implemented in a variety of ways, including: front-fork suspension and rear suspension. It is not uncommon for a mountain bike to have front suspension but no rear suspension (such a suspension configuration is often referred to as a hardtail). However, it is uncommon for a mountain bike to have a rear suspension system but no front suspension system. Thus, rear suspension systems on mountain bikes are typically part of a full suspension system.

Suspension systems for mountain bikes first appeared in roughly the early 1990's. Over the ensuing years developers and users of mountain bike suspension systems recognized a variety of factors affecting suspension performance and general riding performance of suspension system, which factors are interrelated in dynamic and complex ways. It was soon realized that the fact that bicycles are powered by human effort means that effects on the drive train caused by suspension system movement that would, in the case of engine driven vehicles, be minor or unnoticeable, are significant in bicycles. Early full suspension frames were heavy and tended to bounce up and down while a rider pedaled. This movement was called pedal bob, kickback, or monkey motion and reduced the efficiency of, or interfered with, a rider's pedal stroke—especially during climbs up steep hills. Input from hard braking efforts often also negatively affected the performance of early full suspension designs. When a rider hit the brakes (which often occurs in terrain situations in which the rear suspension is needed most), some early suspension designs tended to extend the shock (known as brake jack), causing a stiffening of the suspension, which tends to not allow the suspension to react to bumps very well. Some suspension designs exhibit brake squat, where braking forces tend to compress the suspension. This effect, in moderation, can be beneficial to counteract the normal forward weight transfer caused by braking.

In the field of bicycle suspension systems, the following terms are generally used as follows:

Travel refers to how much movement a suspension mechanism allows. It usually measures how much the wheel axle moves.

Bob and squat refer to how a suspension, usually rear, responds to rider pedalling. Squat usually refers to how the rear suspension compresses under acceleration, and bob refers to repeated squat and rebound with each pedal stroke. Both are undesirable characteristics as they rob power from pedalling.

Pedal feedback or chainstay lengthening refers to torque applied to the crankset by the chain caused by motion of the rear axle relative to the bottom bracket. Pedal feedback is caused by an increase in the distance between the chainring and rear sprocket, and it can be felt by the rider as a torque on the crankset in the rotational direction opposite to forward pedalling.

Preload refers to the force applied to spring component before external loads, such as rider weight, are applied. The amount of preload necessary depends on the rider weight and the parameters of the spring components. More preload makes the suspension sag less and less preload makes the suspension sag more. Adjusting preload affects the ride height of the suspension.

Rebound refers to the rate at which a suspension component returns to its original configuration after absorbing a shock. The term also generally refers to rebound damping or rebound damping adjustments on shocks, which vary the rebound speed. More rebound damping will cause the shock to return at a slower rate.

Sag refers to how much a suspension moves under just the static load of the rider. Sag is often used as one parameter when tuning a suspension for a rider. Spring preload is adjusted until the desired amount of sag is measured.

Lockout refers to a mechanism to disable a suspension mechanism to render it substantially rigid. This may be desirable during climbing or sprinting to prevent the suspension from absorbing power applied by the rider. Some lockout mechanisms also feature a "blow off" system that deactivates the lockout when an appropriate force is applied to help prevent damage to the shock and rider injury under high unexpected loads.

Compression damping refers to systems that slow the rate of compression in a front fork shock or rear shock. Compression damping is usually accomplished by forcing a hydraulic fluid (such as oil) through a valve when the shock becomes loaded. The amount of damping is determined by the resistance through the valve, a higher amount of damping resulting from greater resistance in the valve. Many shocks have compression damping adjustments which vary the resistance in the valve. Often, lockouts function by allowing no hydraulic fluid to flow through the compression damping valve.

Unsprung mass is the mass of the portions of bicycles that is not supported by the suspension systems.

Numerous bicycle systems and variations of same are known. For example, as described in the following US patents:

U.S. Pat. No. 4,789,174, Suspension Bicycle, Lawwill, 6 Dec. 1988;
U.S. Pat. No. 5,121,937, Suspension Bicycle, Lawwill, 16 Jun. 1992;
U.S. Pat. No. 5,205,575, Cycle Rear Suspension System, Buell et al., 27 Apr. 1993;
U.S. Pat. No. 5,244,224, Rocker Arm Rear Suspension Bicycle, Busby, 14 Sep. 1993;
U.S. Pat. No. 5,441,292, Bicycle Rear Suspension System, Busby, 15 Aug. 1995;
U.S. Pat. No. 5,509,679, Rear Suspension For Bicycles, Leitner, 23 Apr. 1996;
U.S. Pat. No. 5,553,881, Bicycle Rear Suspension System, Klassen et al., 10 Sep. 1996;
U.S. Pat. No. 5,628,524, Bicycle Wheel Travel Path For Selectively Applying Chainstay Lengthening Effect And Apparatus For Providing Same, Klassen et al., 13 May 1997;
U.S. Pat. No. 5,899,480, Rear Suspension For Bicycles, Leitner, 4 May 1999;
U.S. Pat. No. 6,099,010, Bicycle With Crank Assembly Suspension System, Busby, 8 Aug. 2000;
U.S. Pat. No. 6,206,397, Bicycle Wheel Travel Path For Selectively Applying Chainstay Lengthening Effect And Apparatus For Providing Same, Klassen et al., 27 Mar. 2001;
U.S. Pat. No. 6,843,494, Rear Suspension System For Two-Wheeled Vehicles, Particularly Bicycles, Lam, 18 Jan. 2005;
U.S. Pat. No. 6,969,081, Bicycle Rear Suspension, Whyte, 29 Nov. 2005;
U.S. Pat. No. 7,048,292, Bicycle Suspension Systems, Weagle, 23 May 2006;
U.S. Pat. No. 7,066,481, Bicycle Rear Suspension, Soucek, 27 Jun. 2006;
U.S. Pat. No. 7,100,930, Bicycle Rear Suspension System, Saiki, 5 Sep. 2006;
U.S. Pat. No. 7,128,329, Vehicle Suspension Systems, Weagle, 31 Oct. 2006;
U.S. Pat. No. 7,240,912, Bicycle Rear Suspension, Whyte, 10 Jul. 2007;
U.S. Pat. No. 7,296,815, Bicycle Suspension Apparatus and Related Method, Ellsworth et al., 20 Nov. 2007;
U.S. Pat. No. 7,392,999, Bicycle With Rear Suspension, O'Connor, 1 Jul. 2008;
U.S. Pat. No. 7,494,146, Bicycle Frame, Tseng, 24 Feb. 2009;
U.S. Pat. No. 7,556,276, Bicycle Rear Wheel Suspension Chassis, Dunlap, 7 Jul. 2009;
U.S. Pat. No. 7,581,743, Bicycle Rear Wheel Suspension System With Controlled Variable Shock Rate, Graney, 1 Sep. 2009;
U.S. Pat. No. 7,635,141, Bicycle Rear Suspension System, O'Connor, 22 Dec. 2009;
U.S. Pat. No. 7,658,394, Rear Suspension Systems For Bicycles, Huang, 9 Feb. 2010;
U.S. Pat. No. 7,712,757, Suspension For Mountain Bicycles, Berthold, 11 May 2010;
U.S. Pat. No. 7,717,212, Vehicle Suspension Systems For Separated Acceleration Responses, Weagle, 18 May 2010;
U.S. Pat. No. 7,828,314, Vehicle Suspension Systems, Weagle, 9 Nov. 2010; and
U.S. Pat. No. 7,934,739, Bicycle Rear Suspension, Domahidy, 3 May 2011.

Further examples of bicycle systems and variations of same are described in the following US patent applications:

U.S. 2005/0057018, Bicycle Rear Suspension System, Saiki, 17 Mar. 2005;
U.S. 2008/0054595, Bicycle Frame With A Counter-Rotating Four Bar Linkage System; Lu, 6 Mar. 2008;
U.S. 2008/0067772, Vehicle Suspension Systems For Separated Acceleration Responses, Weagle, 20 Mar. 2008;
U.S. 2008/0217882, Two-Wheeled Vehicle With Rear Suspension, Beaulieu et al., 11 Sep. 2008;
U.S. 2008/0252040, Bicycle Rear Wheel Suspension System, Colegrove et al., 16 Oct. 2008;
U.S. 2008/0258425, Rear Fork For Bicycle, Tribotte, 23 Oct. 2008;
U.S. 2008/0277900, Bicycle With A Common Pivot Shock Absorber, I, 13 Nov. 2008;
U.S. 2009/0026728, Bicycle Rear Suspension, Domahidy, 29 Jan. 2009;
U.S. 2009/0072512, Bicycle Rear Suspension System, Earle, 19 Mar. 2009;
U.S. 2009/0261556, Bicycle Rear Suspension System Linkage, Beale, 22 Oct. 2009;
U.S. 2009/0283986, Rear Fork, Falke, 19 Nov. 2009;
U.S. 2010/0007113, Rear Suspension System For Bicycles, Earle et al., 14 Jan. 2010;
U.S. 2010/0059965, Bicycle Suspension System Employing Highly Predictable Pedalling Characteristics, Earle, 11 Mar. 2010;
U.S. 2010/0102531, Bicycle Rear Suspension System With Controlled Variable Shock Rate, Graney, 29 Apr. 2010;
U.S. 2010/0127473, Suspension Bicycle Derailleur Link, Cocalis et. al., 27 May 2010;
U.S. 2010/0156066, Mountain Bicycle Having Improved Frame Geometry, O'Connor, 24 Jun. 2010;
U.S. 2010/0327556, Bicycle Assembly With Rear Shock, Chamberlain, 30 Dec. 2010; and
U.S. 2011/0115181, Vehicle Suspension Systems, Weagle, 19 May 2011;

SUMMARY OF THE INVENTION

In one aspect, the present invention includes a three-component rear-wheel suspension system for interconnecting to a bicycle frame and a shock absorbing device. The three components are an upper stay pivotally attached to the frame, a lower stay having a rear wheel mount and pivotally connected to the upper stay at a location generally above the rear wheel mount, and a link pivotally connected to the frame at a location below where the upper stay is attached to the frame and pivotally coupled to the lower stay. The general arrangement of the linkages between the three components permit compression of the suspension system (i.e. relative upward movement of the rear wheel) with limited chainstay lengthening.

In another aspect, the present invention includes, a suspension system for attaching a rear wheel with a rear wheel axis of rotation, to a bicycle having a bicycle frame having a bottom bracket with a bottom bracket axis of rotation, so as to permit relative movement as between the rear wheel and the bicycle frame, the suspension system having: a seat stay member configured for pivotal attachment to a bicycle frame; a chain stay member having: a mount suitable for receiving a rear wheel axle, a couple for pivotally coupling to the seat stay member at a location upward of the rear wheel axis of rotation, and a frame-ward end; a frame-ward end movement control device for supporting the frame-ward end relative to the bicycle frame and for defining a path of permitted movement of the frame-ward end relative to the bicycle frame; a shock absorber device directly or indirectly interconnected between two of the seat stay member, the chain stay member, the frame-ward end movement control device and the bicycle frame, for resiliently impeding relative movement of the components from an at-rest position.

The location of the pivot axis of the couple for pivotally coupling to the seat stay member may be at an angle measured at the rear wheel axis of rotation from an imaginary line extending forward from the rear wheel axis of rotation parallel to an imaginary flat surface supporting both wheels of the bicycle with the bicycle not loaded, wherein the angle is about 45 degrees to about 135 degrees. The angle may be about 45 degrees to about 100 degrees. The angle may be about 45 degrees to about 78 degrees. The location of the pivot axis of the couple for pivotally coupling to the seat stay member may be at a radial distance from the rear wheel axis of rotation of about 30 mm to about 200 mm. The radial distance may be about 50 mm to about 150 mm.

The seat stay member may be configured for pivotal attachment to a bicycle frame with the pivotal axis of the pivotal attachment located, in terms of an X,Y coordinate system with the X axis parallel to an imaginary flat surface supporting both wheels of the bicycle with the bicycle not loaded and with the intersection of the X axis and Y axis aligned with the bottom bracket axis of rotation, with X between about −100 mm and about 190 mm, and Y between about 10 mm and 160 mm. The pivotal axis of the pivotal attachment may be located with X between about −80 mm and about 150 mm, and Y between about 40 mm and about 100 mm.

The seat stay member may be configured for pivotal attachment to a bicycle frame with the pivotal axis of the pivotal attachment located, in terms of an X,Y coordinate system with the X axis parallel to an imaginary flat surface supporting both wheels of the bicycle with the bicycle not loaded and with the intersection of the X axis and Y axis aligned with the bottom bracket axis of rotation, with X between a negative value of X in millimeters so as to provide clearance between the rear wheel and pivotal attachment, and about 190 mm, and Y between about 10 mm and 160 mm.

The seat stay member may be configured for pivotal attachment to a bicycle frame with the pivotal axis of the pivotal attachment to the bicycle frame and the pivotal axis of the couple for pivotally coupling to the seat stay member are located such that an imaginary line passing through the axes is oriented so as to continue to the near vicinity of the top of a selected chainring.

The frame-ward end movement control device may be a link member configured for a pivotal attachment to the bicycle frame and for a pivotal coupling to the frame-ward end.

In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the location of the pivot axis of the pivotal attachment to the bicycle frame is with X between about −90 mm and about 120 mm, and Y between about −60 mm and about 120 mm; and the location of the pivot axis of the pivotal coupling to the frame-ward end is with X between about −90 mm and about 40 mm and Y between about −110 mm and about 70 mm.

In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the location of the pivot axis of the pivotal attachment to the bicycle frame is with X between about −90 mm and about 80 mm and Y between about −90 mm and about 80 mm; and the location of the pivot axis of the pivotal coupling to the frame-ward end is with X between about −65 and about 100 mm, and Y between about −75 mm and about 75 mm.

The shock absorber device may be interconnected between the seat stay member and the bicycle frame.

In another aspect, the present invention includes a bicycle a suspension system as set out above.

SUMMARY OF THE DRAWINGS

FIG. 51 is a schematic right-side elevation view of an embodiment of the present invention having a link with the link in the counter-clockwise pivoting configuration, shown in the un-loaded "at rest" position.

FIG. 52 is a schematic right-side elevation view of the embodiment of FIG. 51, shown in a compressed position.

DETAILED DESCRIPTION WITH REFERENCE TO THE DRAWINGS

Figure 1:
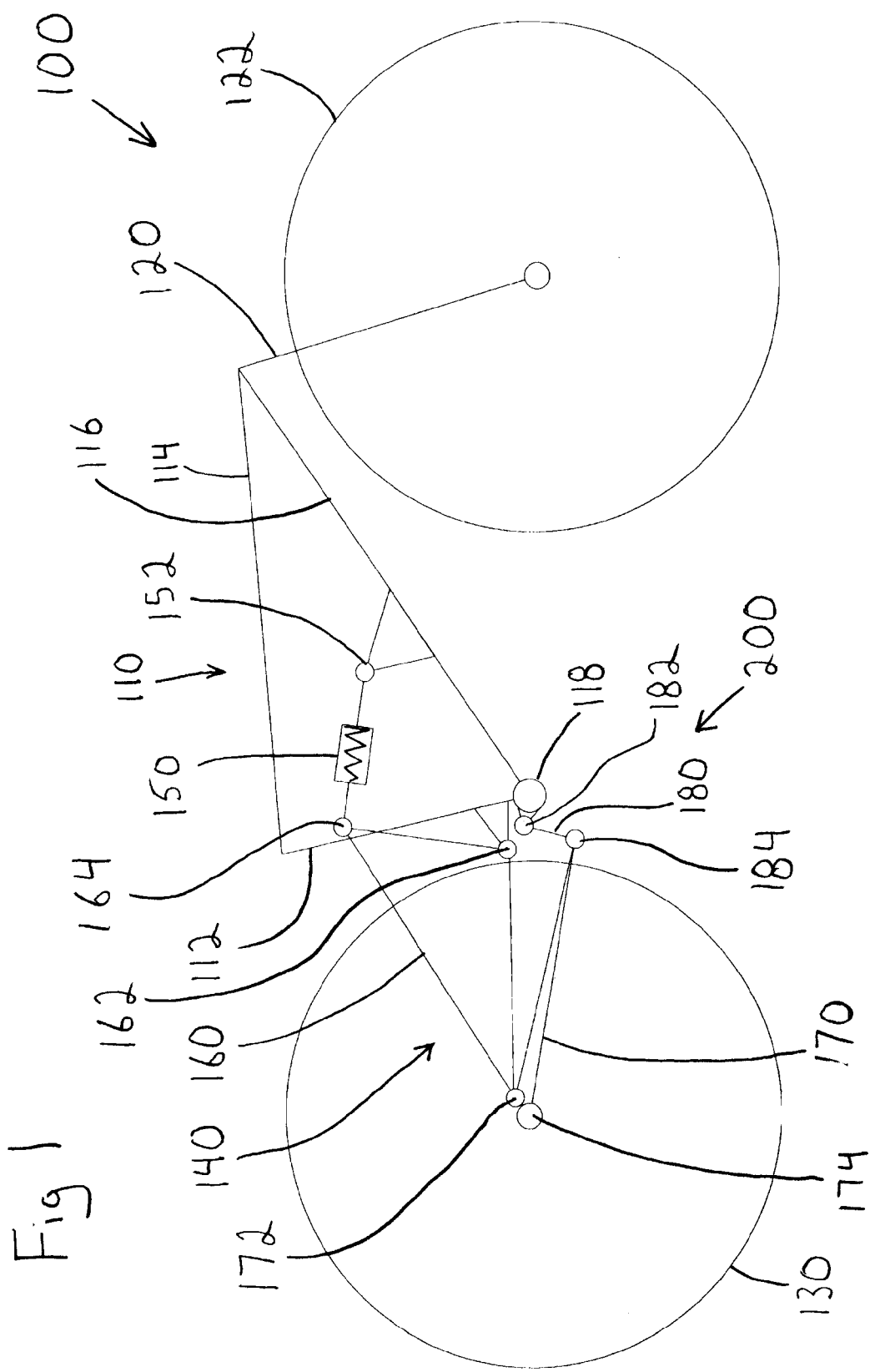
FIGS. 1-16 are schematic right-side elevation views of embodiments of the present invention having links with the links in the clockwise pivoting configuration.

In the drawings, bicycle embodiments of the present invention are shown viewed from the right side. Related to this, movement of components is generally described herein as if viewed from the right side of the bicycle, for example, pivotal movement is at times described as "clockwise" or "counter-clockwise".

In the drawings, the schematic representations of the bicycle embodiments of the present invention show conventional bicycle features in a simplified manner that for current purposes ignores the possible variations in configurations and details of these features. For example, the schematic drawings do not indicate a feature corresponding to a head tube. Further, it is well known that modern materials permit frame configurations considerably different from the simple "triangle" composed of tubes, suggested by the schematic representations.

In the drawings, there is shown a bicycle 100 including a frame 110. The frame 110 is schematically represented as having a seat tube 112, a top tube 114 and a down tube 116. A bottom bracket 118 is located at the juncture of the seat tube 112 and the down tube 116. Mounted to the frame 110 there are front forks 120, to which the front wheel 122 is mounted. The bicycle 100 includes a rear wheel 130, attached to the frame 110 via a rear suspension system 140 embodiment of the present invention.

The rear suspension system 140 includes: a shock absorber 150, mounted at its proximal end to the frame 110 at the frame-shock mount 152; a seat stay member 160, pivotally mounted to the frame 110 at the seat stay-frame pivot 162 and coupled to the shock absorber 150 at the seat stay-shock couple 164; a chain stay member 170, coupled to the seat stay member 160 at the seat stay-chain stay couple 172 and including a rear axle mount 174 at which the rear wheel 130 is attached; and a link 180, pivotally mounted to the frame 110 at the link-frame pivot 182 and coupled to the chain stay member 170 at the link-chain stay couple 184.

In general terms the embodiments of the present invention shown in the drawings include two configurations for the link 180: a clockwise pivoting configuration 200 (as shown for example in FIG. 1) in which the link 180 pivots relative to the frame 110 in a clockwise direction as the suspension is compressed; and a counter-clockwise pivoting configuration 210 (as shown for example in FIG. 17) in which the link 180 pivots relative to the frame 110 in a counter-clockwise direction as the suspension is compressed.

The present invention encompasses many different configurations and embodiments.

The following approaches are used herein for providing numerical information for the position of components and pivots/couples with respect to a typical bicycle wheel size (i.e., 26" wheels) with the bicycle not loaded (i.e., with the suspension system at its uncompressed "at-rest" position) and with a flat surface supporting both wheels of the bicycle:

1. an X,Y coordinate system with the X axis parallel to the flat surface, with the intersection of the X axis and Y axis aligned with the axis of rotation within the bottom bracket, and with the units in millimeters; and
2. a combination of radial distances and angles, with the radial distances in millimeters from the axis of rotation of the rear wheel, and the angles as at the axis of rotation of the rear wheel measured from a line extending forward from the axis of rotation of the rear wheel parallel to the flat surface.

In what follows, negative X values for the pivot locations are generally bounded by the radius of the rear wheel 130. However, it is understood that it may be possible to have pivot and couple locations that intrude into the radius of the rear wheel. For example, the seat stay-frame pivot 162 could be defined by two aligned components, one on each side of the rear wheel 130.

For a clockwise pivoting configuration 200: the link-frame pivot 182 may be located with X between about −90 and 120 mm and Y between about −60 and 120 mm; and the link-chain stay couple 184 may be located with X between about −90 and 40 mm and Y between about −110 and 70 mm.

For a counter-clockwise pivoting configuration 210: the link-frame pivot 182 may be located with X between about −90 and 80 mm and Y between about −90 and 80 mm; and the link-chain stay couple 184 may be located with X between about −65 and 100 mm and Y between about −75 and 75 mm.

For either the clockwise pivoting configuration 200 or the counter-clockwise pivoting configuration 210:

1. the seat stay-frame pivot 162 may be located with X between about −100 and 190 mm and Y between about 10 and 160 mm; and more preferably with X between about −80 and 150 mm and Y between about 40 and 100 mm; and
2. the seat stay-chain stay couple 172 may be located at a radial distance of from about 30 and 200 mm or more preferably from about 50 and 150 mm; and at an angle of from about 45 degrees to 135 degrees, or more preferably from about 45 degrees to 100 degrees, or more preferably from about 45 to 78 degrees.

It is understood that locating the seat stay-chain stay couple 172 at an angle of about 78 degrees produces the greatest reduction in chainstay lengthening, but this angle may not be ideal for any particular configuration in view of other design considerations. For example, as a general rule, the closer the angle of the location of the seat stay-chain stay couple 172 is to 45 degrees, the smaller the "triangle" defined by the seat stay-chain stay couple 172, the rear axle mount 174 and the link-chain stay couple 184 may be, and thus the smaller (and thus the lighter or the less flexible) the chain stay member 170 may be. Similar considerations apply with respect to the size, weight and flexibility, of the seat stay member 160.

FIGS. 1-16 show examples of the clockwise pivoting configuration 200 in which the link-frame pivot 182 is located with X at about −36 mm and Y at about 10 mm; and the link-chain stay couple 184 is located with X at about −67 mm and Y at about −65 mm.

In FIG. 1, the seat stay-frame pivot 162 is located with X at about −70 mm and Y at about 28 mm; and the seat stay-chain stay couple 172 at about 45 degrees and about 30 mm.

Figure 2:
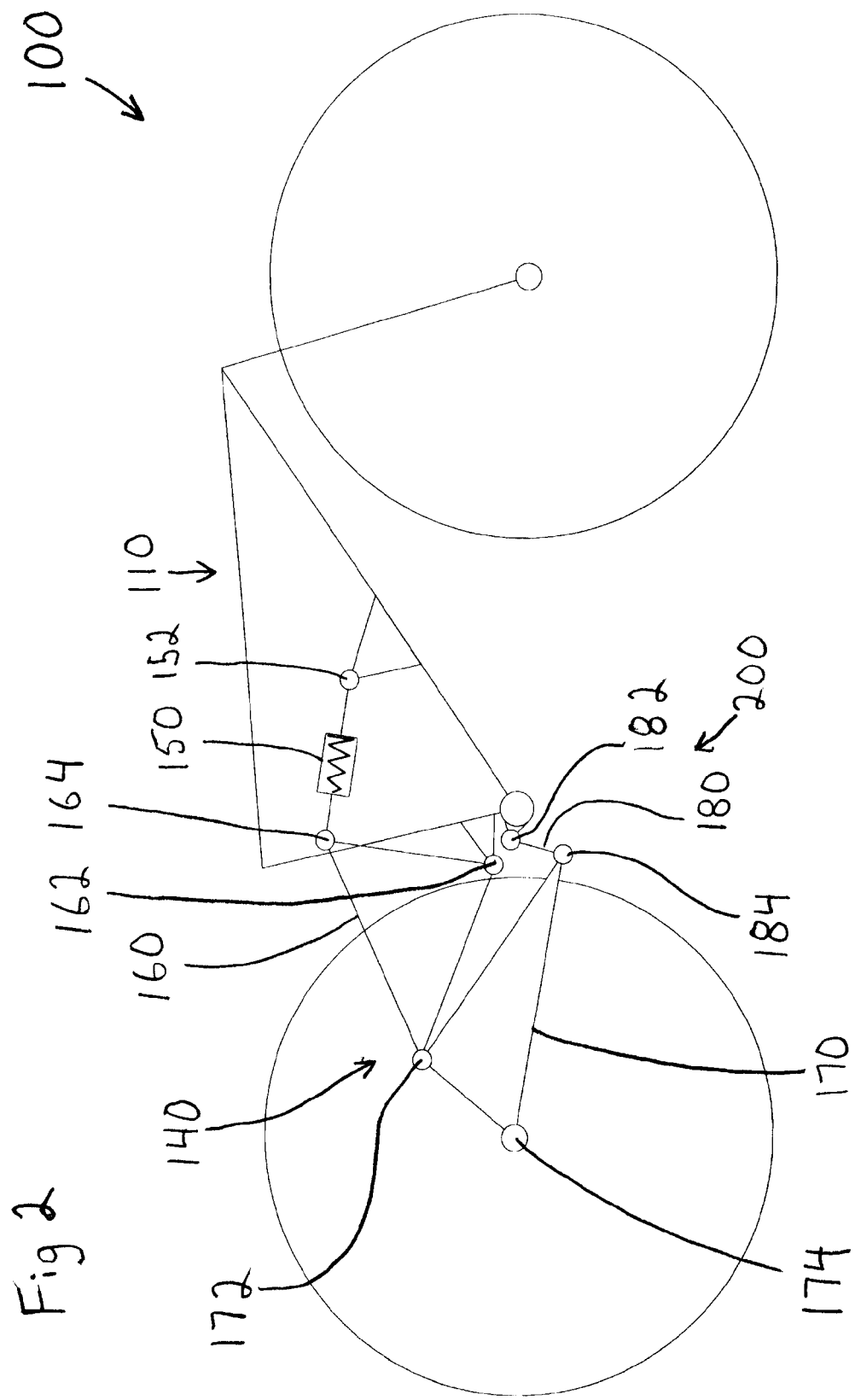

In FIG. 2, the seat stay-frame pivot 162 is located with X at about −70 mm and Y at about 28 mm; and the seat stay-chain stay couple 172 at about 45 degrees and about 150 mm.

Figure 3:
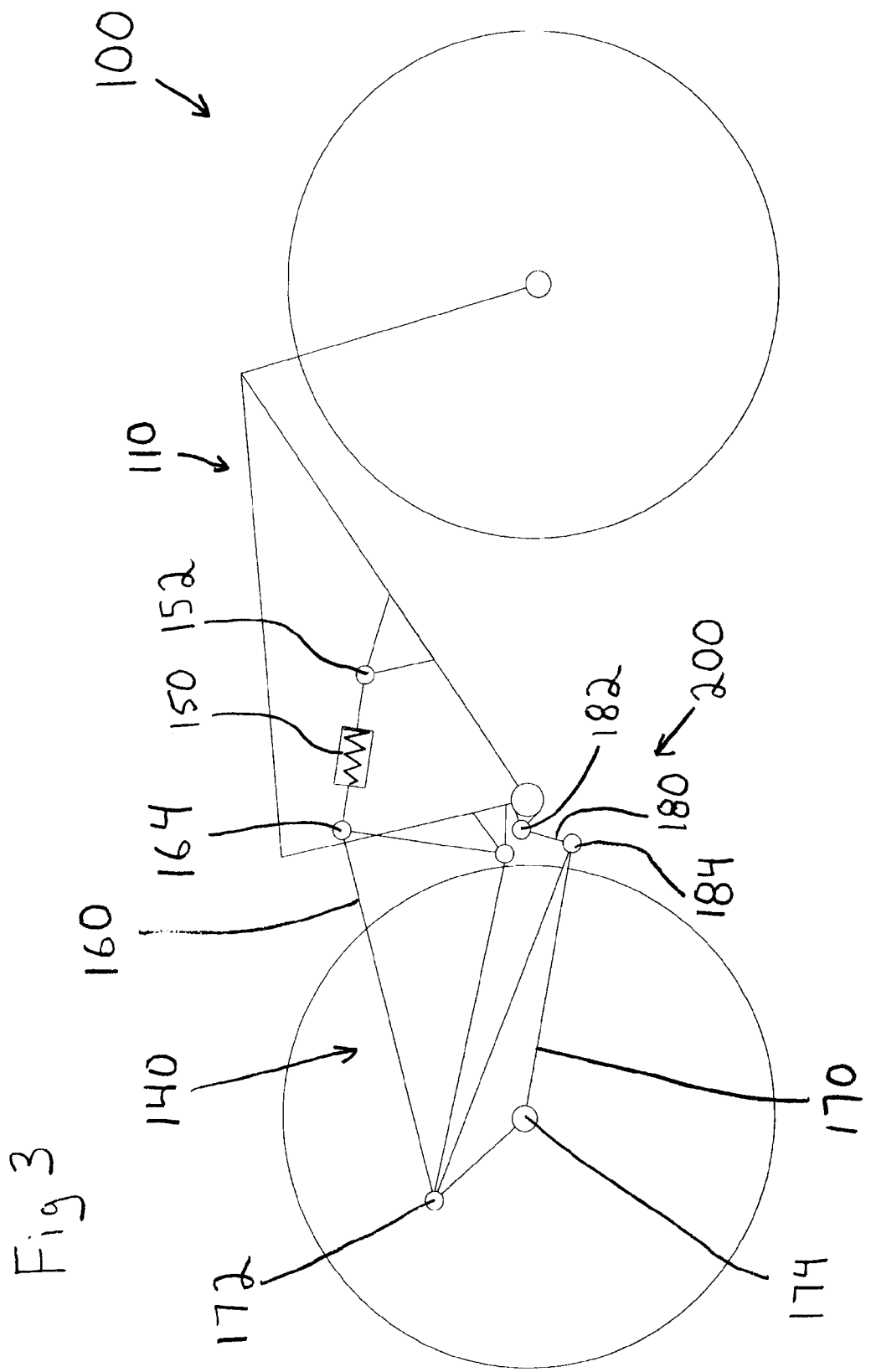

In FIG. 3, the seat stay-frame pivot 162 is located with X at about −70 mm and Y at about 28 mm, and the seat stay-chain stay couple 172 at about 135 degrees and about 150 mm.

Figure 4:
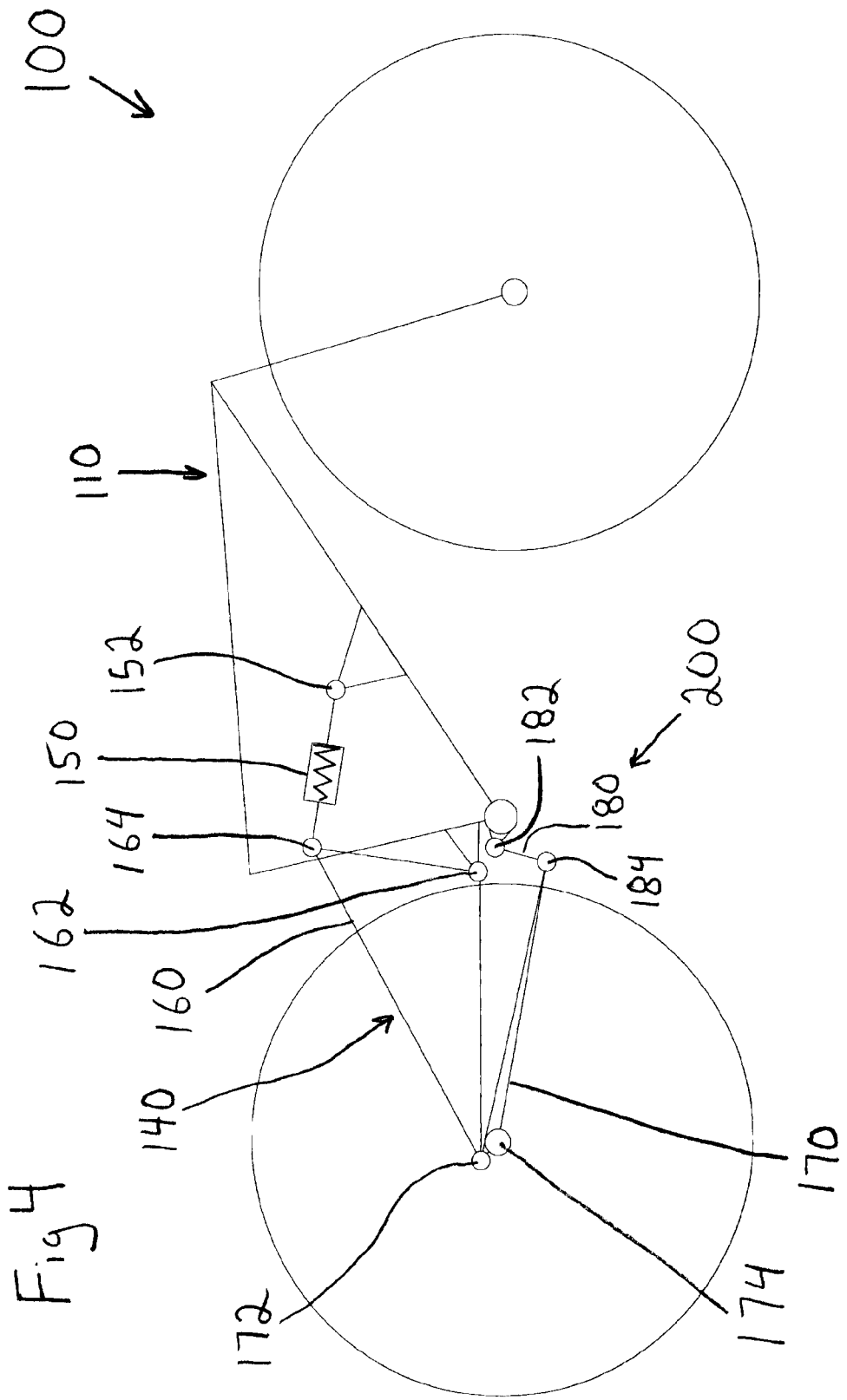

In FIG. 4, the seat stay-frame pivot 162 is located with X at about −70 mm and Y at about 28 mm, and the seat stay-chain stay couple 172 at about 135 degrees and about 30 mm.

Figure 5:
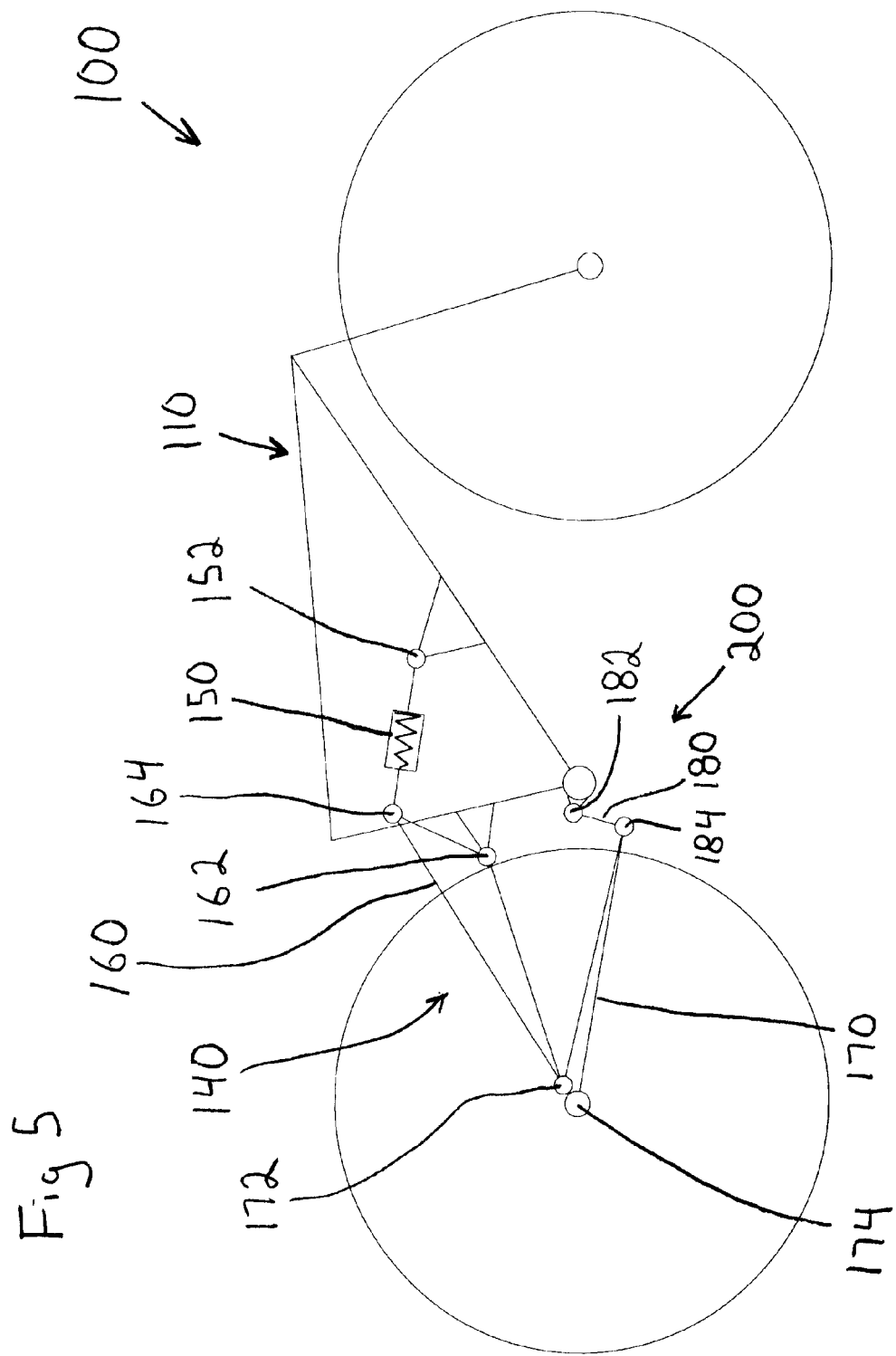

In FIG. 5, the seat stay-frame pivot 162 is located with X at about −90 mm and Y at about 125 mm, and the seat stay-chain stay couple 172 at about 45 degrees and about 30 mm.

Figure 6:
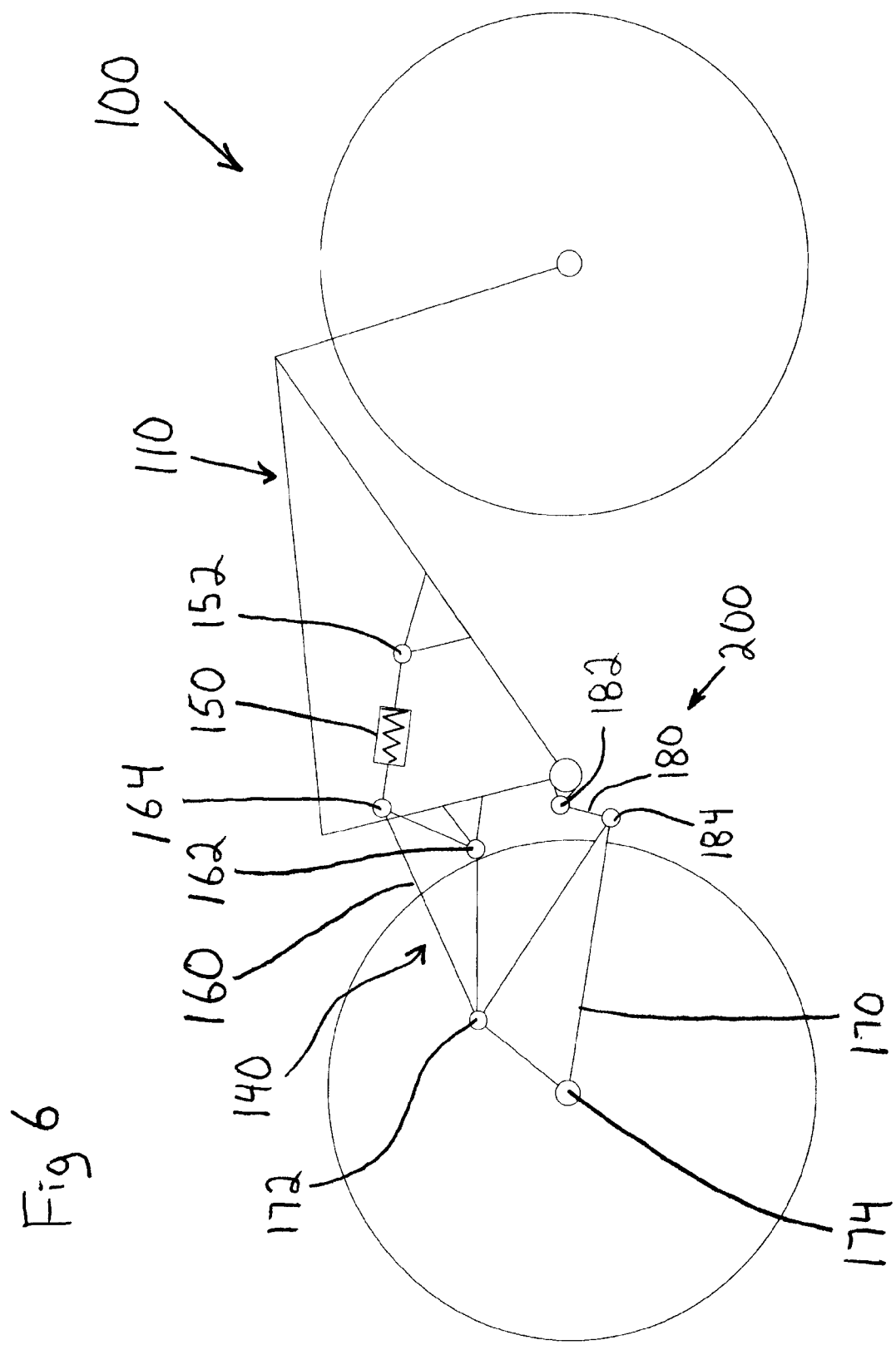

In FIG. 6, the seat stay-frame pivot 162 is located with X at about −90 mm and Y at about 125 mm, and the seat stay-chain stay couple 172 at about 45 degrees and about 150 mm.

Figure 7:
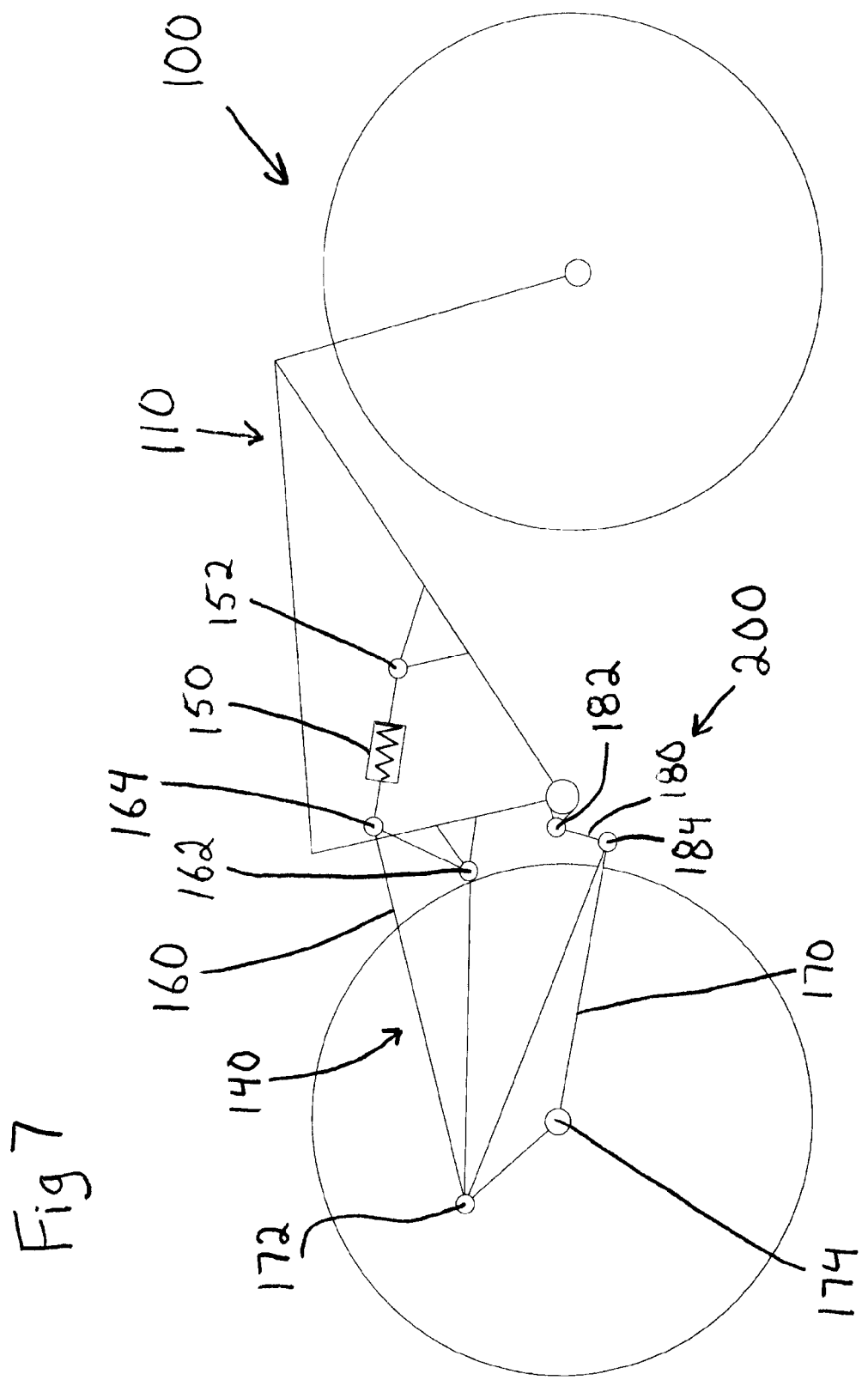

In FIG. 7, the seat stay-frame pivot 162 is located with X at about −90 mm and Y at about 125 mm, and the seat stay-chain stay couple 172 at about 135 degrees and about 150 mm.

Figure 8:
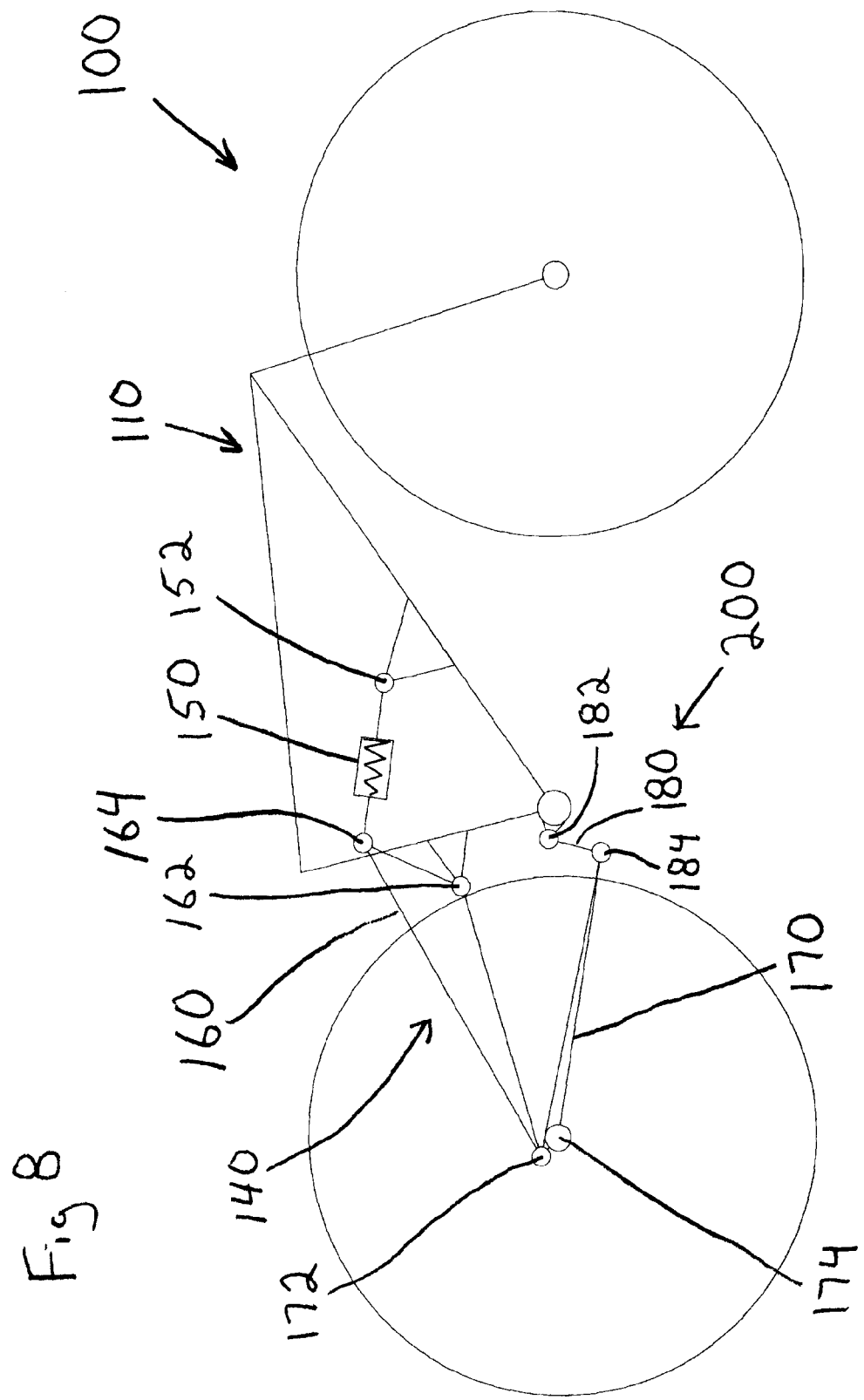

In FIG. 8, the seat stay-frame pivot 162 is located with X at about −90 mm and Y at about 125 mm, and the seat stay-chain stay couple 172 at about 135 degrees and about 30 mm.

Figure 9:
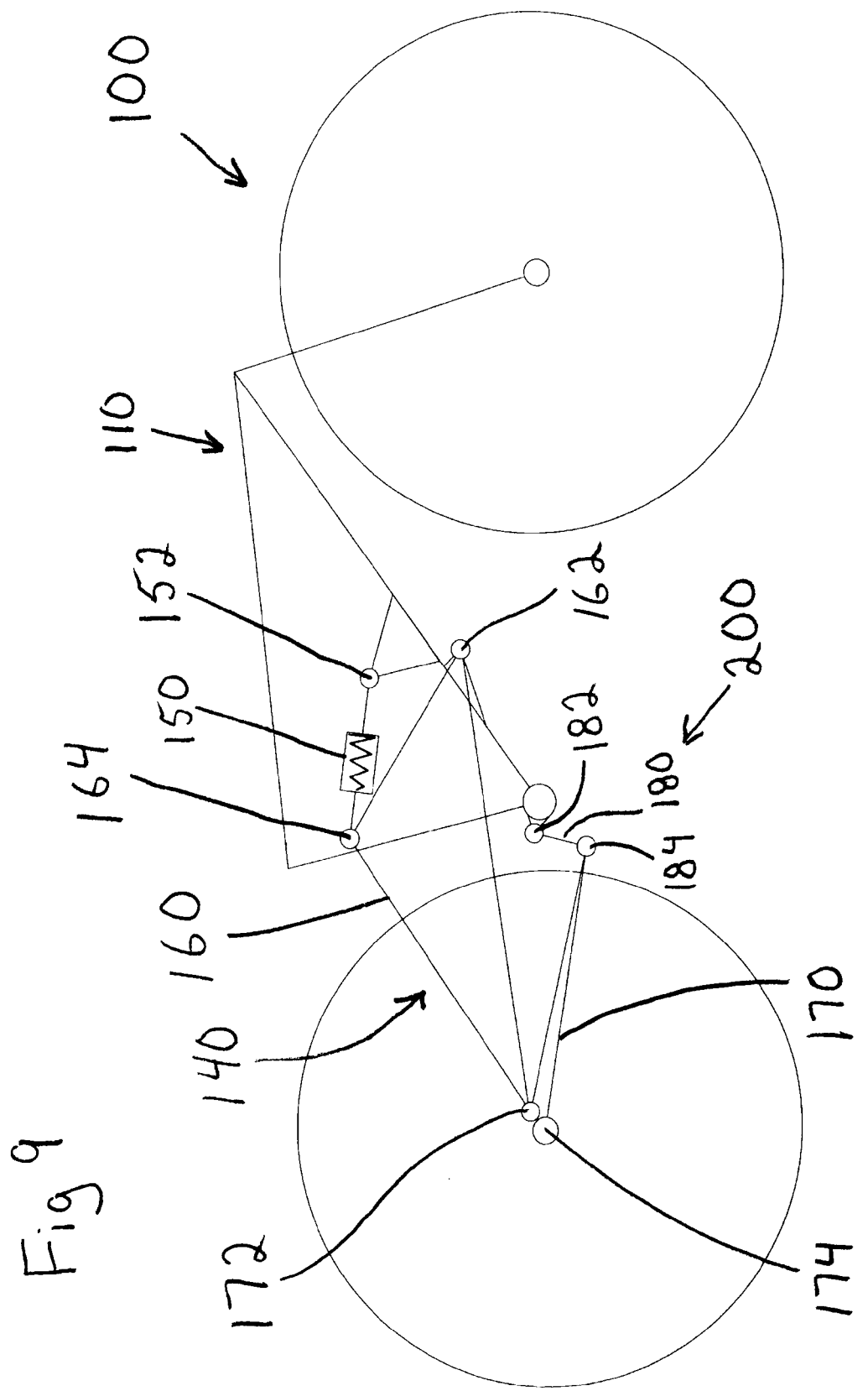

In FIG. 9, the seat stay-frame pivot 162 is located with X at about 150 mm and Y at about 115 mm, and the seat stay-chain stay couple 172 at about 45 degrees and about 30 mm.

Figure 10:
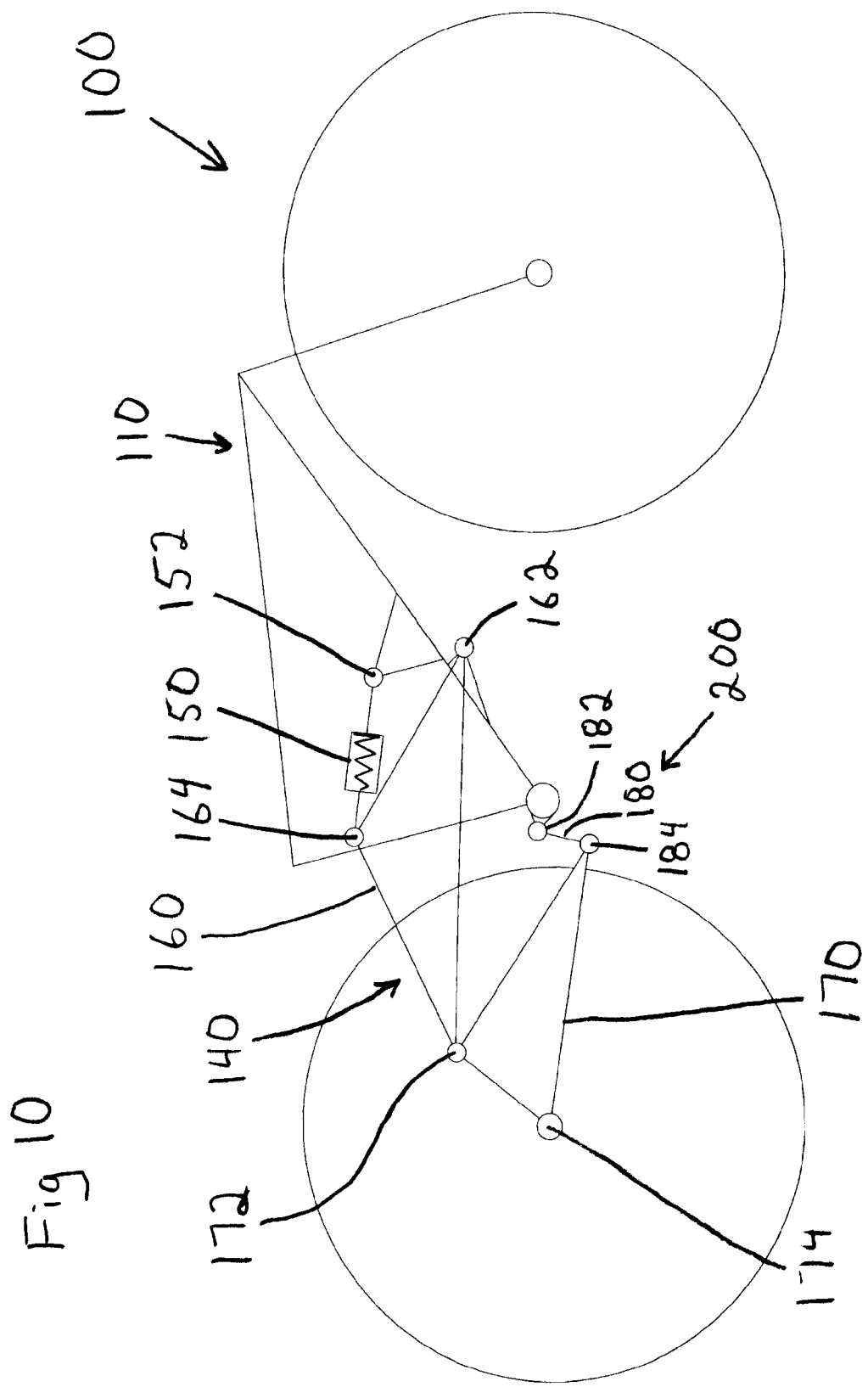

In FIG. 10, the seat stay-frame pivot 162 is located with X at about 150 mm and Y at about 115 mm, and the seat stay-chain stay couple 172 at about 45 degrees and about 150 mm.

Figure 11:
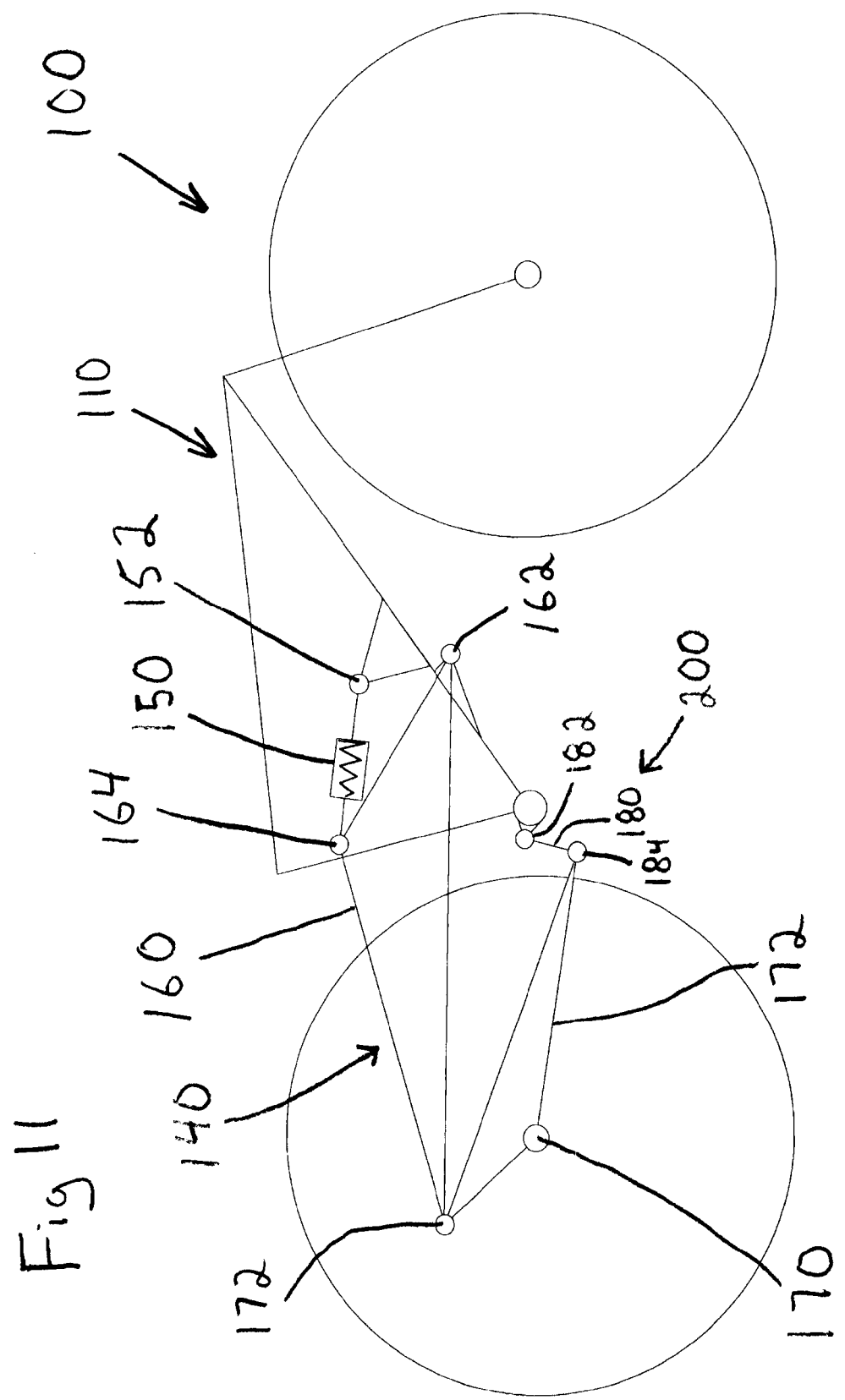

In FIG. 11, the seat stay-frame pivot 162 is located with X at about 150 mm and Y at about 115 mm, and the seat stay-chain stay couple 172 at about 135 degrees and about 150 mm.

Figure 12:
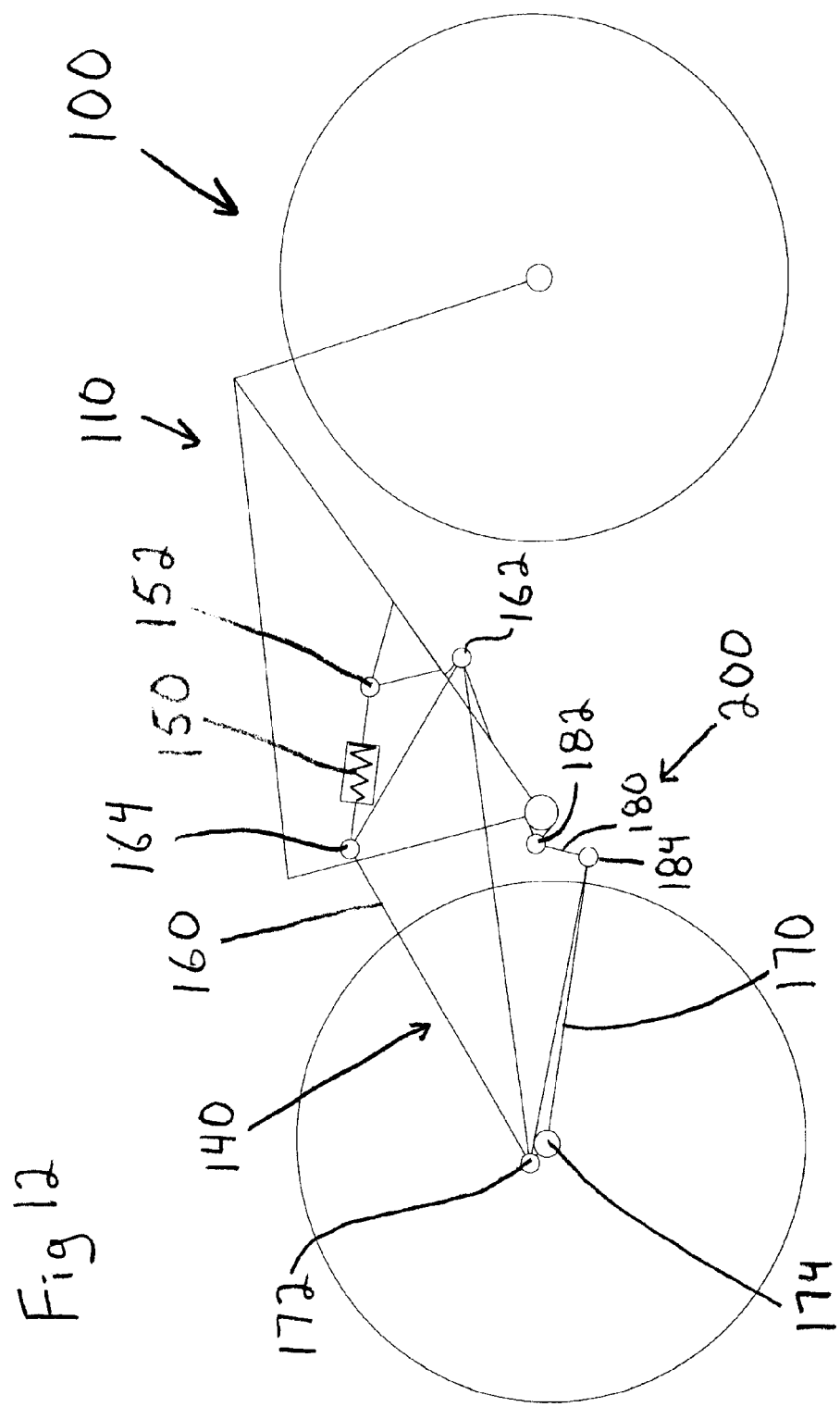

In FIG. 12, the seat stay-frame pivot 162 is located with X at about 150 mm and Y at about 115 mm, and the seat stay-chain stay couple 172 at about 135 degrees and about 30 mm.

Figure 13:
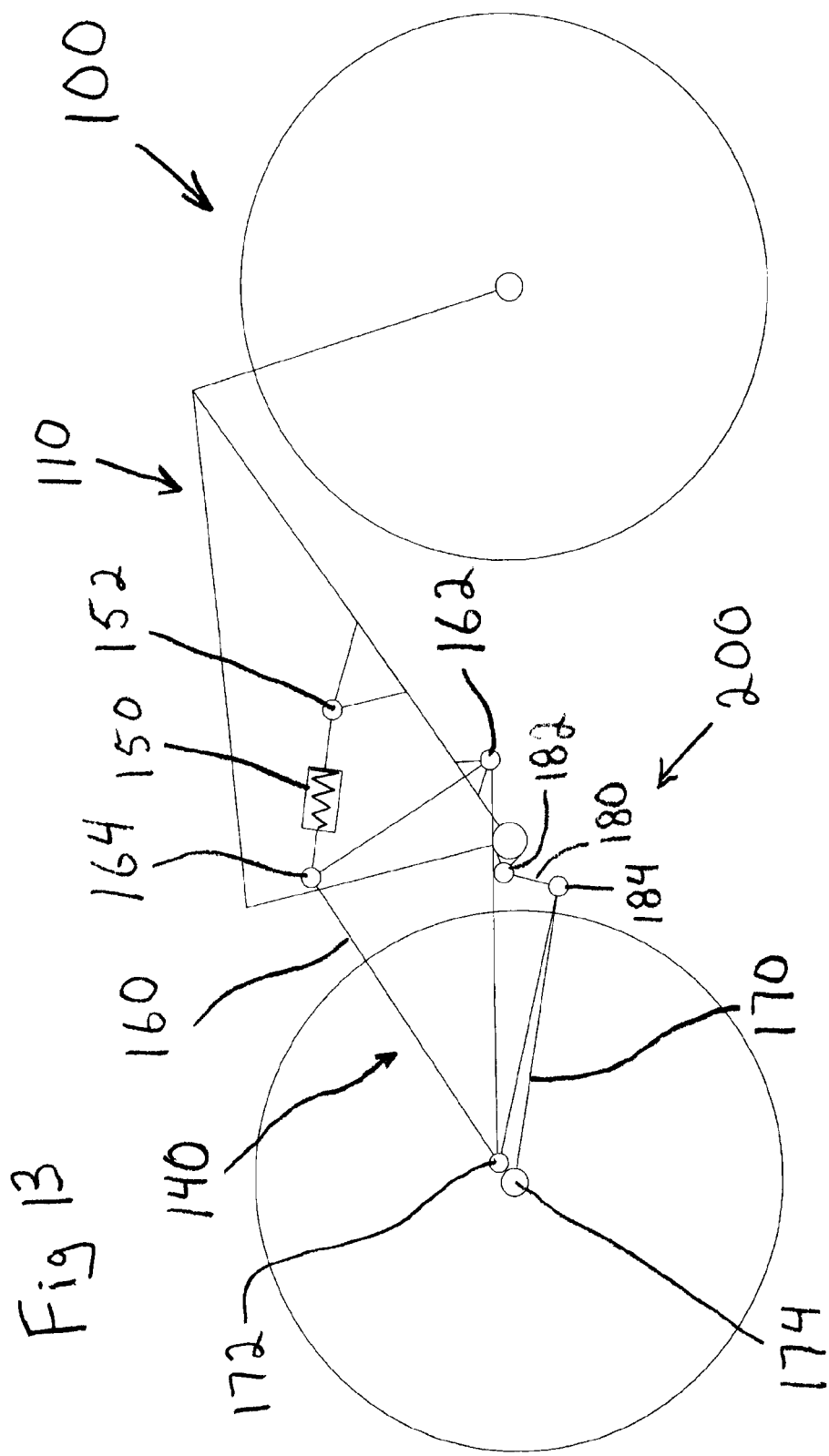

In FIG. 13, the seat stay-frame pivot 162 is located with X at about 85 mm and Y at about 12 mm, and the seat stay-chain stay couple 172 at about 45 degrees and about 30 mm.

Figure 14:
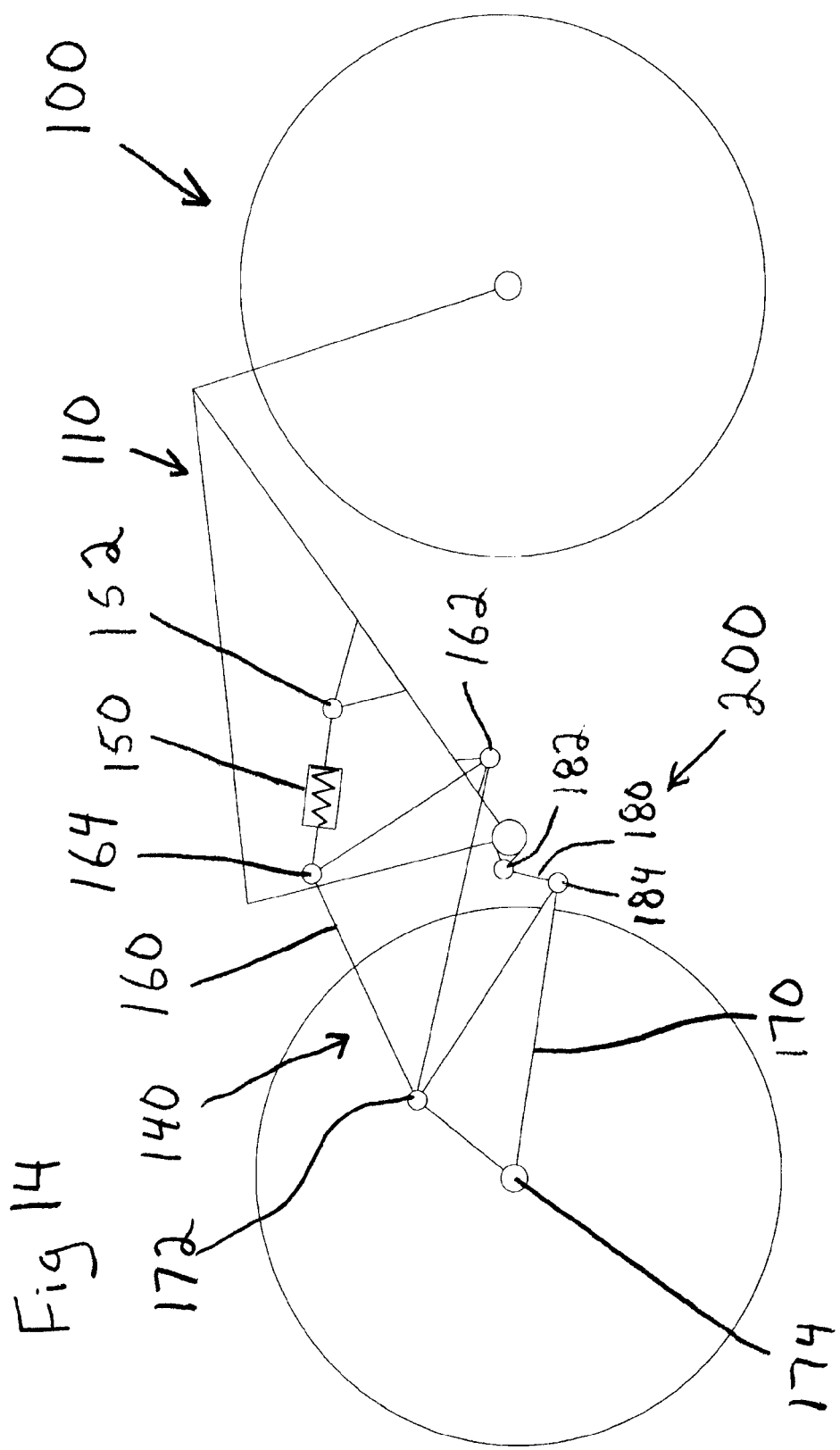

In FIG. 14, the seat stay-frame pivot 162 is located with X at about 85 mm and Y at about 12 mm, and the seat stay-chain stay couple 172 at about 45 degrees and about 150 mm.

Figure 15:
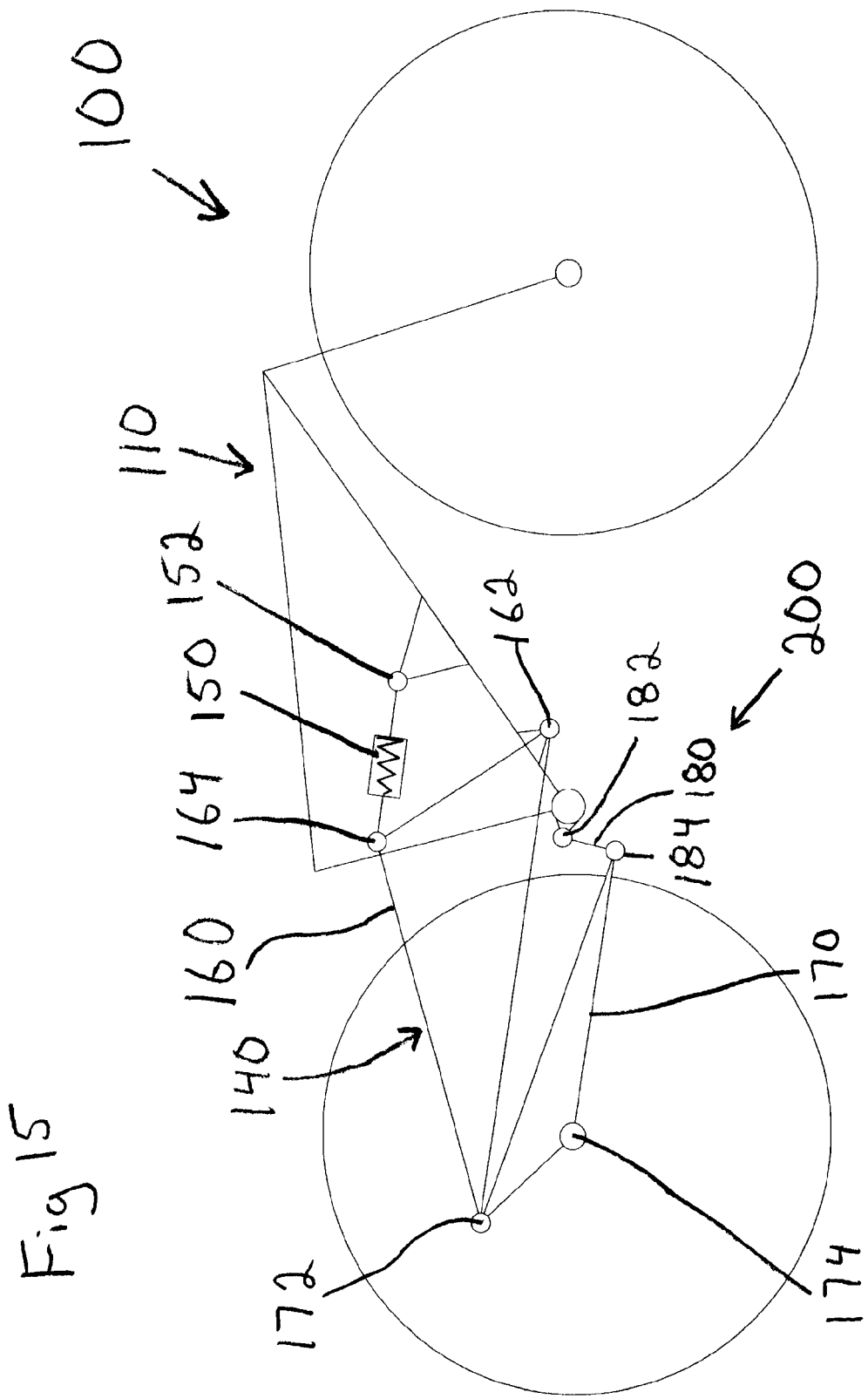

In FIG. 15, the seat stay-frame pivot 162 is located with X at about 85 mm and Y at about 12 mm, and the seat stay-chain stay couple 172 at about 135 degrees and about 150 mm.

Figure 16:
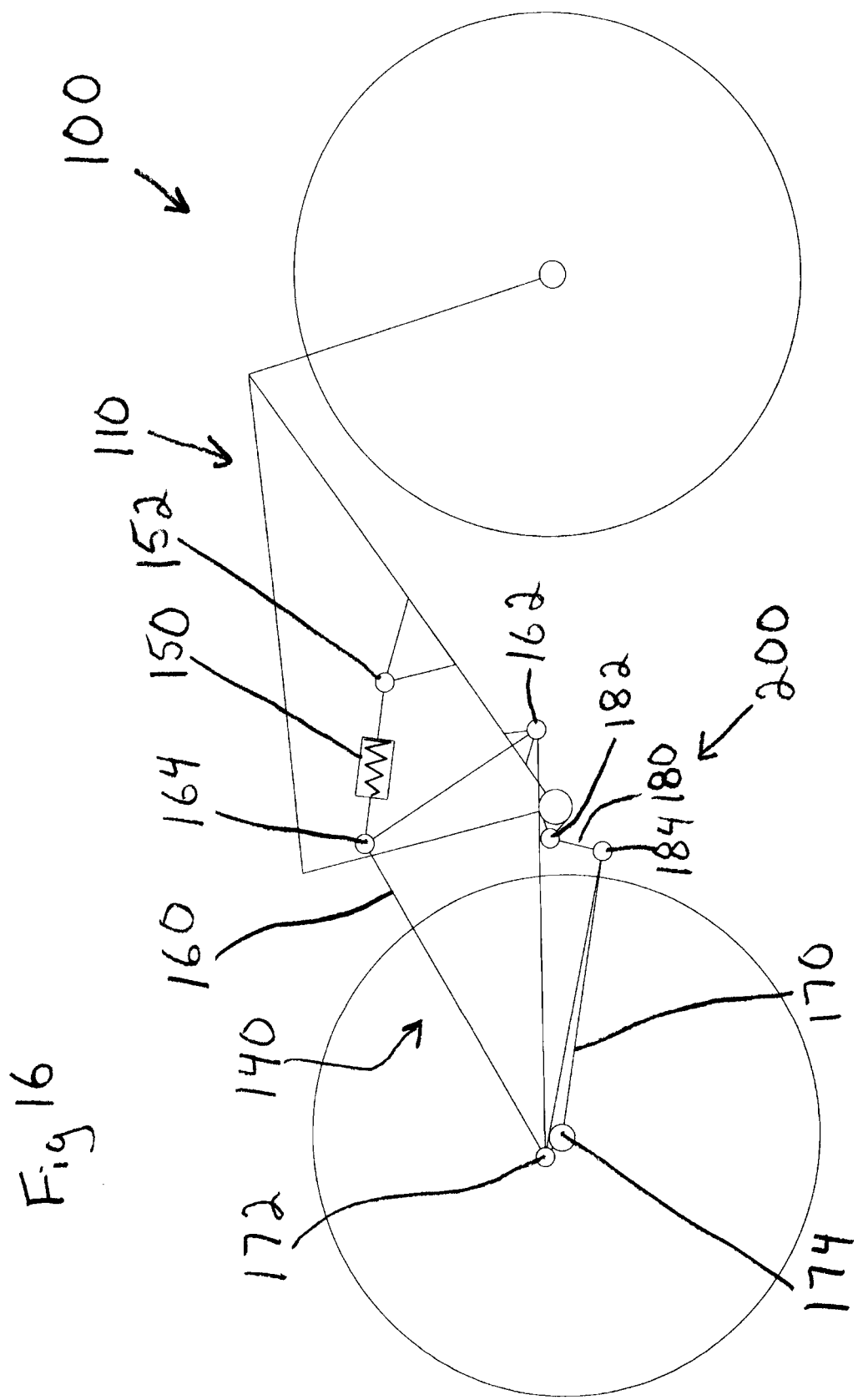

In FIG. 16, the seat stay-frame pivot 162 is located with X at about 85 mm and Y at about 12 mm, and the seat stay-chain stay couple 172 at about 135 degrees and about 30 mm.

FIGS. 17-32 show examples of the counter-clockwise pivoting configuration 210 in which the link-frame pivot 182 is located with X at about −70 mm and Y at about −40 mm; and the link-chain stay couple 184 is located with X at about −30 mm and Y at about 10 mm.

Figure 17:
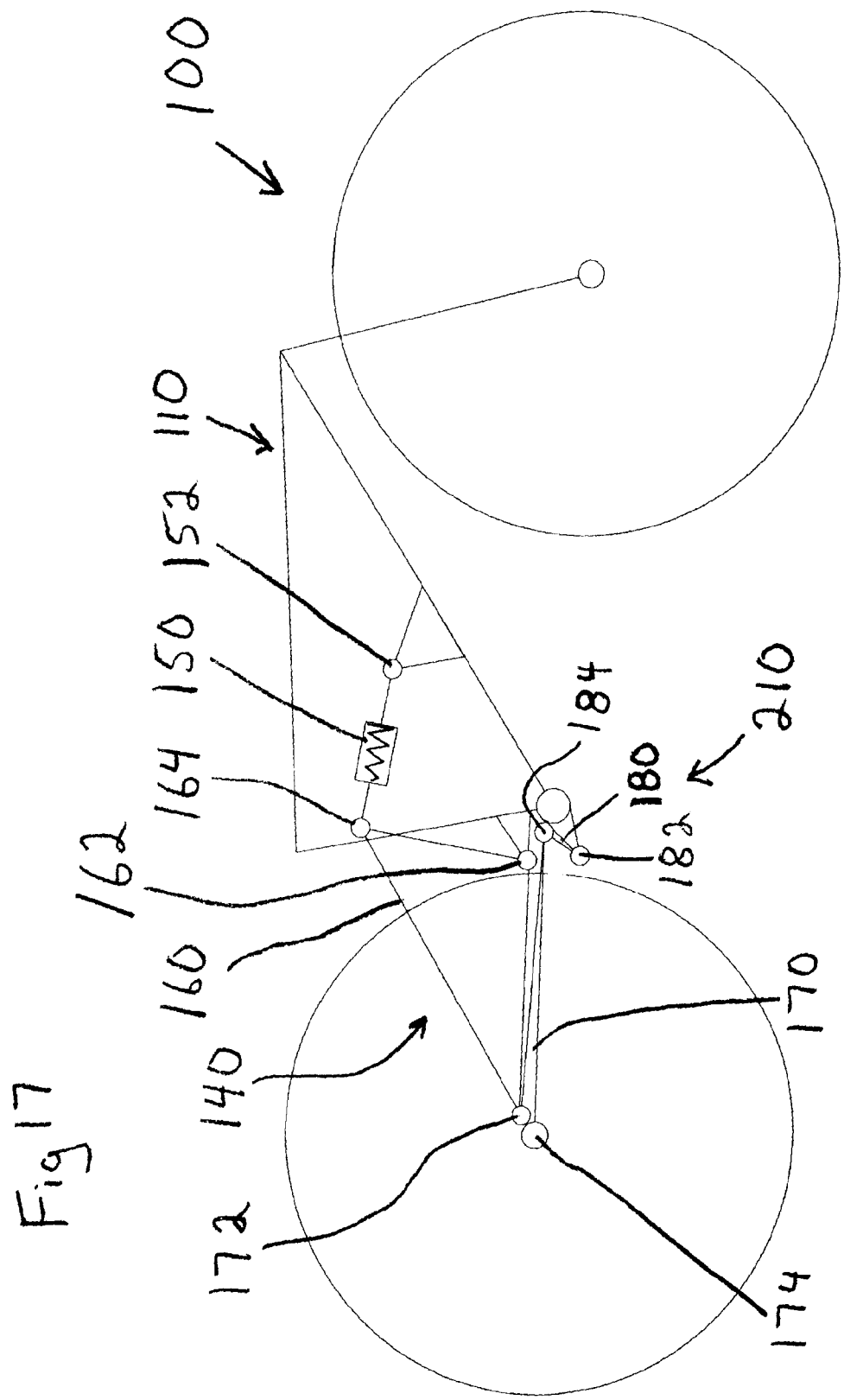
FIGS. 17-48 are schematic right-side elevation views of embodiments of the present invention having links with the links in the counter-clockwise pivoting configuration.

In FIG. 17, the seat stay-frame pivot 162 is located with X at about −70 mm and Y at about 28 mm; and the seat stay-chain stay couple 172 at about 45 degrees and about 30 mm.

Figure 18:
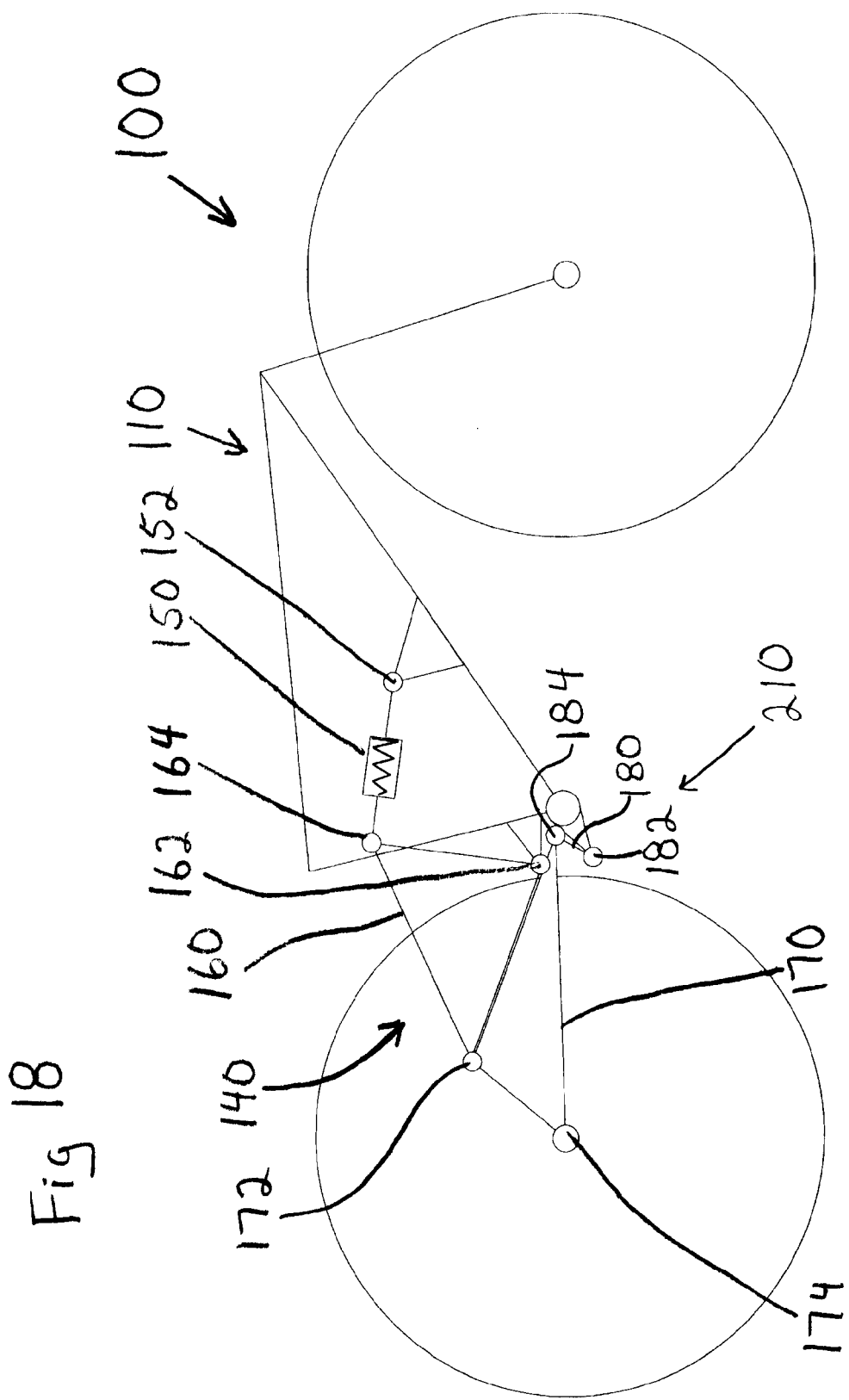

In FIG. 18, the seat stay-frame pivot 162 is located with X at about −70 mm and Y at about 28 mm; and the seat stay-chain stay couple 172 at about 45 degrees and about 150 mm.

Figure 19:
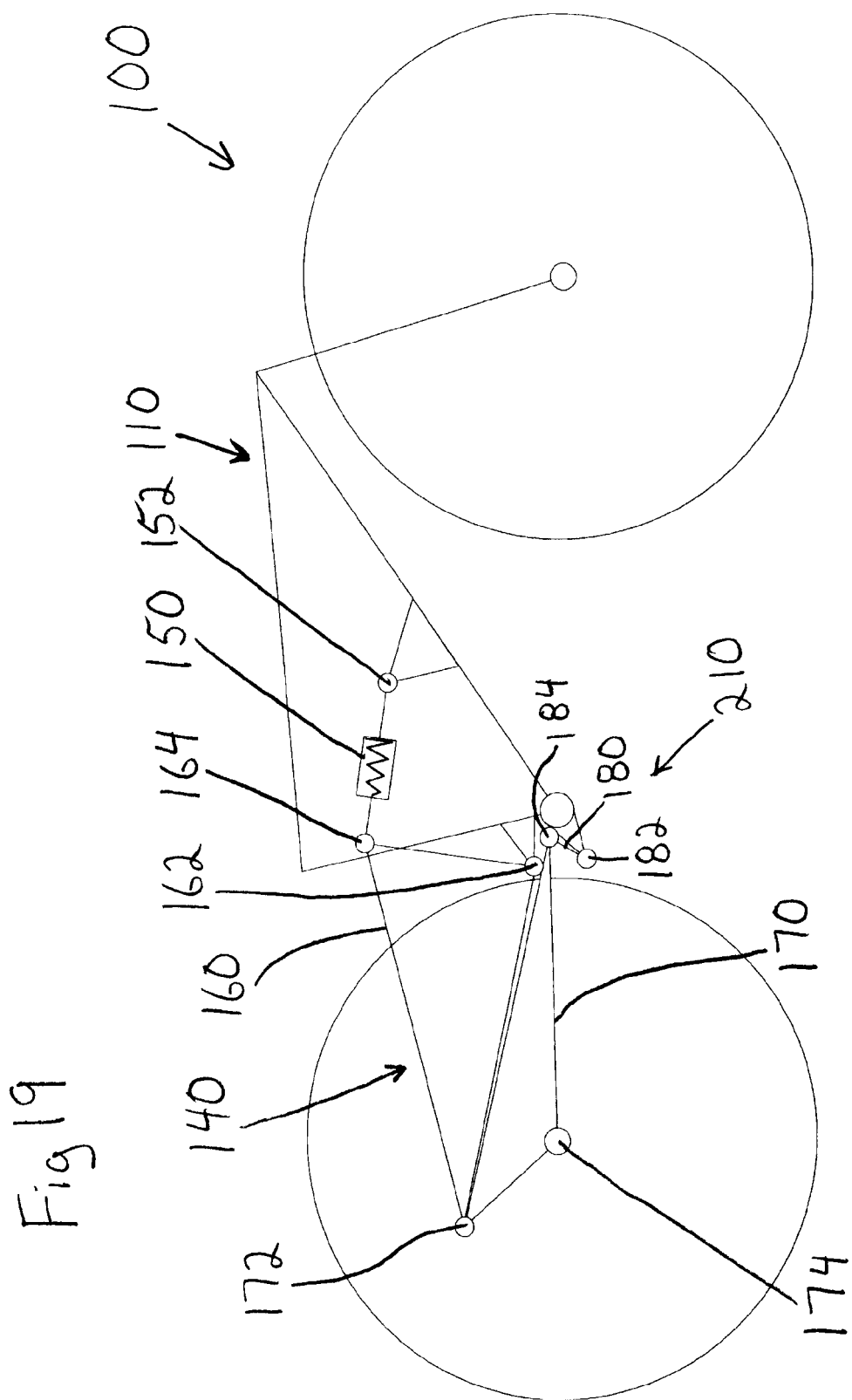

In FIG. 19, the seat stay-frame pivot 162 is located with X at about −70 mm and Y at about 28 mm, and the seat stay-chain stay couple 172 at about 135 degrees and about 150 mm.

Figure 20:
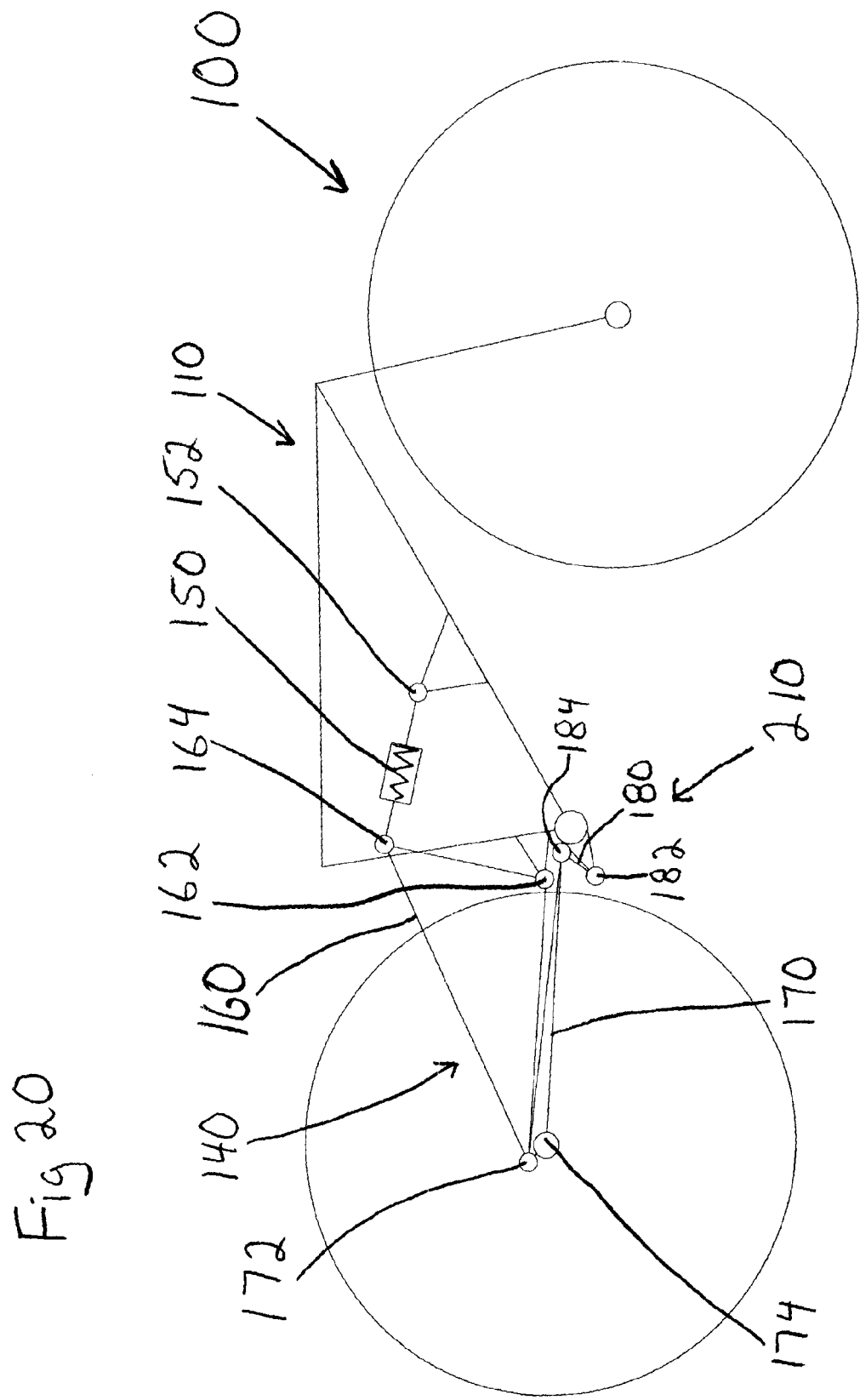

In FIG. 20, the seat stay-frame pivot 162 is located with X at about −70 mm and Y at about 28 mm, and the seat stay-chain stay couple 172 at about 135 degrees and about 30 mm.

Figure 21:
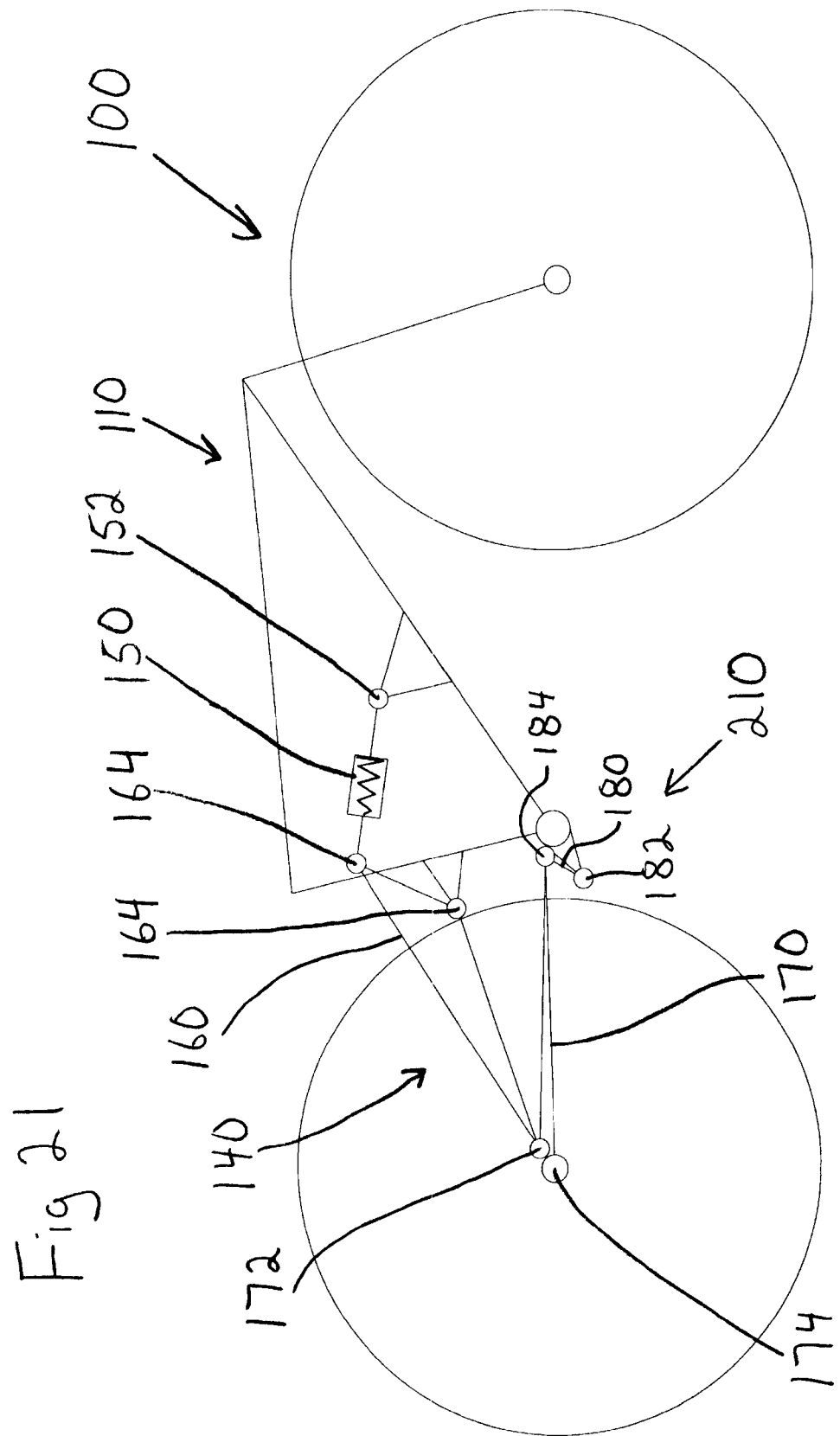

In FIG. 21, the seat stay-frame pivot 162 is located with X at about −90 mm and Y at about 125 mm, and the seat stay-chain stay couple 172 at about 45 degrees and about 30 mm.

Figure 22:
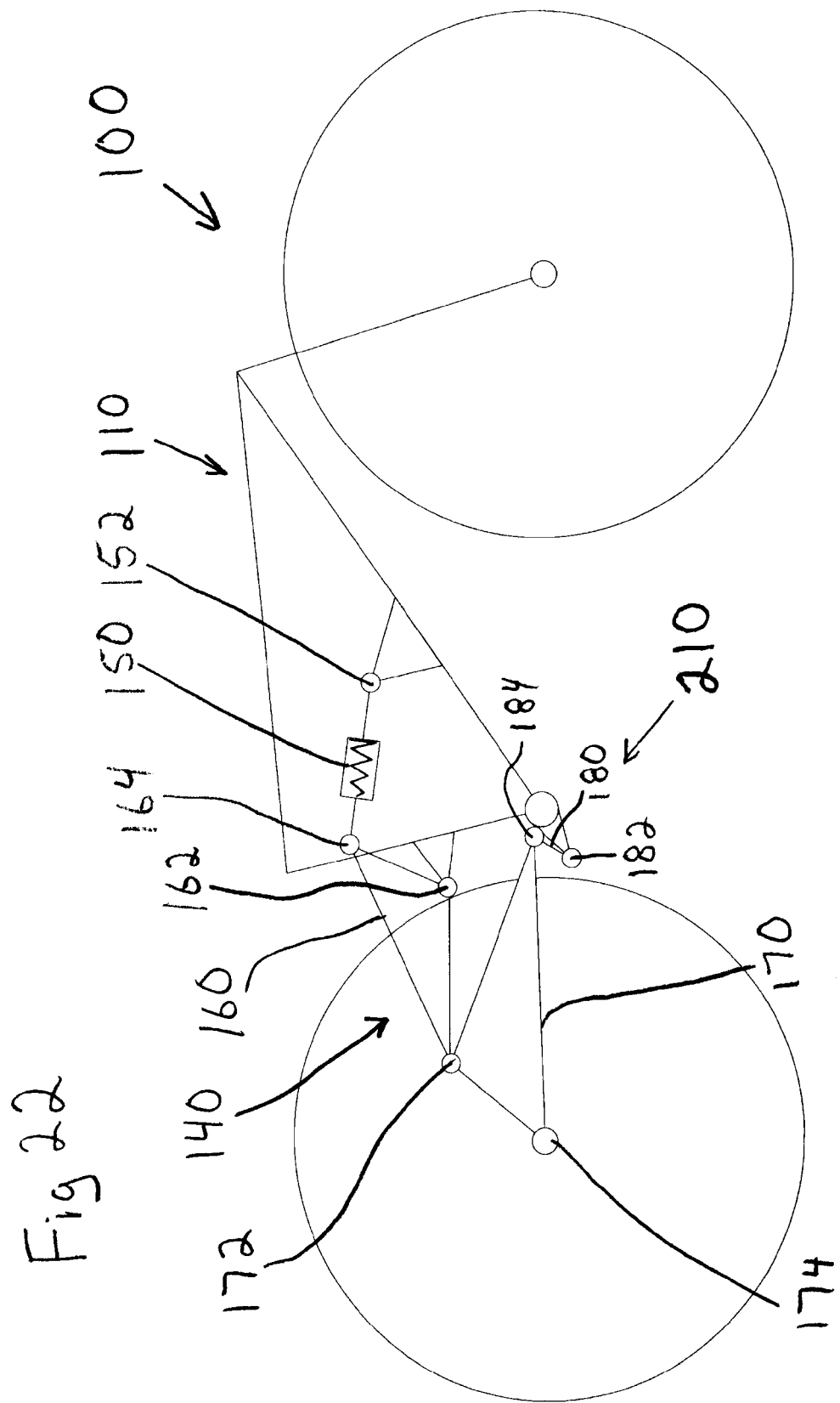

In FIG. 22, the seat stay-frame pivot 162 is located with X at about −90 mm and Y at about 125 mm, and the seat stay-chain stay couple 172 at about 45 degrees and about 150 mm.

Figure 23:
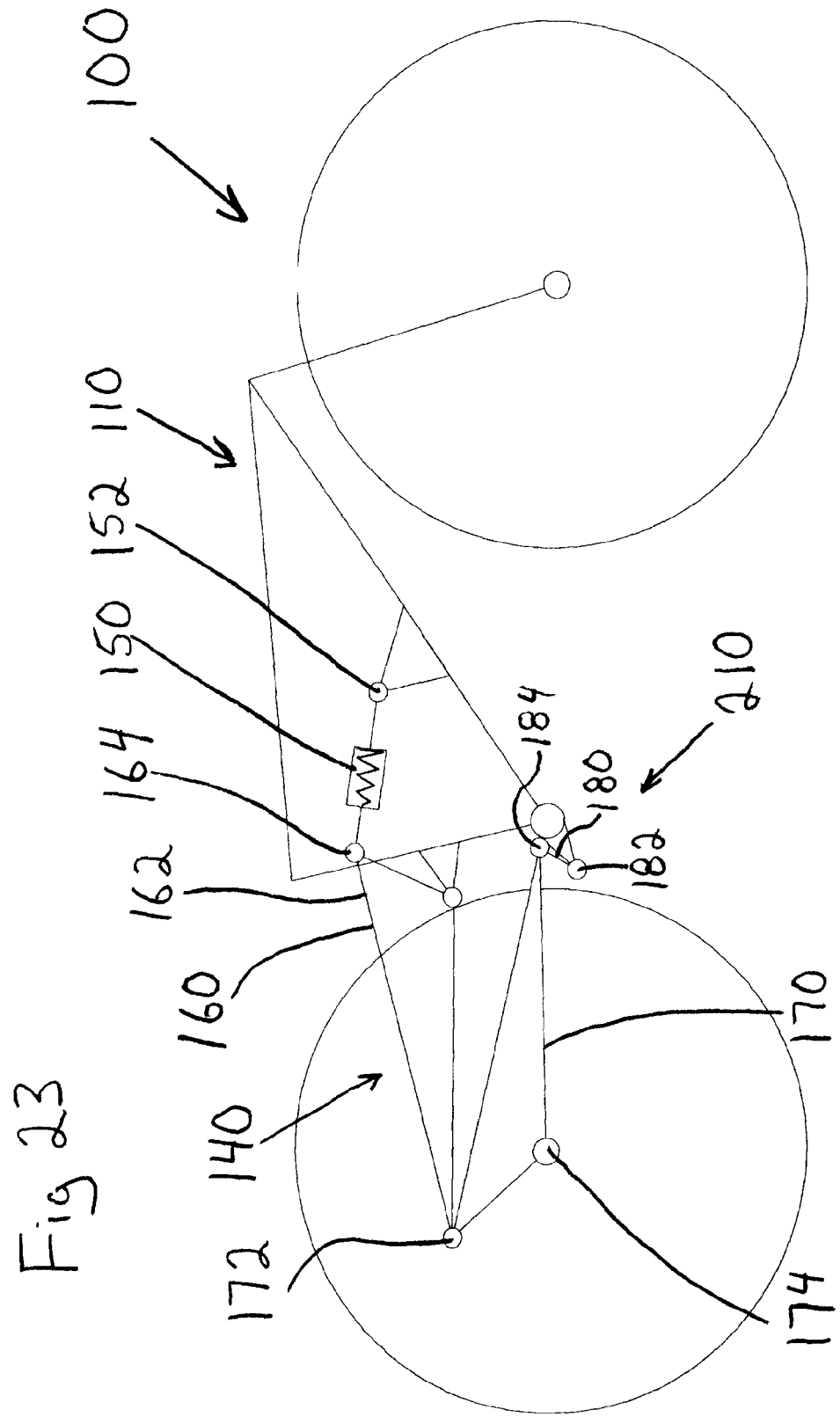

In FIG. 23, the seat stay-frame pivot 162 is located with X at about −90 mm and Y at about 125 mm, and the seat stay-chain stay couple 172 at about 135 degrees and about 150 mm.

Figure 24:
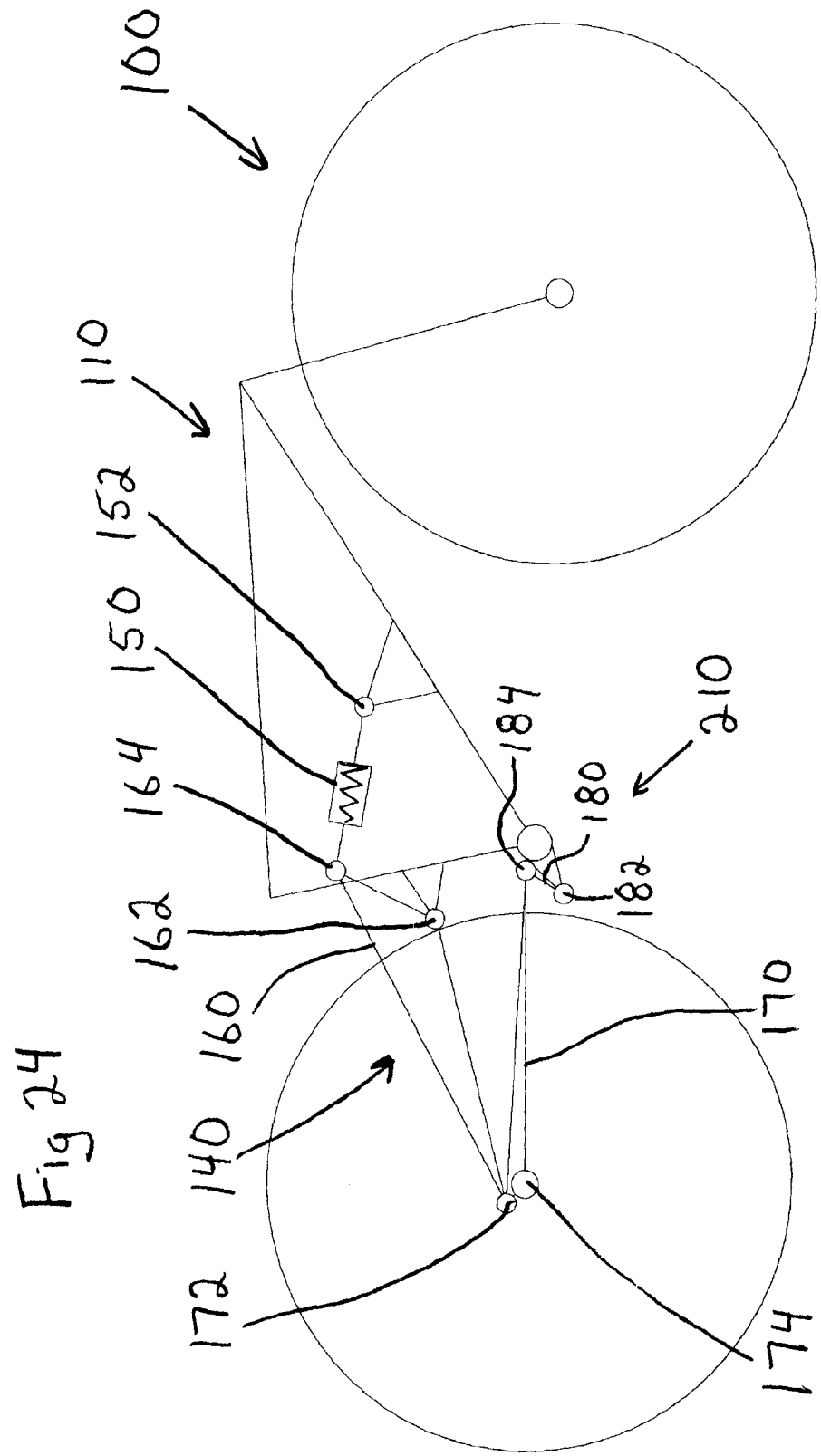

In FIG. 24, the seat stay-frame pivot 162 is located with X at about −90 mm and Y at about 125 mm, and the seat stay-chain stay couple 172 at about 135 degrees and about 30 mm.

Figure 25:
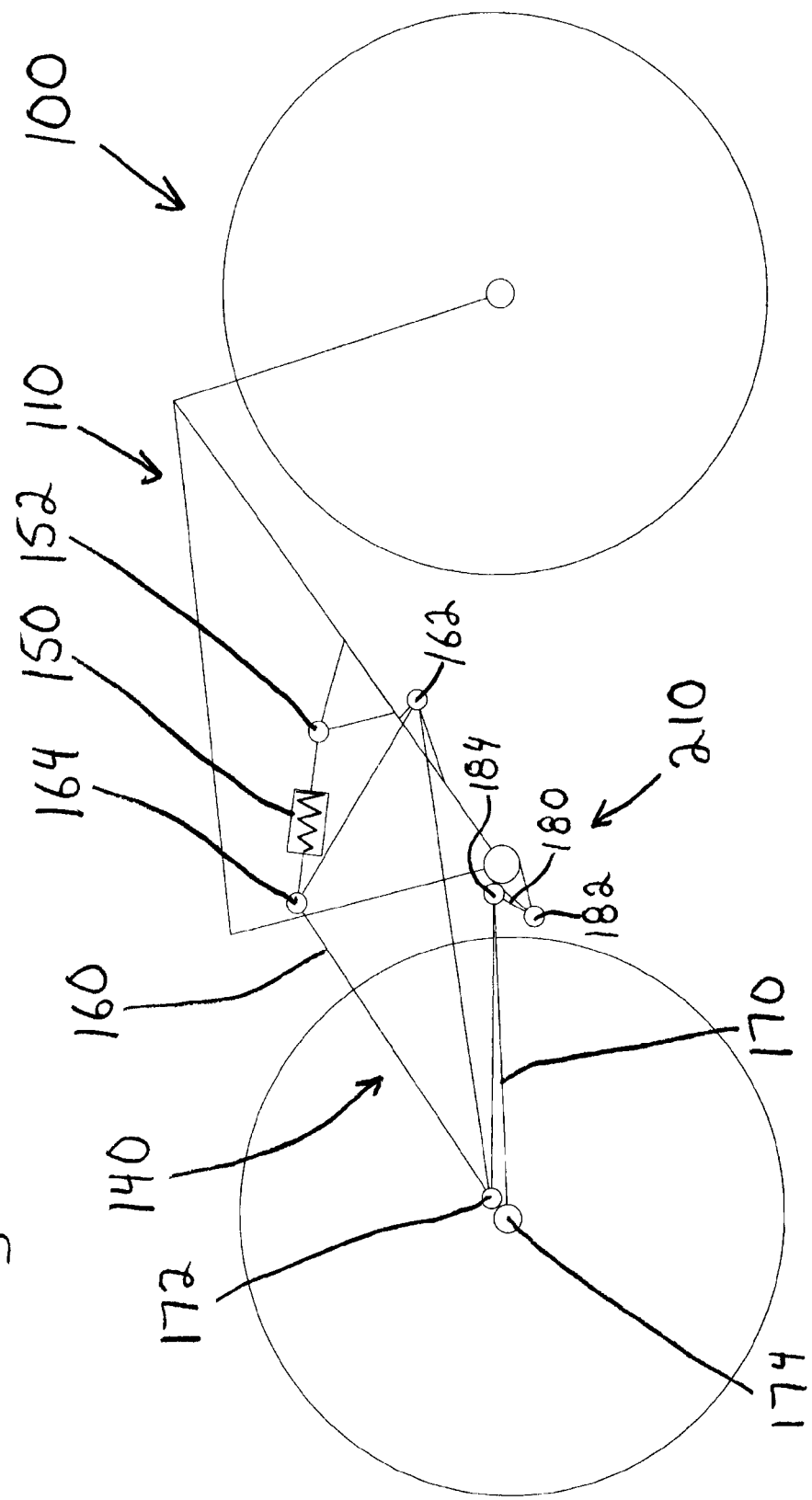

In FIG. 25, the seat stay-frame pivot 162 is located with X at about 150 mm and Y at about 115 mm, and the seat stay-chain stay couple 172 at about 45 degrees and about 30 mm.

Figure 26:
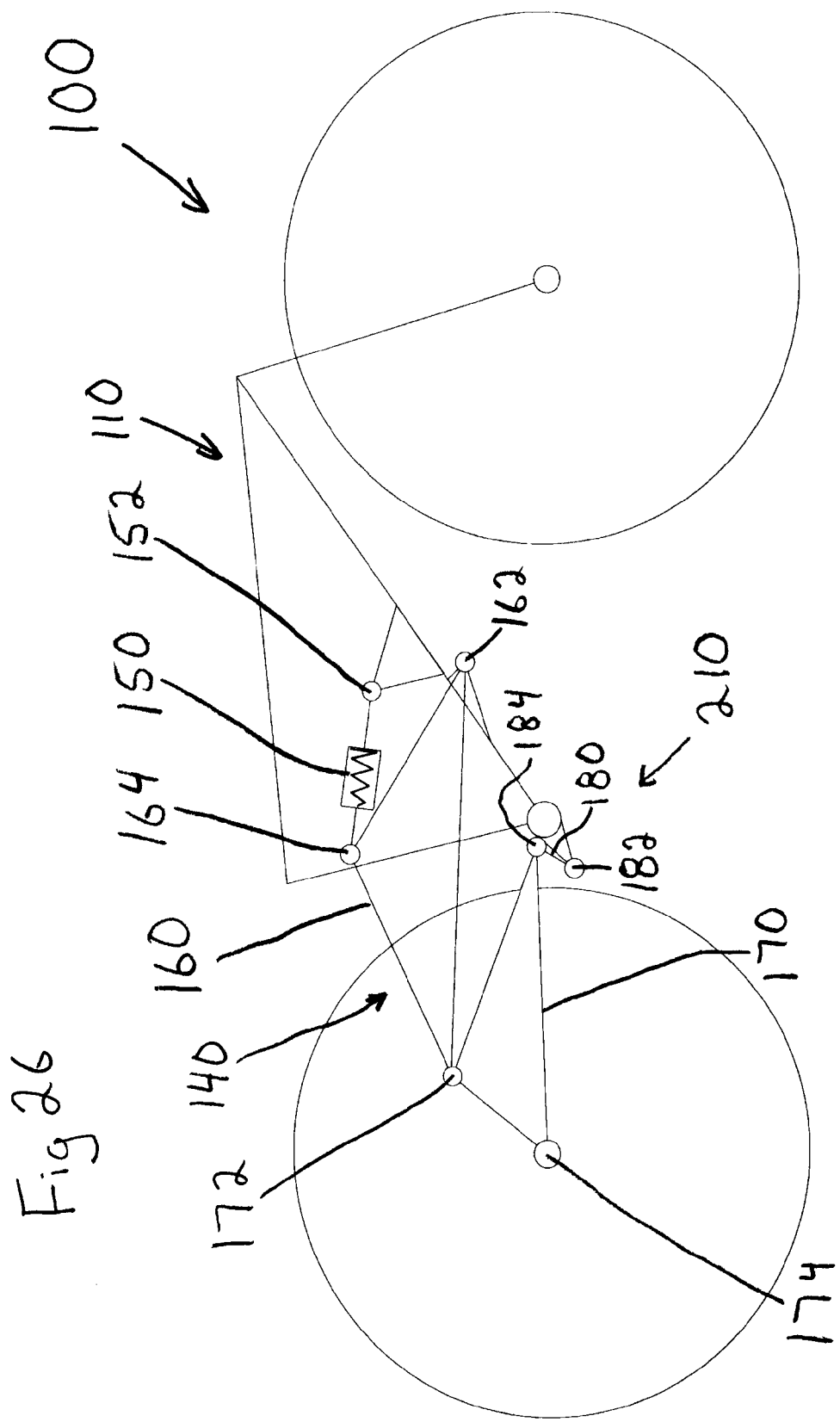

In FIG. 26, the seat stay-frame pivot 162 is located with X at about 150 mm and Y at about 115 mm, and the seat stay-chain stay couple 172 at about 45 degrees and about 150 mm.

Figure 27:
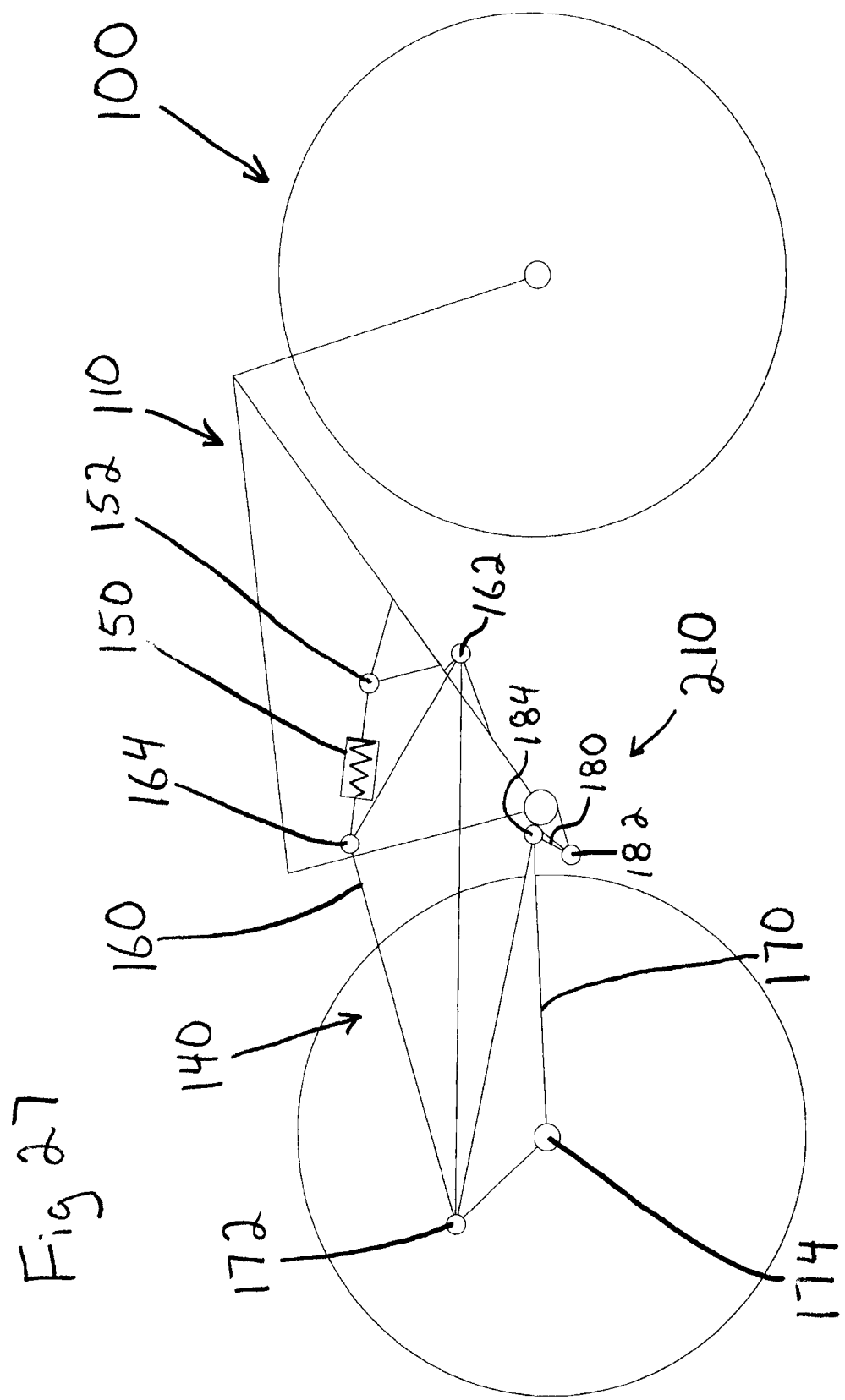

In FIG. 27, the seat stay-frame pivot 162 is located with X at about 150 mm and Y at about 115 mm, and the seat stay-chain stay couple 172 at about 135 degrees and about 150 mm.

Figure 28:
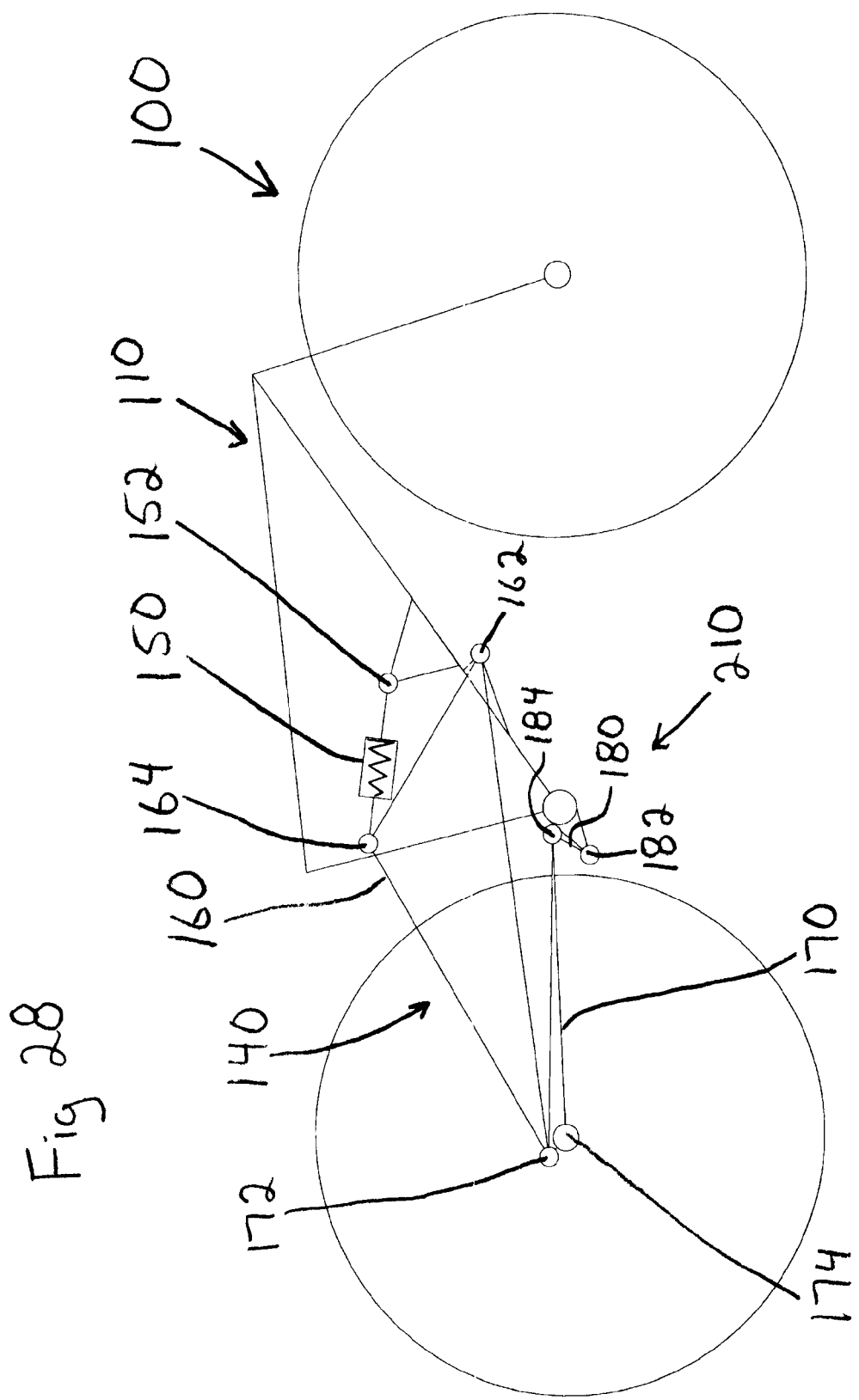

In FIG. 28, the seat stay-frame pivot 162 is located with X at about 150 mm and Y at about 115 mm, and the seat stay-chain stay couple 172 at about 135 degrees and about 30 mm.

Figure 29:
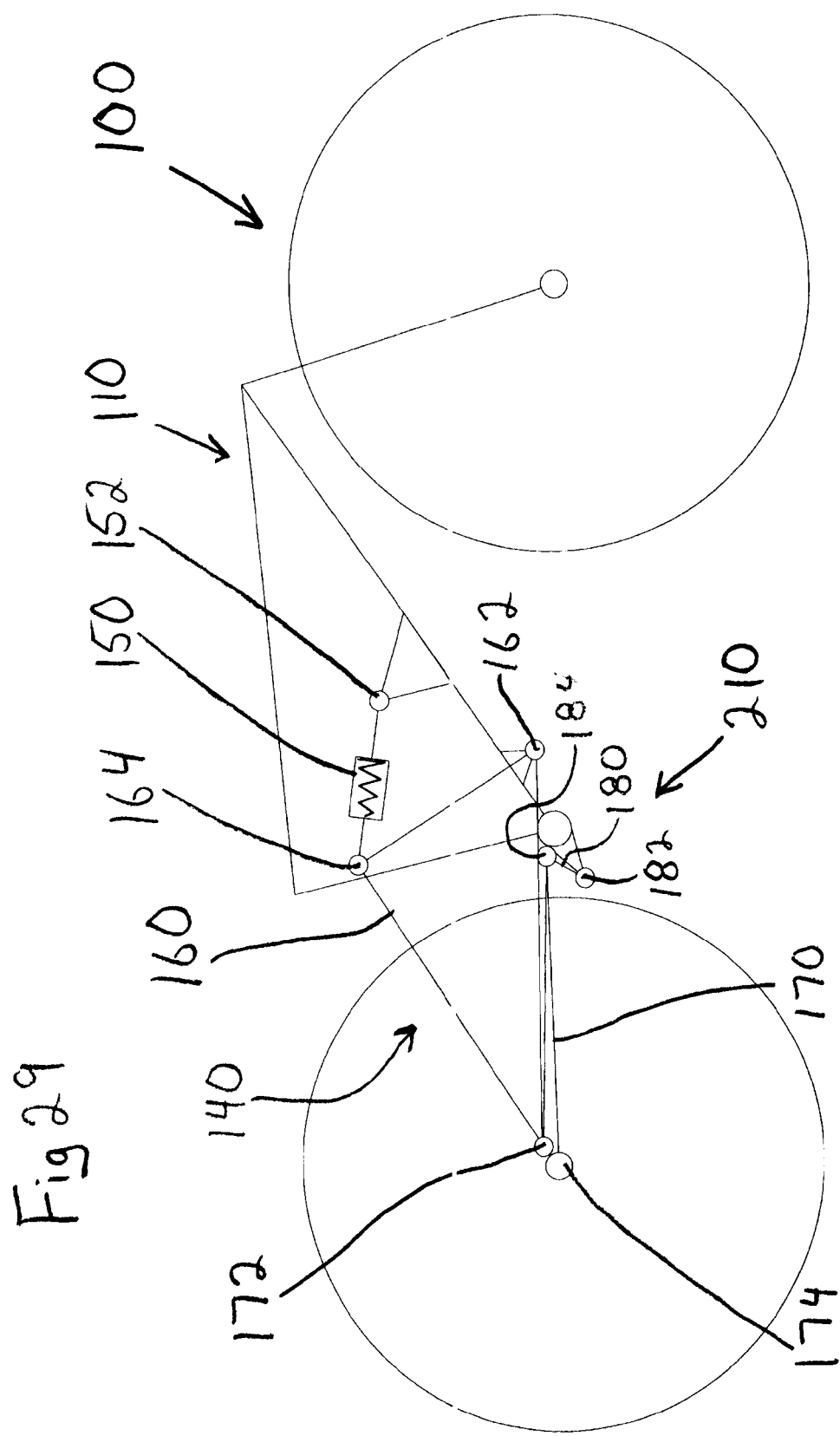

In FIG. 29, the seat stay-frame pivot 162 is located with X at about 85 mm and Y at about 12 mm, and the seat stay-chain stay couple 172 at about 45 degrees and about 30 mm.

Figure 30:
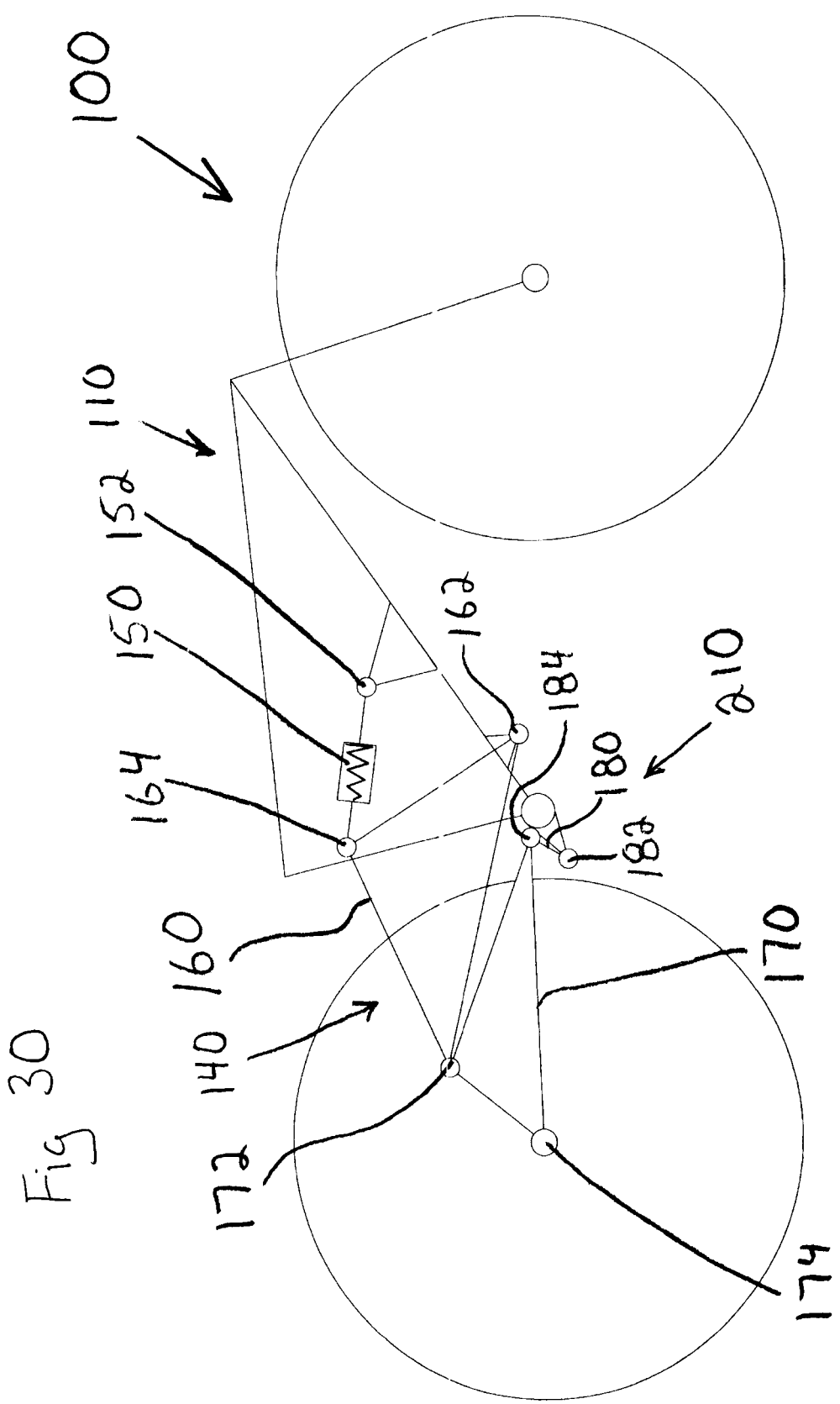

In FIG. 30, the seat stay-frame pivot 162 is located with X at about 85 mm and Y at about 12 mm, and the seat stay-chain stay couple 172 at about 45 degrees and about 150 mm.

Figure 31:
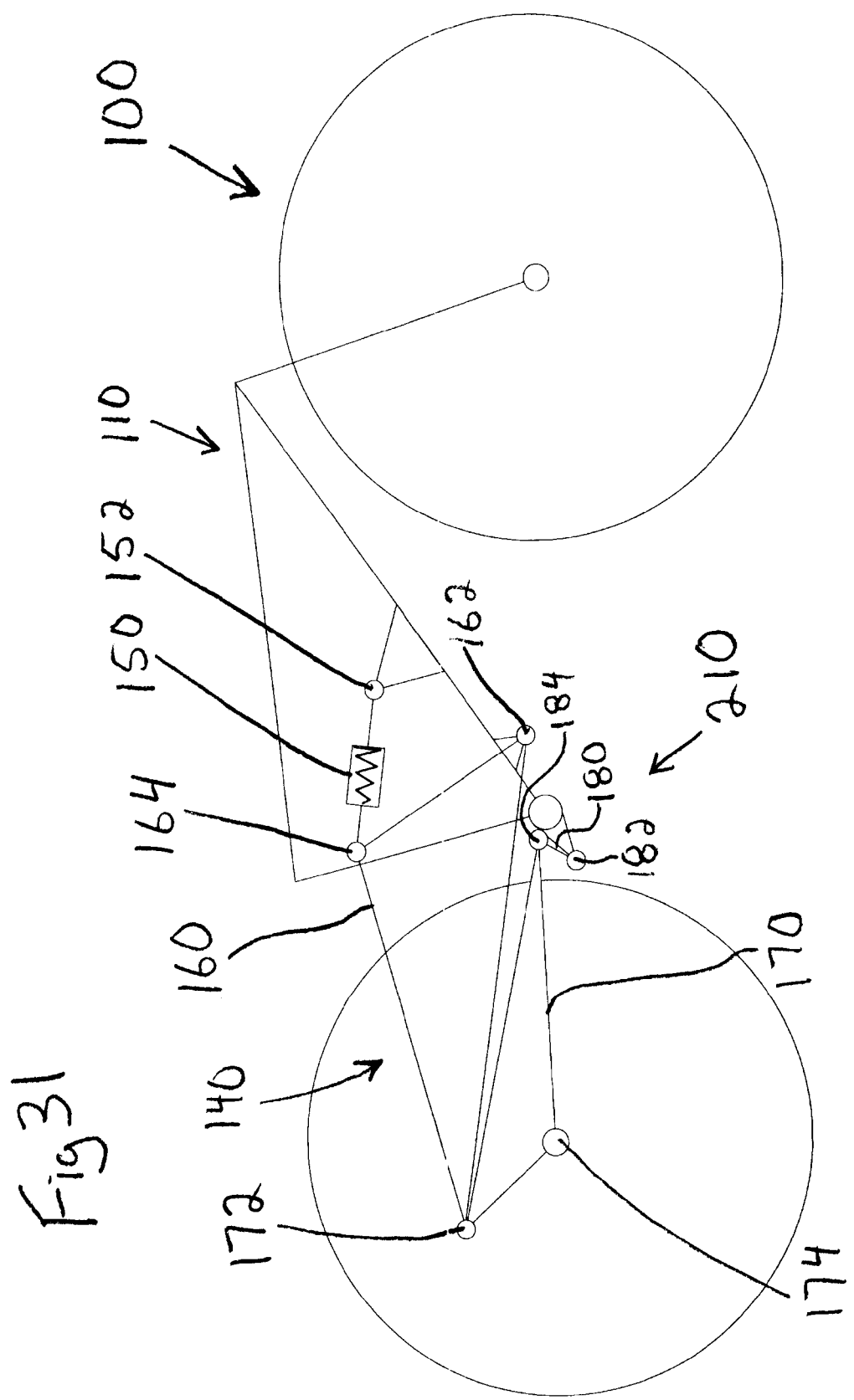

In FIG. 31, the seat stay-frame pivot 162 is located with X at about 85 mm and Y at about 12 mm, and the seat stay-chain stay couple 172 at about 135 degrees and about 150 mm.

Figure 32:
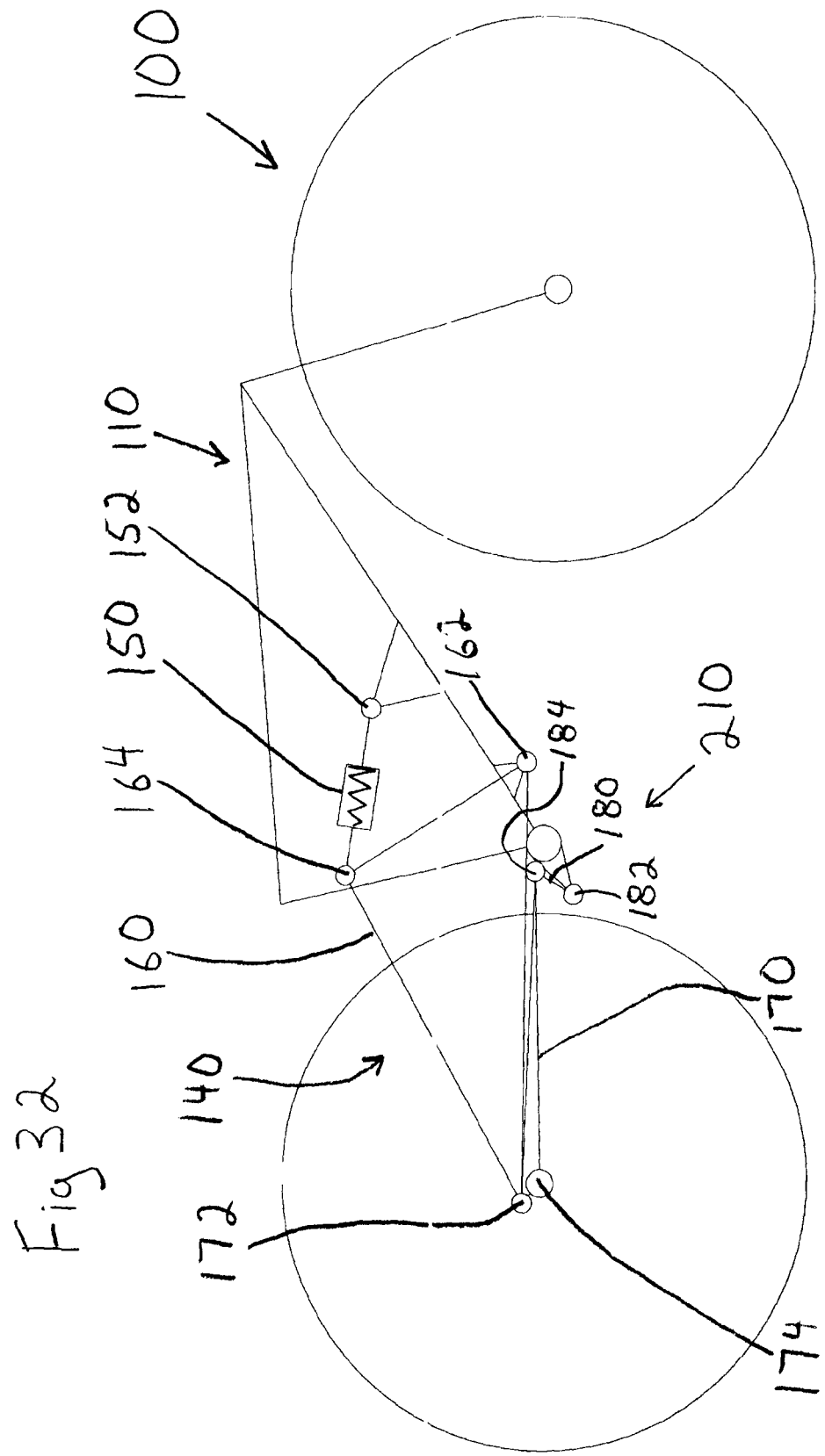

In FIG. 32, the seat stay-frame pivot 162 is located with X at about 85 mm and Y at about 12 mm, and the seat stay-chain stay couple 172 at about 135 degrees and about 30 mm FIGS. 33-48 show examples of the counter-clockwise pivoting configuration 210 in which the link-frame pivot 182 is located with X at about −53 mm and Y at about 14 mm; and the link-chain stay couple 184 is located with X at about 15 mm and Y at about 47 mm.

Figure 33:
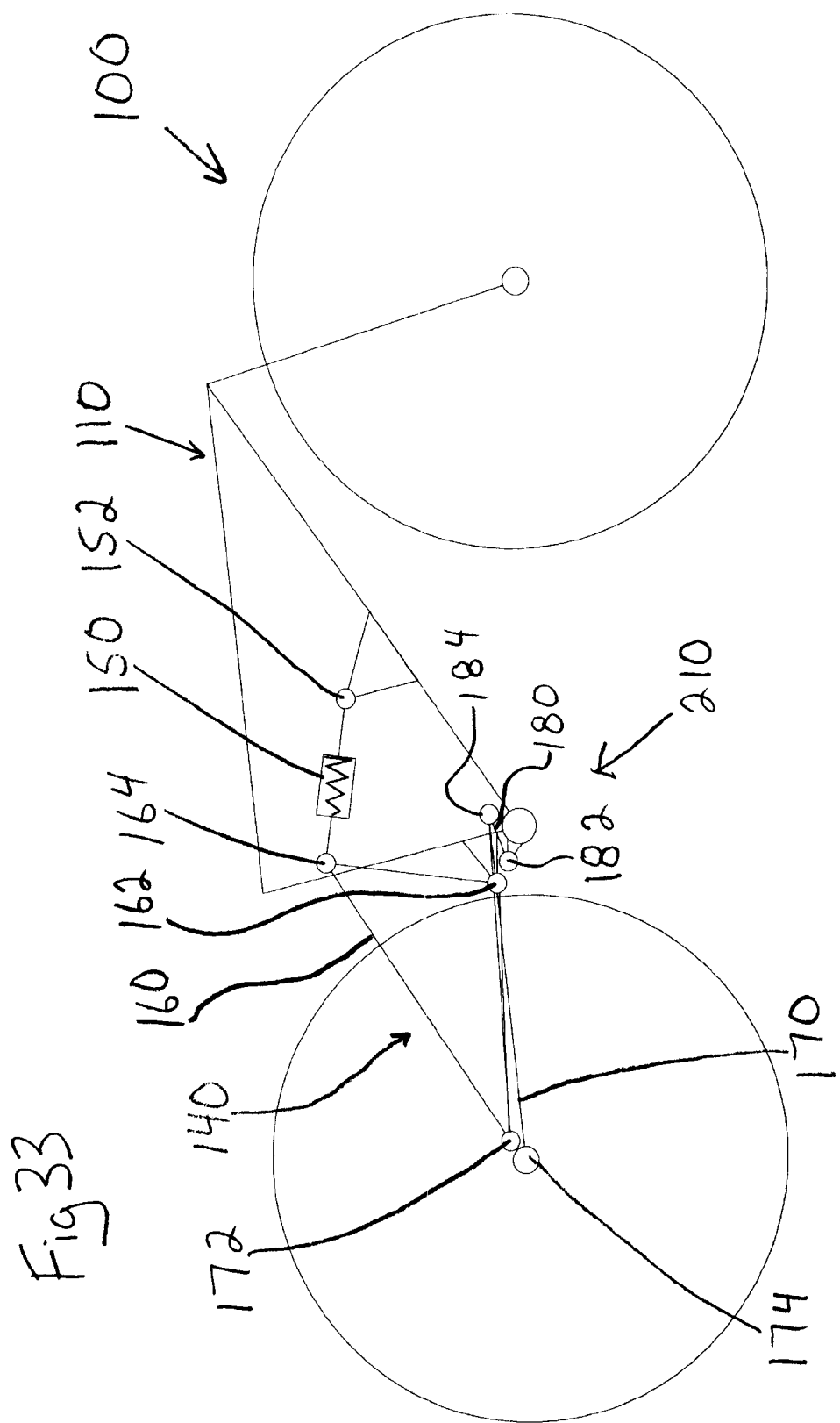

In FIG. 33, the seat stay-frame pivot 162 is located with X at about −70 mm and Y at about 28 mm; and the seat stay-chain stay couple 172 at about 45 degrees and about 30 mm.

Figure 34:
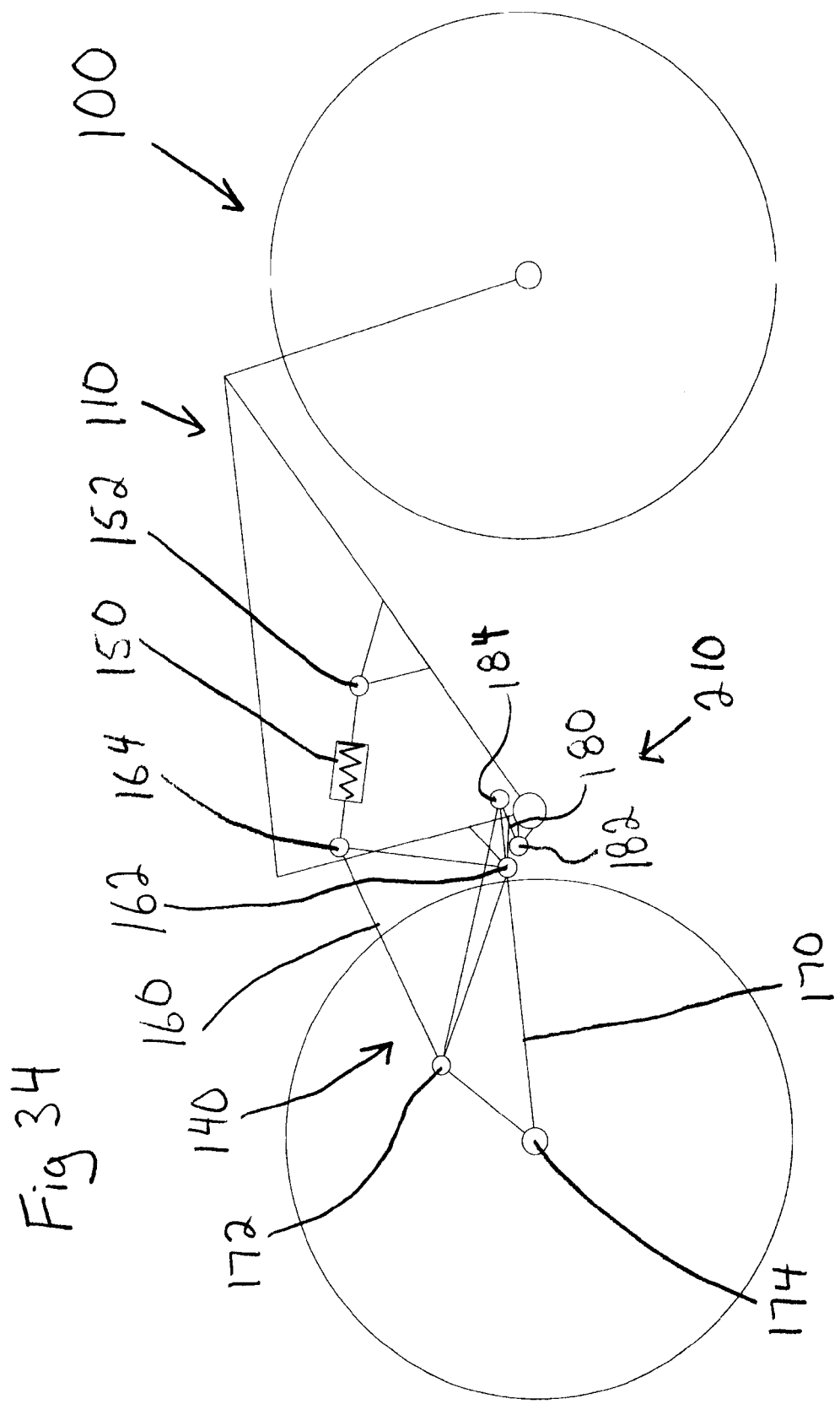

In FIG. 34, the seat stay-frame pivot 162 is located with X at about −70 mm and Y at about 28 mm; and the seat stay-chain stay couple 172 at about 45 degrees and about 150 mm.

Figure 35:
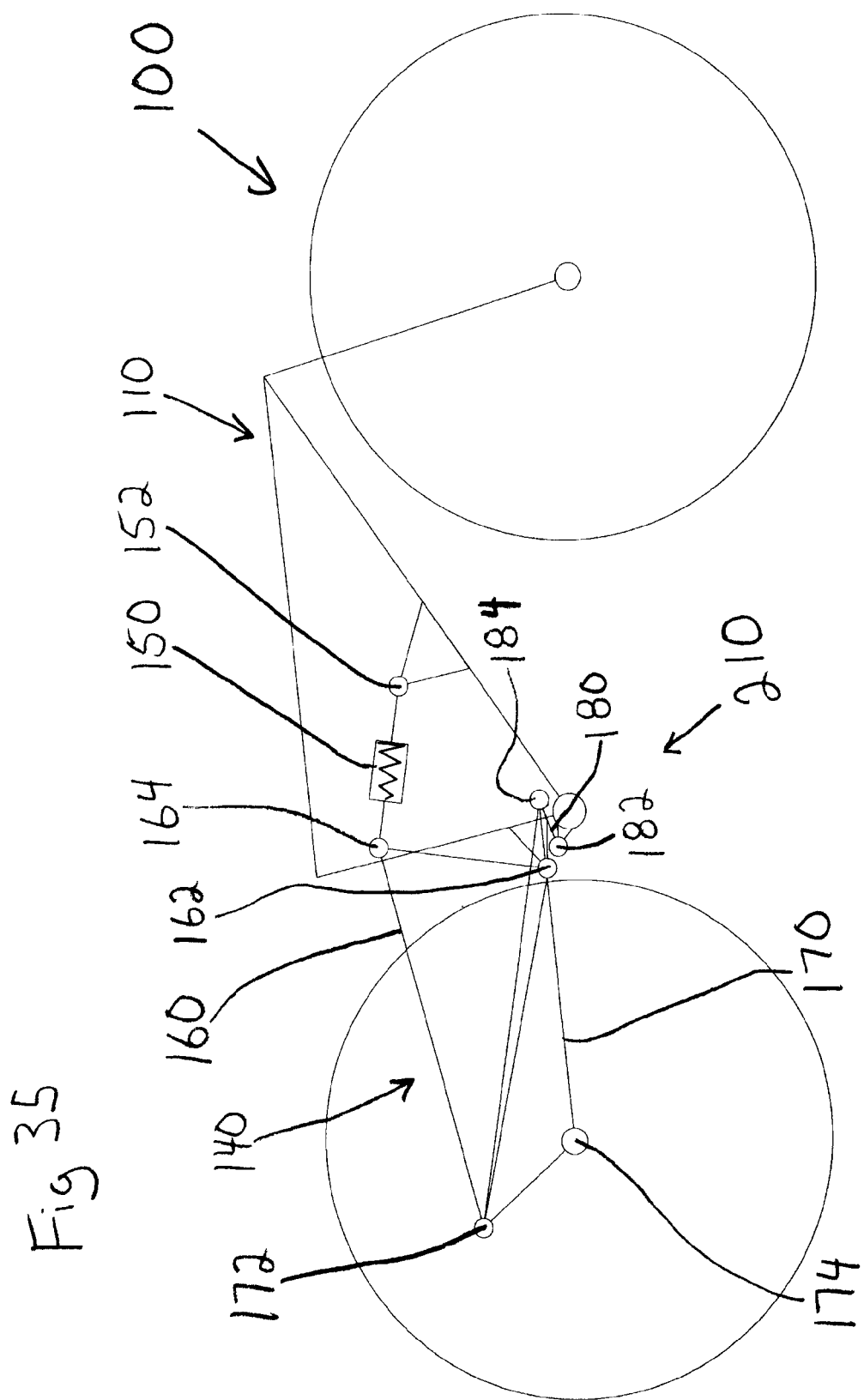

In FIG. 35, the seat stay-frame pivot 162 is located with X at about −70 mm and Y at about 28 mm, and the seat stay-chain stay couple 172 at about 135 degrees and about 150 mm.

Figure 36:
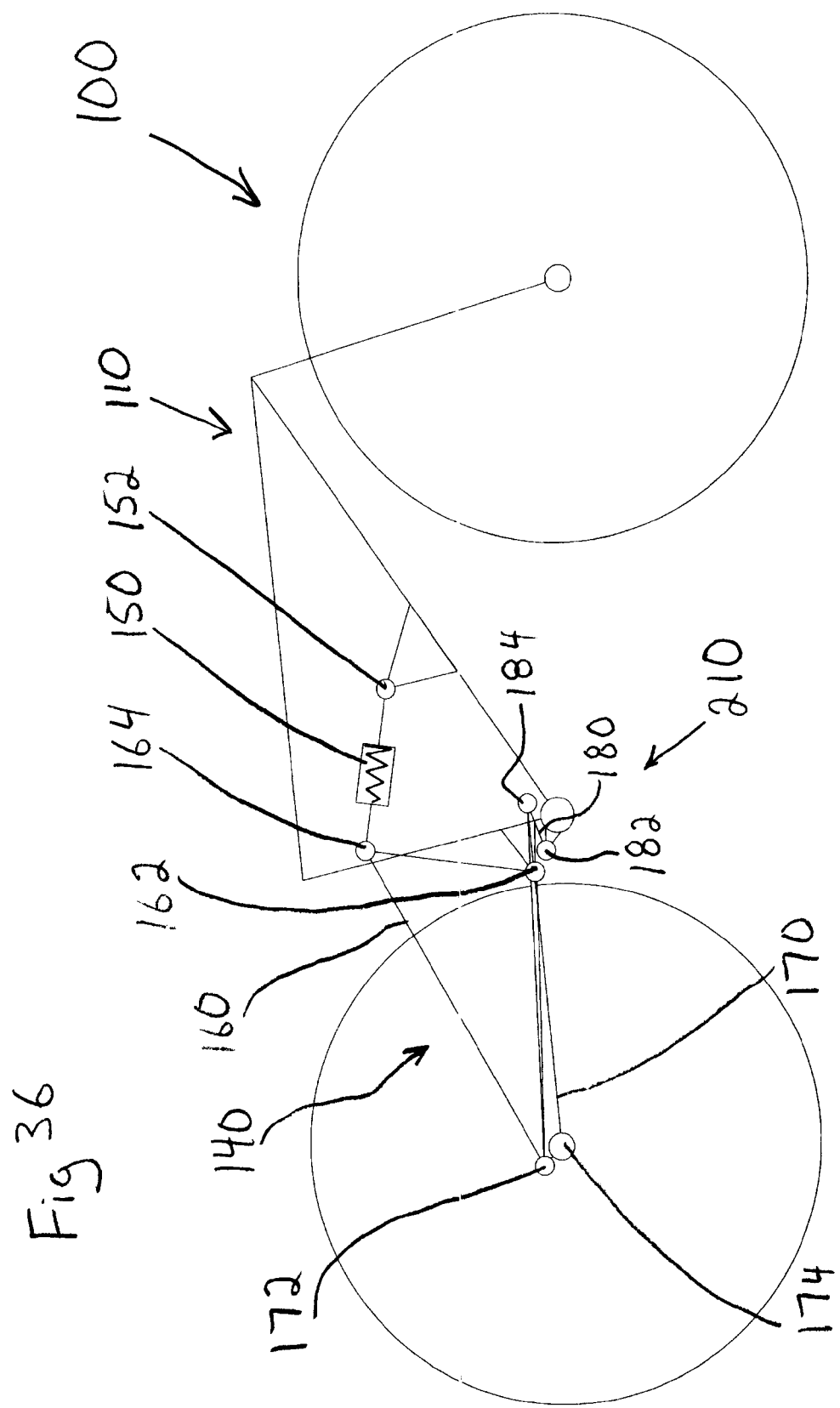

In FIG. 36, the seat stay-frame pivot 162 is located with X at about −70 mm and Y at about 28 mm, and the seat stay-chain stay couple 172 at about 135 degrees and about 30 mm.

Figure 37:
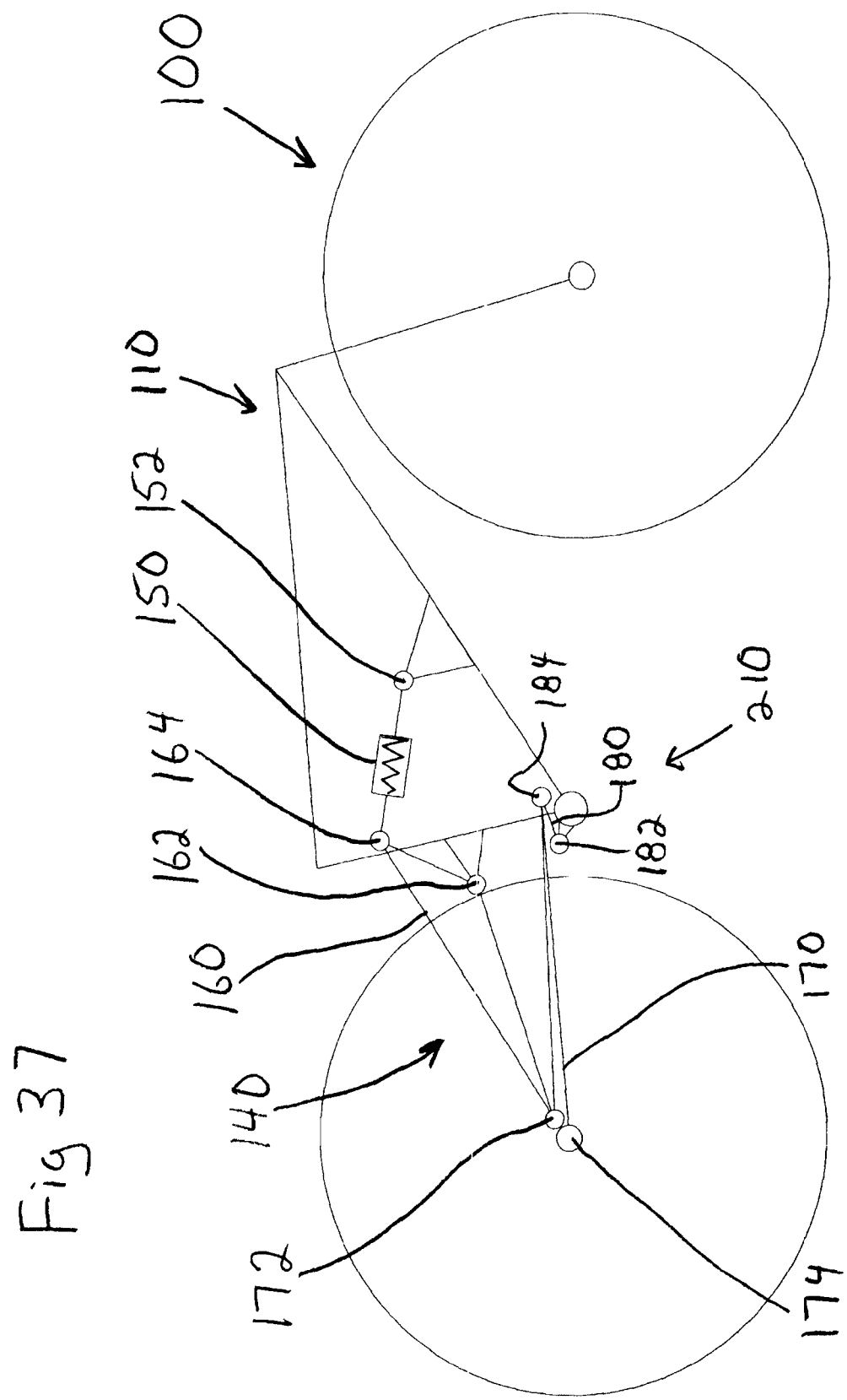

In FIG. 37, the seat stay-frame pivot 162 is located with X at about −90 mm and Y at about 125 mm, and the seat stay-chain stay couple 172 at about 45 degrees and about 30 mm.

Figure 38:
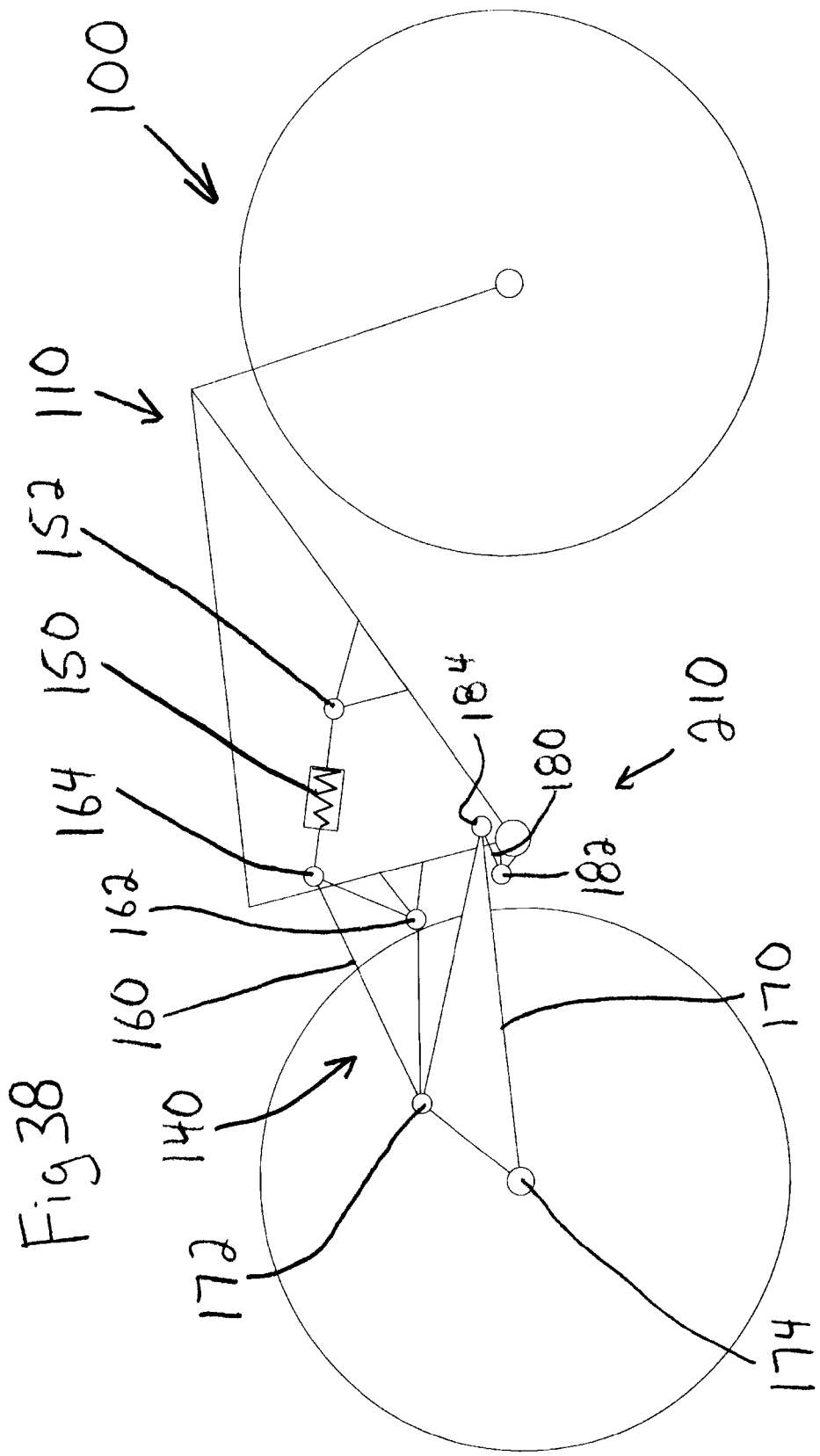

In FIG. 38, the seat stay-frame pivot 162 is located with X at about −90 mm and Y at about 125 mm, and the seat stay-chain stay couple 172 at about 45 degrees and about 150 mm.

Figure 39:
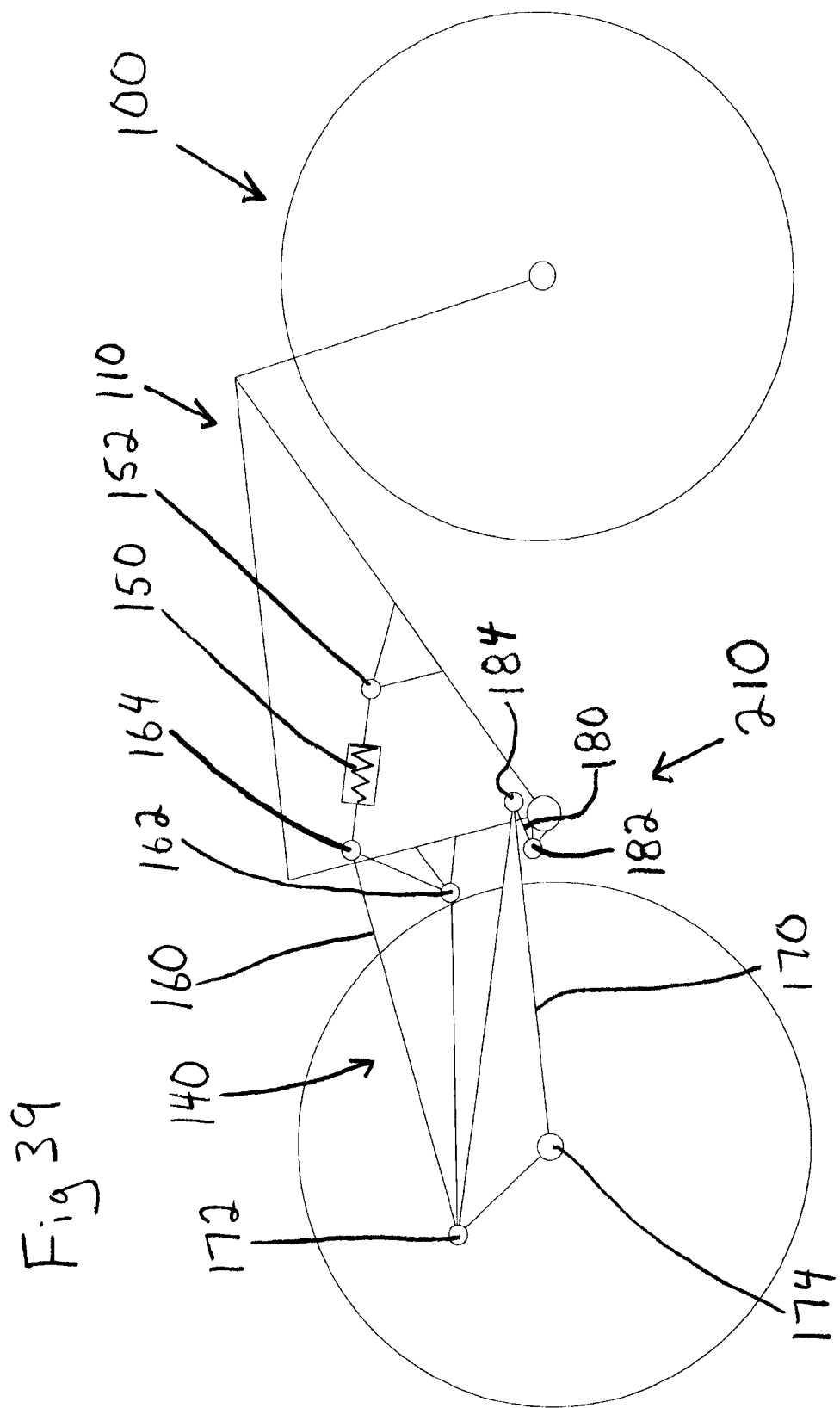

In FIG. 39, the seat stay-frame pivot 162 is located with X at about −90 mm and Y at about 125 mm, and the seat stay-chain stay couple 172 at about 135 degrees and about 150 mm.

Figure 40:
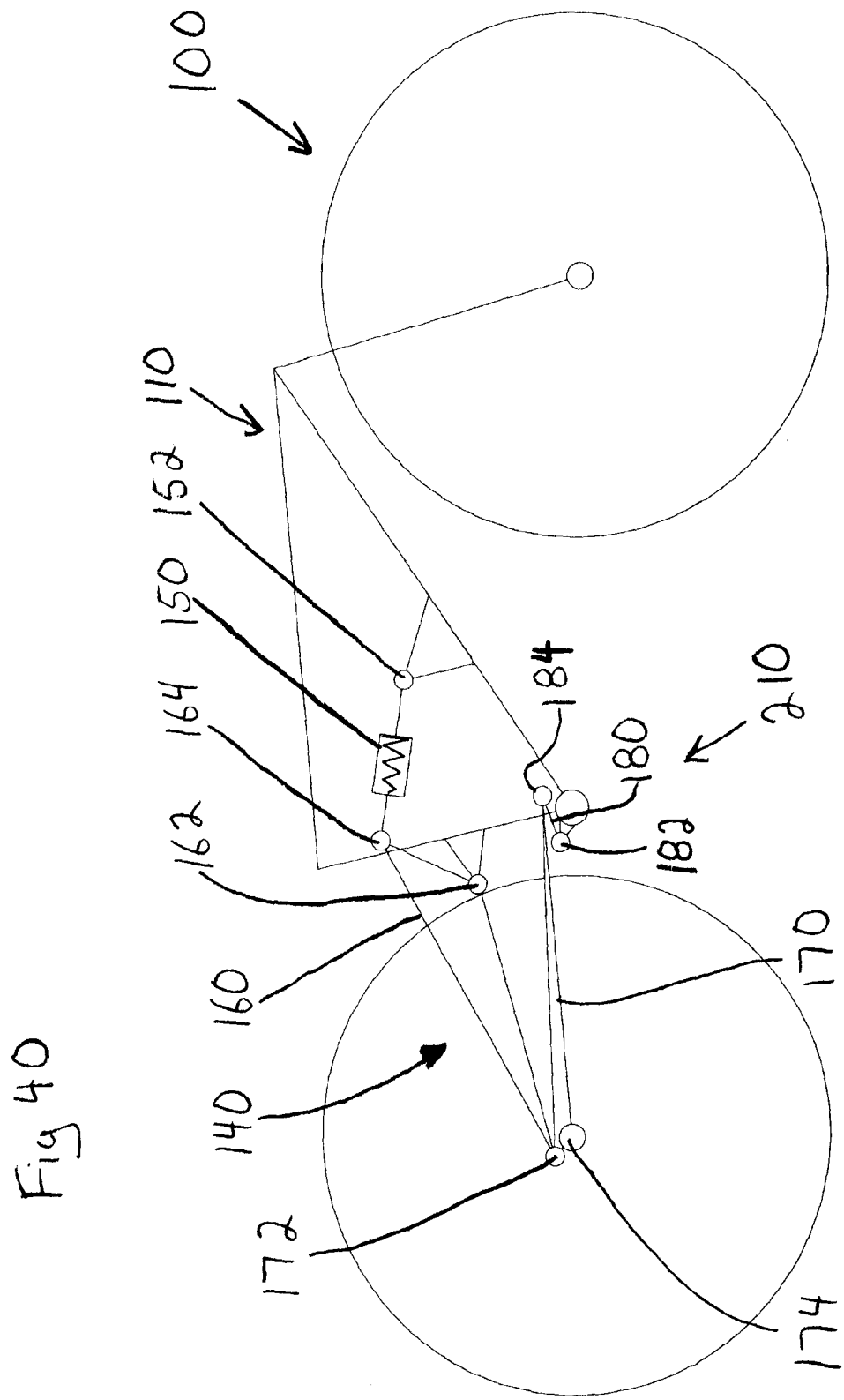

In FIG. 40, the seat stay-frame pivot 162 is located with X at about −90 mm and Y at about 125 mm, and the seat stay-chain stay couple 172 at about 135 degrees and about 30 mm.

Figure 41:
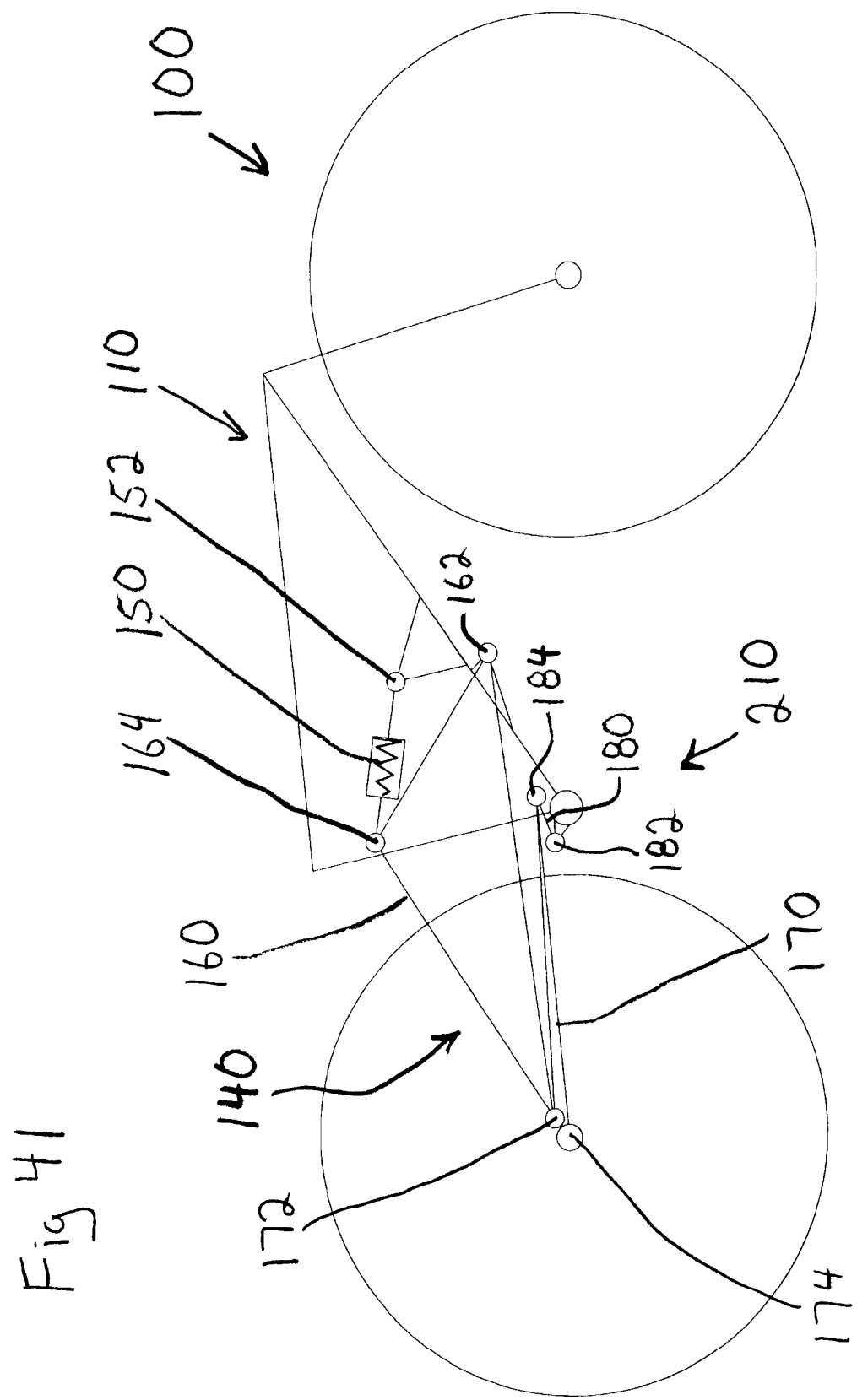

In FIG. 41, the seat stay-frame pivot 162 is located with X at about 150 mm and Y at about 115 mm, and the seat stay-chain stay couple 172 at about 45 degrees and about 30 mm.

Figure 42:
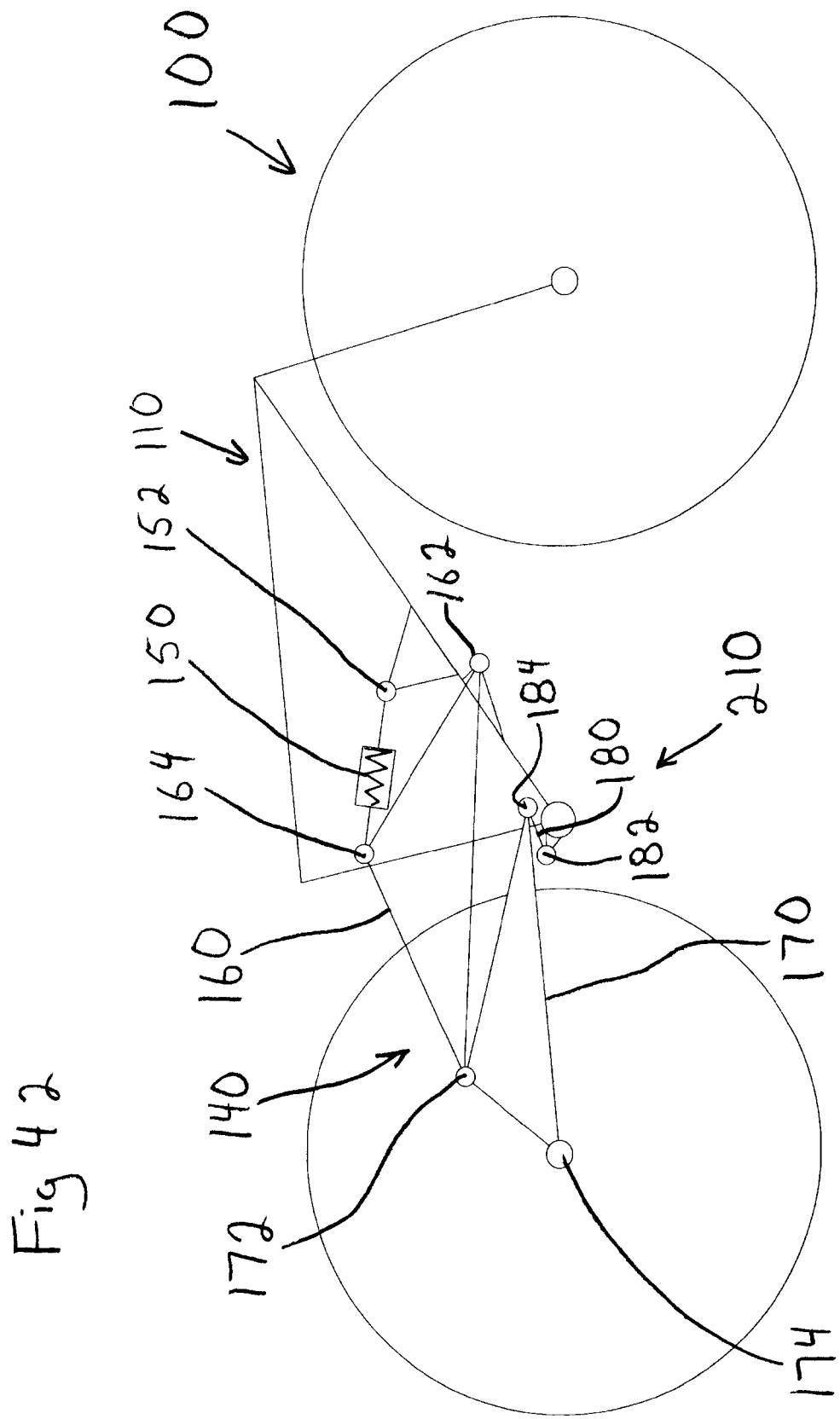

In FIG. 42, the seat stay-frame pivot 162 is located with X at about 150 mm and Y at about 115 mm, and the seat stay-chain stay couple 172 at about 45 degrees and about 150 mm.

Figure 43:
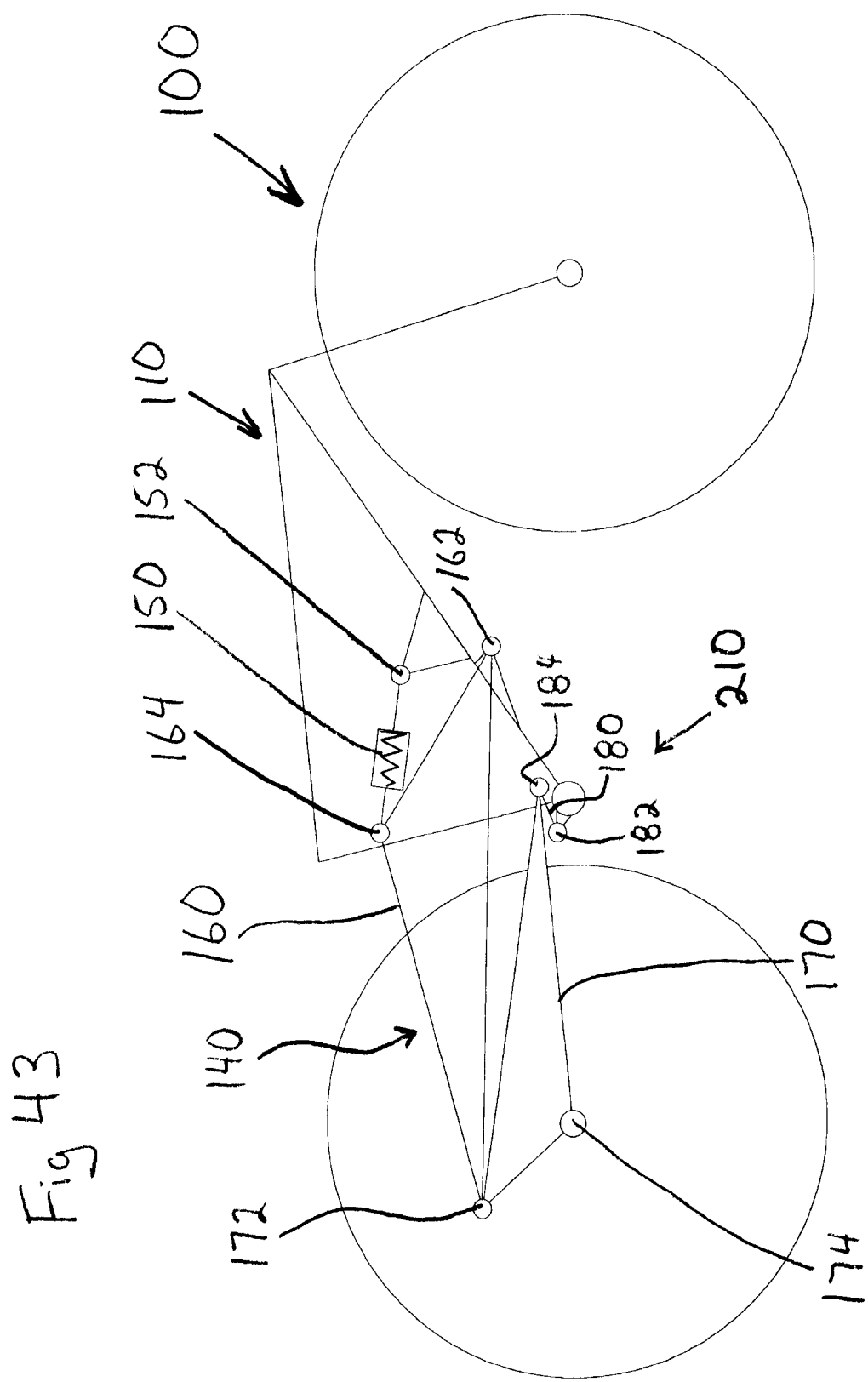

In FIG. 43, the seat stay-frame pivot 162 is located with X at about 150 mm and Y at about 115 mm, and the seat stay-chain stay couple 172 at about 135 degrees and about 150 mm.

Figure 44:
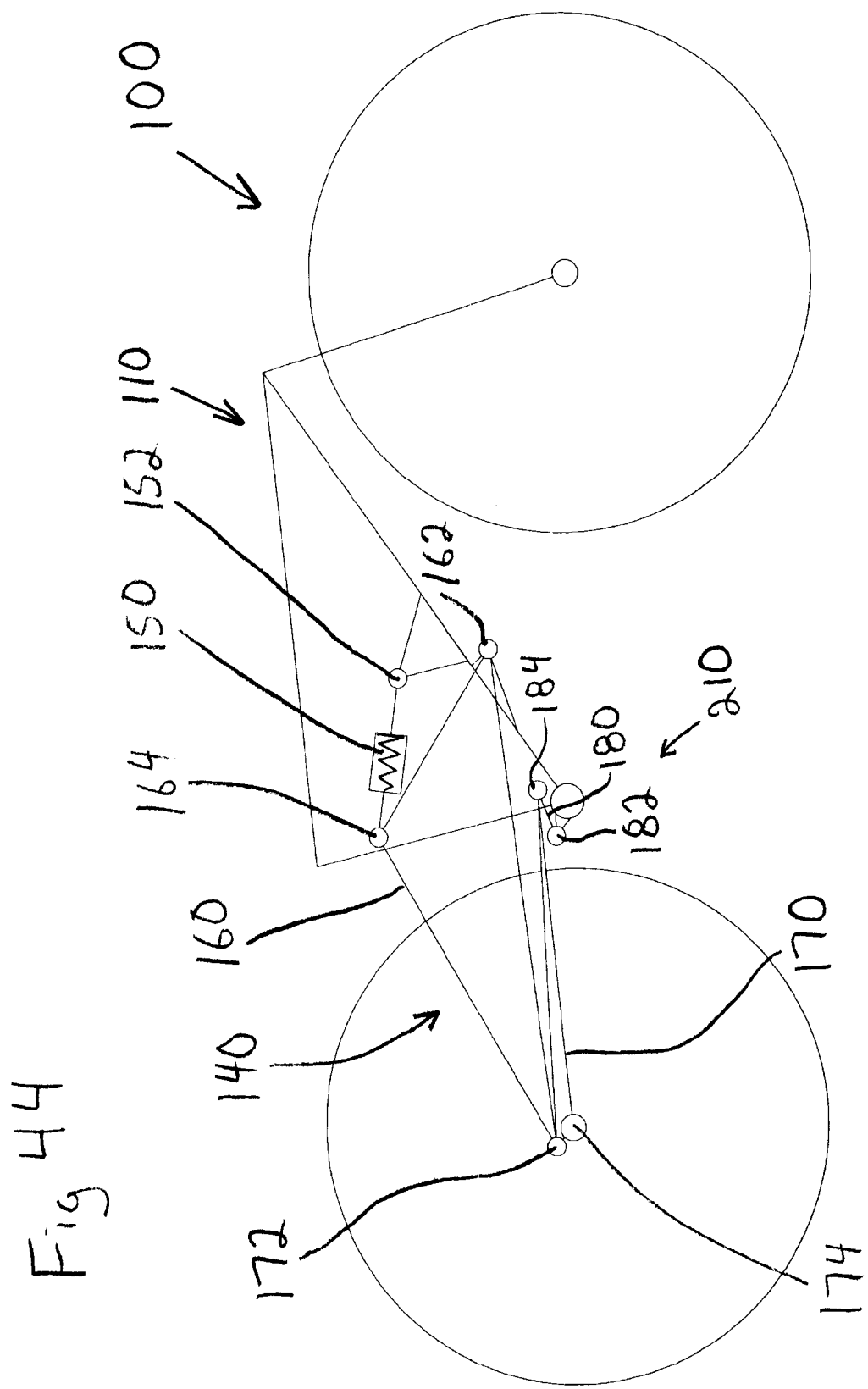

In FIG. 44, the seat stay-frame pivot 162 is located with X at about 150 mm and Y at about 115 mm, and the seat stay-chain stay couple 172 at about 135 degrees and about 30 mm.

Figure 45:
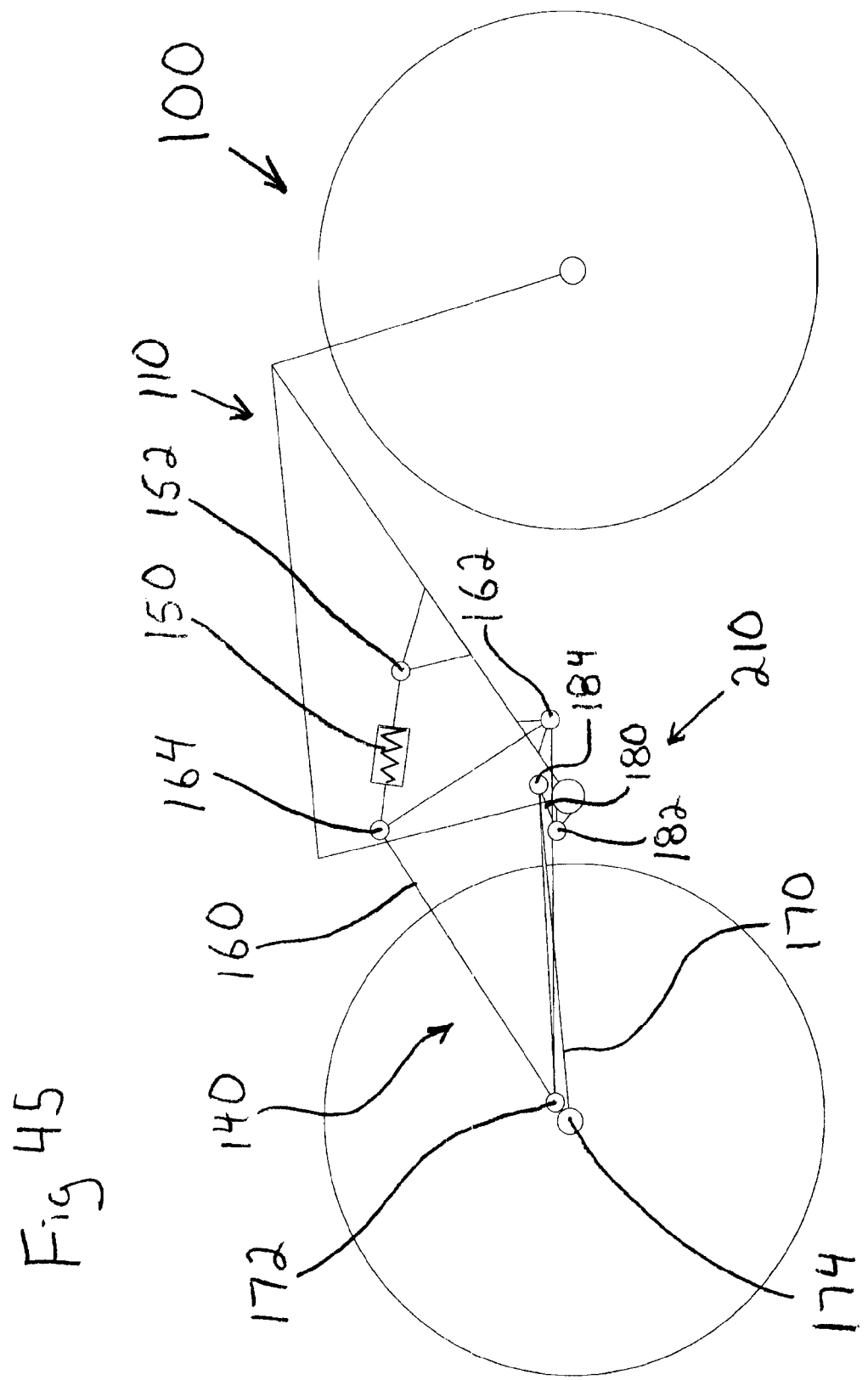

In FIG. 45, the seat stay-frame pivot 162 is located with X at about 85 mm and Y at about 12 mm, and the seat stay-chain stay couple 172 at about 45 degrees and about 30 mm.

Figure 46:
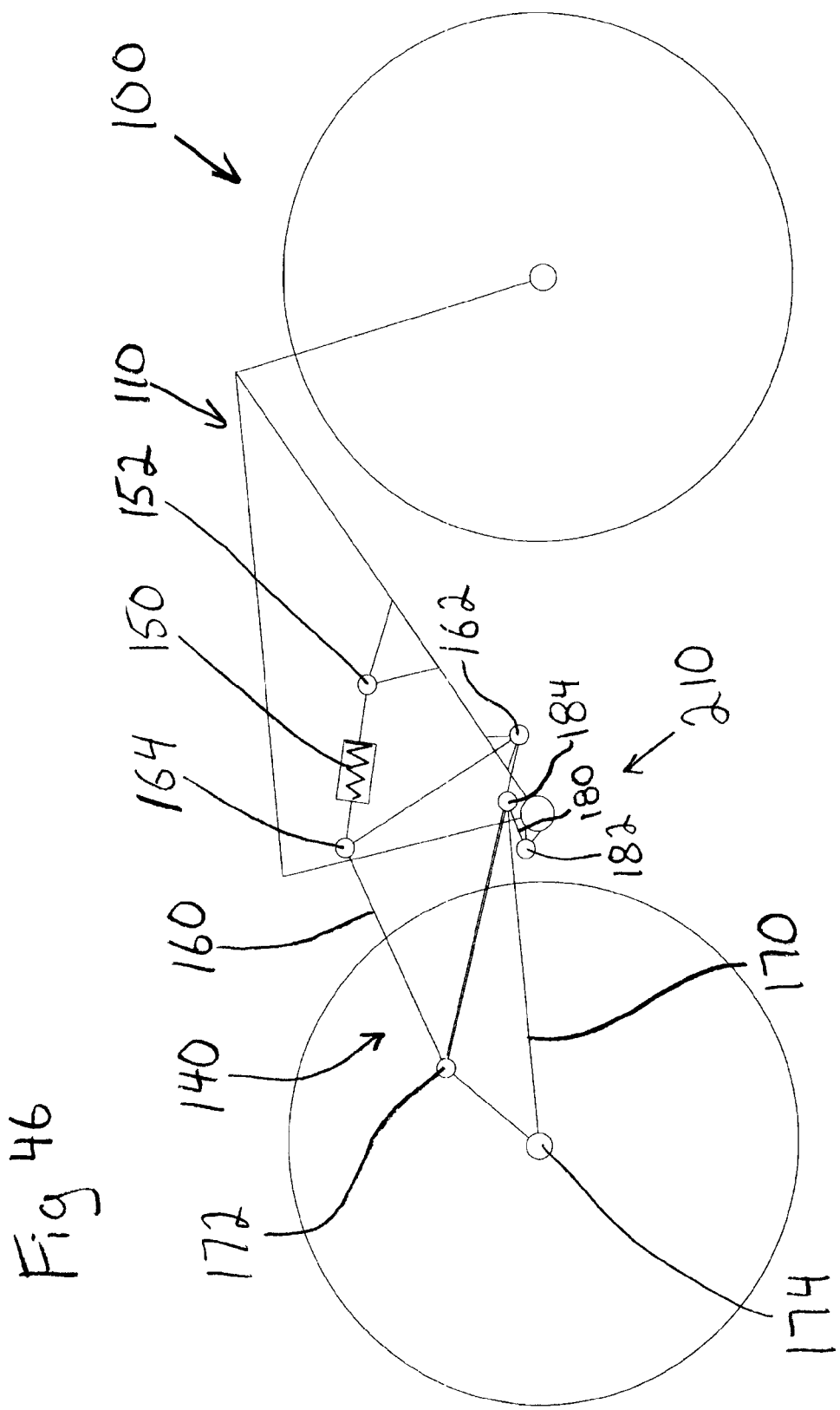

In FIG. 46, the seat stay-frame pivot 162 is located with X at about 85 mm and Y at about 12 mm, and the seat stay-chain stay couple 172 at about 45 degrees and about 150 mm.

Figure 47:
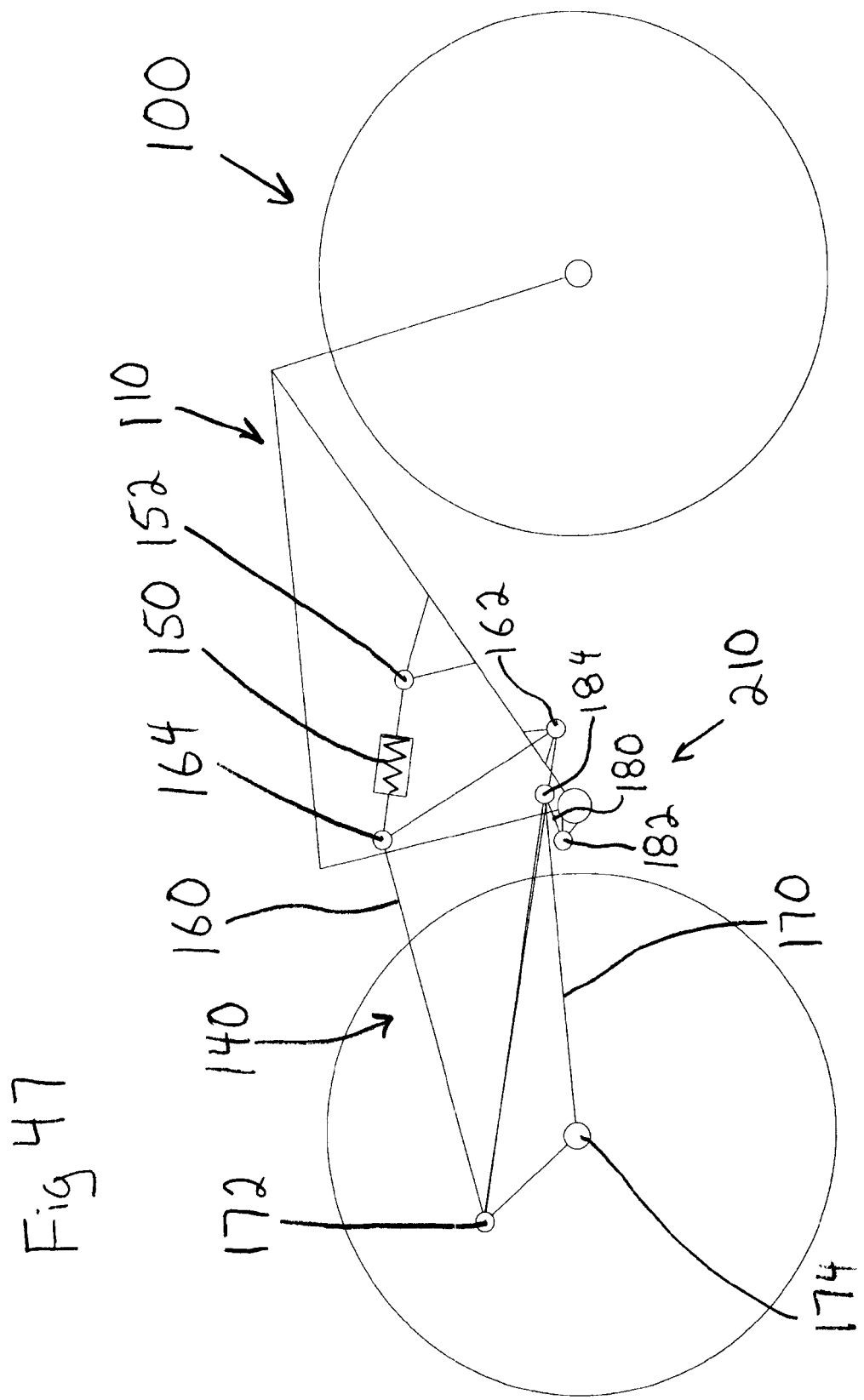

In FIG. 47, the seat stay-frame pivot 162 is located with X at about 85 mm and Y at about 12 mm, and the seat stay-chain stay couple 172 at about 135 degrees and about 150 mm.

Figure 48:
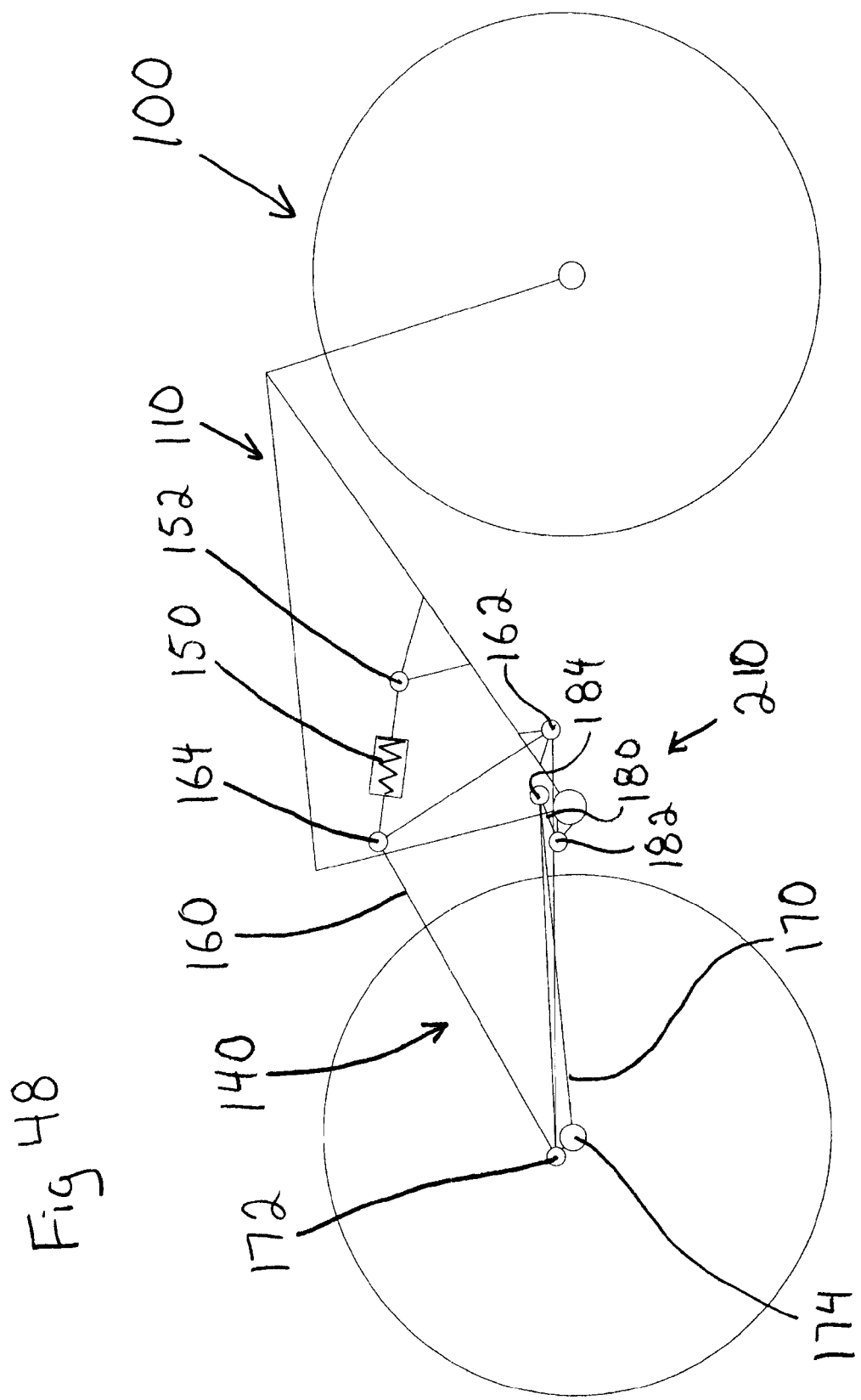

In FIG. 48, the seat stay-frame pivot 162 is located with X at about 85 mm and Y at about 12 mm, and the seat stay-chain stay couple 172 at about 135 degrees and about 30 mm.

Figure 49:
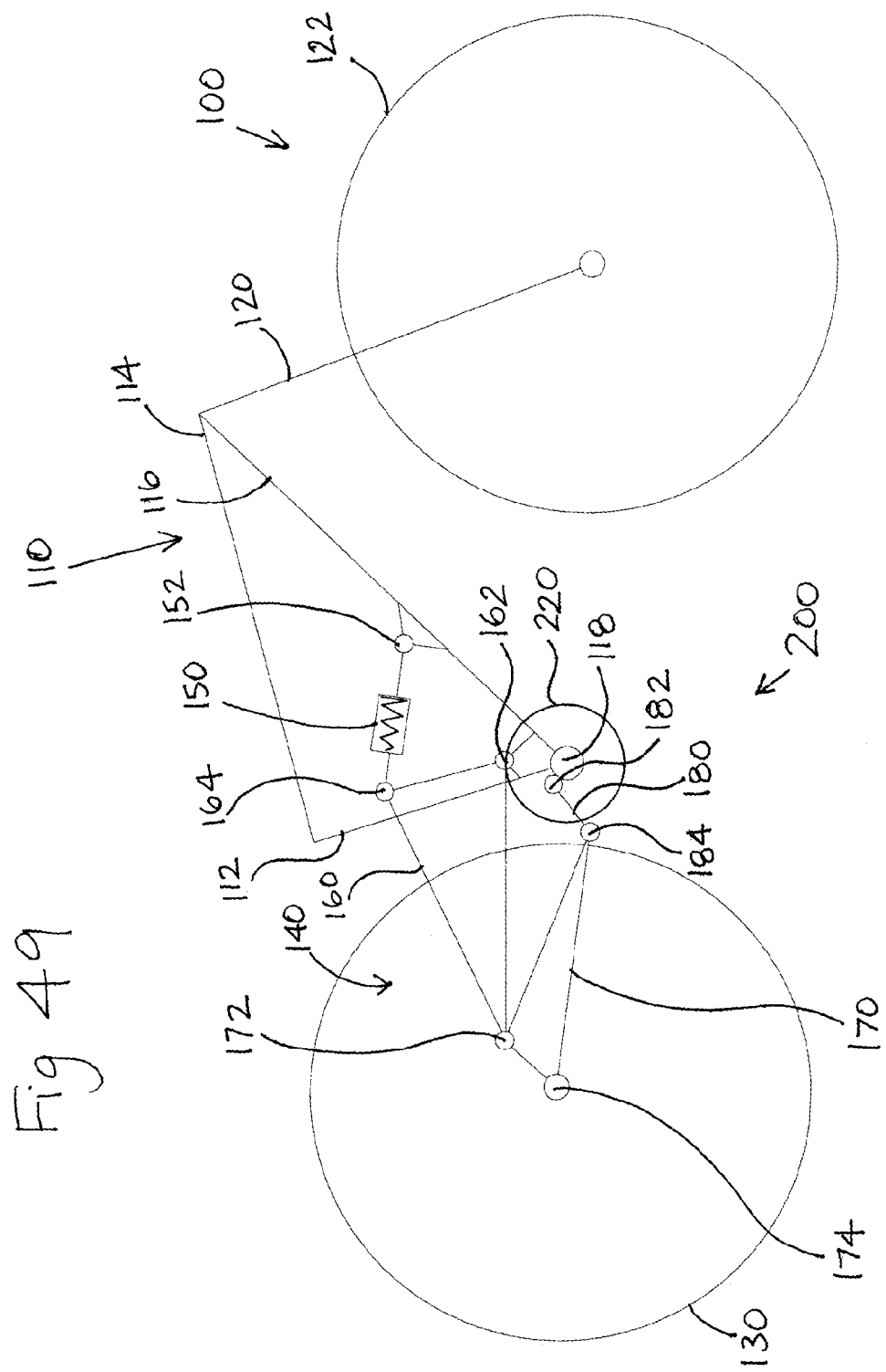
FIG. 49 is a schematic right-side elevation view of an embodiment of the present invention having a link with the link in the clockwise pivoting configuration, shown in the un-loaded "at rest" position.
Figure 50:
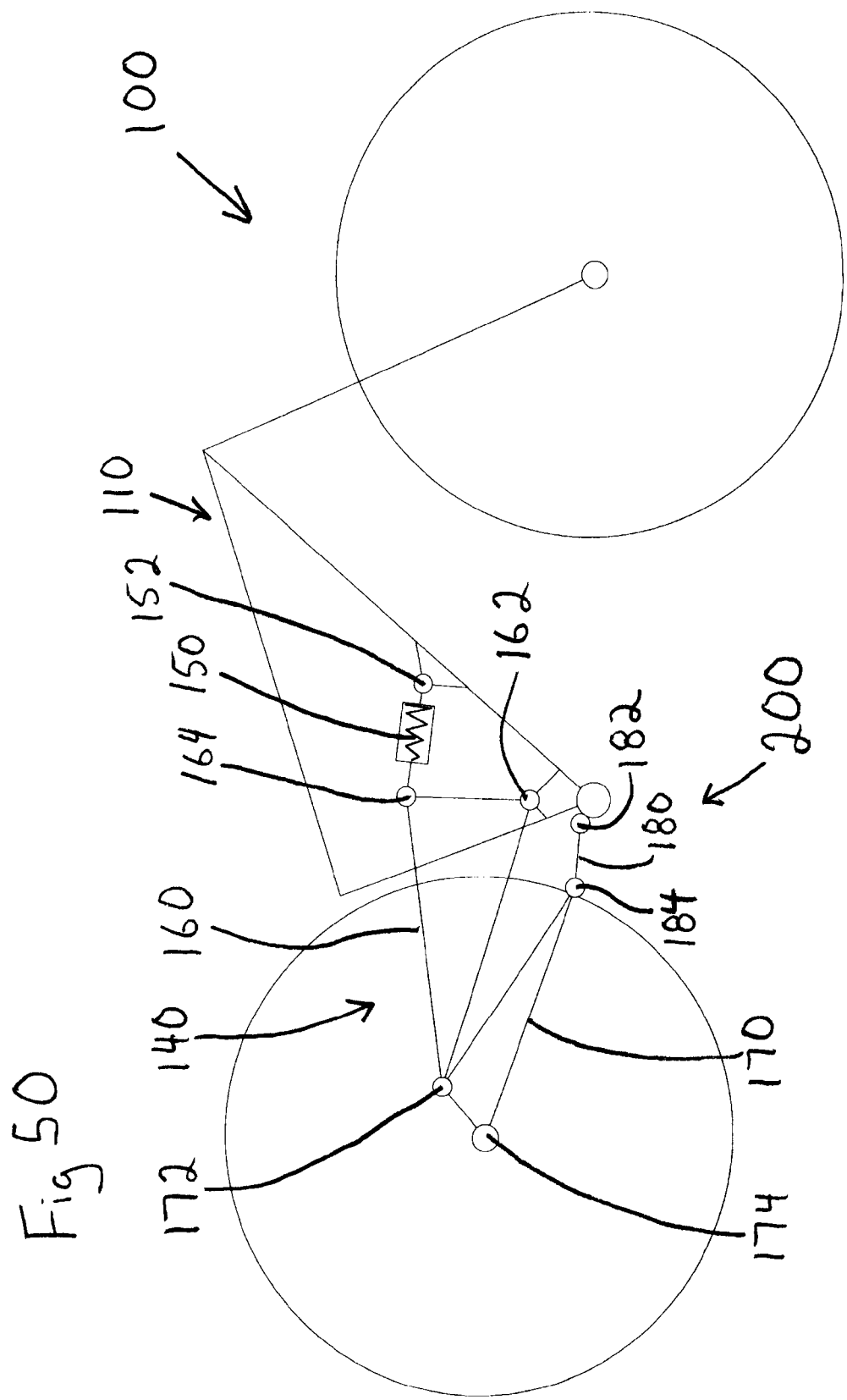
FIG. 50 is a schematic right-side elevation view of the embodiment of FIG. 49, shown in a compressed position.

To illustrate how the components move relative to each other in use, a clockwise pivoting configuration 200 is shown in the un-loaded "at rest" position in FIG. 49 (showing a chain ring 220) and in a compressed position in FIG. 50; and a counter-clockwise pivoting configuration 210 is shown in the un-loaded "at rest" position in FIG. 51 and in a compressed position in FIG. 52.

As can be seen in FIGS. 49-52, the location of the seat stay-chain stay couple 172 above the rear axle mount 174 in conjunction allow the axle of the rear wheel 130 to move forward under compression (reducing the amount of chainstay lengthening), while also permitting a location for the seat stay-frame pivot 162 that provides desirable anti-squat characteristics.

The function of the link 180 is essentially to support the link-chain stay couple 184 end of the chain stay member 170, and to restrict the movement of the link-chain stay couple 184 end of the chain stay member 170 to a defined path encompassing an unloaded at-rest position and a full-compression position. The possible configuration of the link 180 location is highly variable. To a significant extent, the configuration of the link 180 may be used by the suspension designer to "tune" the suspension characteristics.

The functions performed by the link 180 in the embodiments shown in the drawings may be performed by other means. For example, the link-chain stay couple 184 end of the chain stay member 170 could be configured to engage a longitudinally extending slot in, for example, a plate (or aligned slots in two or more plates) affixed to the frame, with the slot (or slots) defining the path of movement of link-chain stay couple 184 end of the chain stay member 170. As a further example, the functions performed by the link 180 could be obtained via a configuration involving a rotating eccentric arrangement.

It is understood that although many different embodiments of the present invention are useful in different applications, in terms of anti-squat characteristics for mountain bikes, it is desirable to locate the seat stay-frame pivot 162 and the seat stay-chain stay couple 172 such that a line passing through the axes of rotation of the seat stay-frame pivot 162 and the seat stay-chain stay couple 172 is oriented so as to continue to the near vicinity of the top of the particular chainring (i.e., front sprocket) for which the user wishes to optimize the suspension, being at the top of the chainring or within plus or minus 15% of the radius of the chainring. This configuration is understood to provide desired anti-squat characteristics and, as compared to other possible configurations, a more compact suspension system, resulting in less flex.

Suspension system designers implementing the present invention will presumably be aware that the sort of high mechanical anti-squat properties readily obtainable through embodiments of the present invention are not in all implementations desirably the sole means for achieving pedaling efficiency. In certain gear combinations, high mechanical anti-squat combined with high pedaling efforts (for example, when standing on the pedals when climbing a hill in the small front chainring and smaller rear cogs) may cause a suspension to extend and/or "lock out". Thus it is often desirable to use a combination of a slight rearward axle path, "enough" mechanical anti-squat, and shock leverage ratios to achieve good overall pedaling efficiency. Excessive reliance on any one of these may cause undesired effects in certain circumstances.

It is understood that minor adjustments to pivot and couple locations may cause significant changes in suspension performance characteristics. Adjusting the link-frame pivot 182 and link-chain stay couple 184 locations also requires adjustment to the locations of the seat stay-frame pivot 162 and seat stay-chain stay couple 172 to find an optimal configuration.

For example, a "high" seat stay-frame pivot 162 location would typically require a seat stay-chain stay couple 172 location further from (higher above) the rear axle to enable acceptable rear suspension characteristics (resulting in longer suspension components which would introduce flex into the system, or larger and heavier components). There may be some situations where using "high" pivot and couple locations is desirable, despite the presumed disadvantages of flex and/or weight.

Determining the locations of the seat stay-frame pivot 162 and the seat stay-chain stay couple 172 effectively forces "proper" location of the link-frame pivot 182 and link-chain stay couple 184. One approach to designing a suspension system embodiment of the present invention is to think of the seat stay member 160 as the "control member", and the link 180 as the "modifier link", wherein, the "control member" (i.e., the locations of the seat stay-frame pivot 162 and the seat stay-chain stay couple 172) dictates overall characteristics, and the "modifier link" (i.e., the locations of the link-frame pivot 182 and the link-chain stay couple 184) fine tunes specific performance characteristics.

In the embodiments described above and shown in the drawings, the shock absorber 150 is mounted at its proximal end to the frame 110 and coupled at its distal end to the seat stay member 160. To be clear, multiple other configurations of the shock absorber 150 are possible. For example, the shock absorber 150 could be interconnected between other components (for example, between the link 180 and the frame 110). As well, the shock absorber 150 need not be directly connected to a component, in that there may be intervening connectors or linkages between the shock absorber 150 and another component. Various configurations and arrangements for devices for absorbing shocks are known in the art. For example, in some cases, particularly in long travel downhill designs, it may be advantageous to use a linkage (not shown) between the shock absorber 150 and the seat stay member 160 so as to permit adjustments or specific shock rates not readily achievable when the shock absorber 150 is directly coupled to the seat stay member 160.

Advantageously, embodiments of the present invention may be readily configured so as to avoid interfering with a "standard" front derailleur mounting position/location.

The invention claimed is:

1. A bicycle suspension system for attaching a rear wheel with a rear wheel axis of rotation, to a bicycle frame having a right side, being on the right hand side when the bicycle frame is viewed from the rear, and having a bottom bracket with a bottom bracket axis of rotation and associated one or more chain rings, so as to permit relative movement as between the rear wheel and the bicycle frame, the suspension system comprising:

a seat stay member configured for direct pivotal attachment to a bicycle frame with the pivotal axis of the pivotal attachment located, in terms of an X,Y coordinate system with the X axis parallel to an imaginary flat surface supporting both wheels of the bicycle with the bicycle not loaded and with the intersection of the X axis and Y axis aligned with the bottom bracket axis of rotation, with X between about −100 mm and about 190 mm, and Y between about 10 mm and 160 mm;

a chain stay member having:
   a mount suitable for receiving a rear wheel axle
   a couple for pivotally coupling to the seat stay member at a location upward of the rear wheel axis of rotation, wherein the location is at an angle measured at the rear wheel axis of rotation from an imaginary line extending forward from the rear wheel axis of rotation parallel to an imaginary flat surface supporting both wheels of the bicycle with the bicycle not loaded, wherein the angle is about 45 degrees to about 78 degrees, and a frame-ward end;

a frame-ward end movement control device, being a link member configured for a link pivotal attachment to the bicycle frame and for a link pivotal coupling to the frame-ward end, for supporting the frame-ward end relative to the bicycle frame and for defining a path of permitted movement of the frame-ward end relative to the bicycle frame;

a shock absorber device configured for being directly or indirectly interconnected between two of the seat stay member, the chain stay member, the frame-ward end movement control device and the bicycle frame, for, when in use, resiliently impeding relative movement of the components from an at-rest position; and wherein in use, the pivotal axis of the pivotal attachment to the bicycle frame and the pivotal axis of the couple for pivotally coupling to the seat stay member are located such that an imaginary line passing through these axes is oriented so as to extend to the near vicinity of the top of a selected chain ring, being within plus or minus 15% of the radius of the chain ring.

2. The suspension system of claim 1, wherein the location of the pivot axis of the couple for pivotally coupling to the seat stay member is at a radial distance from the rear wheel axis of rotation of about 30 mm to about 200 mm.

3. The suspension system of claim 2, wherein the radial distance is about 50 mm to about 150 mm.

4. The suspension system of claim 1, wherein the pivotal axis of the pivotal attachment is located with X between about −80 mm and about 100 mm, and Y between about 40 mm and about 80 mm.

5. The suspension system of claim 1, wherein, in terms of the X,Y coordinate system the location of the pivot axis of the link pivotal attachment to the bicycle frame is with X between about −90 mm and about 120 mm, and Y between about −60 mm and about 120 mm; and the location of the pivot axis of the link pivotal coupling to the frame-ward end is with X between about −90 mm and about 40 mm and Y between about −110 mm and about 70 mm.

6. The suspension system of claim 1, wherein, in terms of the X,Y coordinate system the location of the pivot axis of the link pivotal attachment to the bicycle frame is with X between about −90 mm and about 120 mm, and Y between about −60 mm and about 120 mm; and the location of the pivot axis of the link pivotal coupling to the frame-ward end is with X between about −90 mm and about 40 mm and Y between about −110 mm and about 70 mm.

7. The suspension system of claim 1, wherein the shock absorber device is configured to be interconnected between the seat stay member and the bicycle frame.

8. A bicycle comprising the suspension system of claim 1.

* * * * *